United States Patent
Niemela et al.

(10) Patent No.: US 10,405,516 B2
(45) Date of Patent: Sep. 10, 2019

(54) TRANSPORT TRAILER WITH DEPLOYABLE CORRAL

(71) Applicant: NB4 Brand L.L.C., Chassell, MI (US)

(72) Inventors: Marcus Niemela, Carefree, AZ (US); Cal G. Niemela, Chassell, MI (US); Charles Hallstrom, Calumet, MI (US)

(73) Assignee: The Kingstar Company, Chassell, MI (US)

( * ) Notice: Subject to any disclaimer, the term of this patent is extended or adjusted under 35 U.S.C. 154(b) by 0 days.

(21) Appl. No.: 16/278,409

(22) Filed: Feb. 18, 2019

(65) Prior Publication Data
US 2019/0174709 A1    Jun. 13, 2019

Related U.S. Application Data

(63) Continuation-in-part of application No. 15/689,660, filed on Aug. 29, 2017, now Pat. No. 10,206,369.

(60) Provisional application No. 62/381,347, filed on Aug. 30, 2016.

(51) Int. Cl.
| | |
|---|---|
| *A01K 3/00* | (2006.01) |
| *A01K 1/00* | (2006.01) |
| *B60P 3/42* | (2006.01) |
| *B60P 3/04* | (2006.01) |

(52) U.S. Cl.
CPC .......... *A01K 1/0035* (2013.01); *A01K 1/0005* (2013.01); *A01K 3/002* (2013.01); *B60P 3/04* (2013.01); *B60P 3/42* (2013.01)

(58) Field of Classification Search
CPC .. A01K 3/00; B60P 3/04; B60R 9/042; B60R 9/055

USPC .......................... 119/512, 400, 513, 514, 496
See application file for complete search history.

(56) References Cited

U.S. PATENT DOCUMENTS

| | | | |
|---|---|---|---|
| 238,243 | A | 3/1881 | Mitchell |
| 3,019,763 | A | 2/1962 | Ferris |
| 3,387,825 | A | 6/1968 | Kreeger |
| 3,574,388 | A | 4/1971 | Stone |
| 3,726,256 | A * | 4/1973 | Bernhardt ................ A01K 3/00 119/512 |

(Continued)

OTHER PUBLICATIONS

Brochure entitled "TNC Travel N Corrals, Lightweight Portable Corrals", published on or before Jul. 6, 2016.

*Primary Examiner* — Yvonne R Abbott-Lewis
(74) *Attorney, Agent, or Firm* — Gardner, Linn, Burkhart & Ondersma LLP

(57) ABSTRACT

A deployable corral system for a transport trailer, such as a livestock trailer, provides a readily deployable corral along the trailer, and is readily stowable along the trailer in a retracted configuration for travel. The corral includes a pair of spaced-apart and extendable corral rails with a cross-rail extending between distal ends of the extendable corral rails. When the extendable corral rails are extended the cross-rail is spaced from an exterior side of the livestock trailer, and when the extendable corral rails are retracted the cross-rail is positioned near a roof of the trailer. The extendable corral rails move between the extended and retracted positions manually, or automatically with a drive system. Optionally, the drive system is powered by motors associated with linear or rotary actuators. Further options may include storage bins along the cross-rail, a deployable shade awning, a deployable trough, jack stands, securing flaps, and position sensors.

20 Claims, 45 Drawing Sheets

(56) References Cited

U.S. PATENT DOCUMENTS

| | | |
|---|---|---|
| 3,741,529 A | 6/1973 | Blagg |
| 3,828,733 A | 8/1974 | Correia |
| 3,943,890 A | 3/1976 | Calia |
| 3,970,045 A | 7/1976 | Graham, Jr. |
| 4,052,098 A | 10/1977 | Metz |
| 4,090,472 A * | 5/1978 | York .................. A01K 3/005 119/502 |
| 4,153,011 A | 5/1979 | Weissman et al. |
| 4,168,933 A * | 9/1979 | Kane .................. B60P 3/42 119/406 |
| 4,250,836 A | 2/1981 | Smith |
| 4,355,594 A | 10/1982 | Wagner |
| 4,468,046 A | 8/1984 | Rutherford |
| 4,494,733 A | 1/1985 | Olsson |
| 4,537,151 A * | 8/1985 | Bolton .................. A01K 3/00 119/512 |
| 4,659,136 A | 4/1987 | Martin et al. |
| 4,733,899 A | 3/1988 | Keys |
| 4,958,594 A | 9/1990 | Swagerty |
| 4,964,768 A | 10/1990 | Shomo |
| RE33,959 E | 6/1992 | Mollhagen |
| 5,235,468 A | 8/1993 | Stephens |
| 5,240,301 A | 8/1993 | Arnold |
| 5,303,947 A | 4/1994 | Gerber |
| 5,361,929 A | 11/1994 | McLain et al. |
| 5,427,486 A | 6/1995 | Green |
| 5,490,705 A | 2/1996 | Barr |
| 5,688,087 A | 11/1997 | Stapleton et al. |
| 5,715,641 A | 2/1998 | Hall, Jr. |
| 5,738,037 A | 4/1998 | Mahan |
| 5,738,341 A | 4/1998 | Lease |
| 5,810,412 A | 9/1998 | Hall |
| 5,887,928 A | 3/1999 | Fenske |
| 5,924,385 A | 7/1999 | Cossel |
| 6,067,940 A | 5/2000 | Holder |
| 6,077,007 A | 6/2000 | Porter et al. |
| 6,206,624 B1 | 3/2001 | Brandenburg |
| 6,257,558 B1 | 7/2001 | Levine et al. |
| 6,283,537 B1 | 9/2001 | DeVore, III |
| 6,467,433 B1 * | 10/2002 | Stanton .................. A01K 1/03 119/512 |
| 6,477,985 B1 | 11/2002 | Mennenga et al. |
| 6,499,435 B2 | 12/2002 | Markham |
| 6,557,329 B2 | 5/2003 | Schmidt |
| 6,571,744 B1 | 6/2003 | Olson et al. |
| 6,595,496 B1 | 7/2003 | Langlie et al. |
| 6,622,436 B1 | 9/2003 | Kretsch |
| 6,662,751 B1 | 12/2003 | Rutter |
| 6,755,155 B2 | 6/2004 | May |
| 6,866,252 B2 | 3/2005 | Pulliam |
| 7,004,525 B1 | 2/2006 | Turnbow |
| 7,325,513 B1 * | 2/2008 | Velasquez .......... A01K 1/0236 119/400 |
| 7,350,480 B1 | 4/2008 | Hughes |
| 7,393,042 B2 | 7/2008 | Alfstad-Seibel et al. |
| 7,637,060 B2 | 12/2009 | Starheim et al. |
| 7,685,970 B1 * | 3/2010 | Rains .................. A01K 1/0613 119/512 |
| 8,171,889 B2 | 5/2012 | Lindfors et al. |
| 8,281,696 B2 | 10/2012 | Schmidlkofer |
| 8,281,969 B2 * | 10/2012 | Schmidlkofer .......... B60R 3/00 224/42.11 |
| 8,322,580 B1 * | 12/2012 | Hamilton .............. B60R 9/042 224/309 |
| 8,322,966 B2 | 12/2012 | Doskocil |
| 8,870,243 B2 | 10/2014 | Elkington et al. |
| 2003/0209206 A1 * | 11/2003 | Campbell .............. A01K 3/00 119/513 |
| 2003/0209208 A1 * | 11/2003 | Campbell .............. A01K 3/00 119/513 |

* cited by examiner

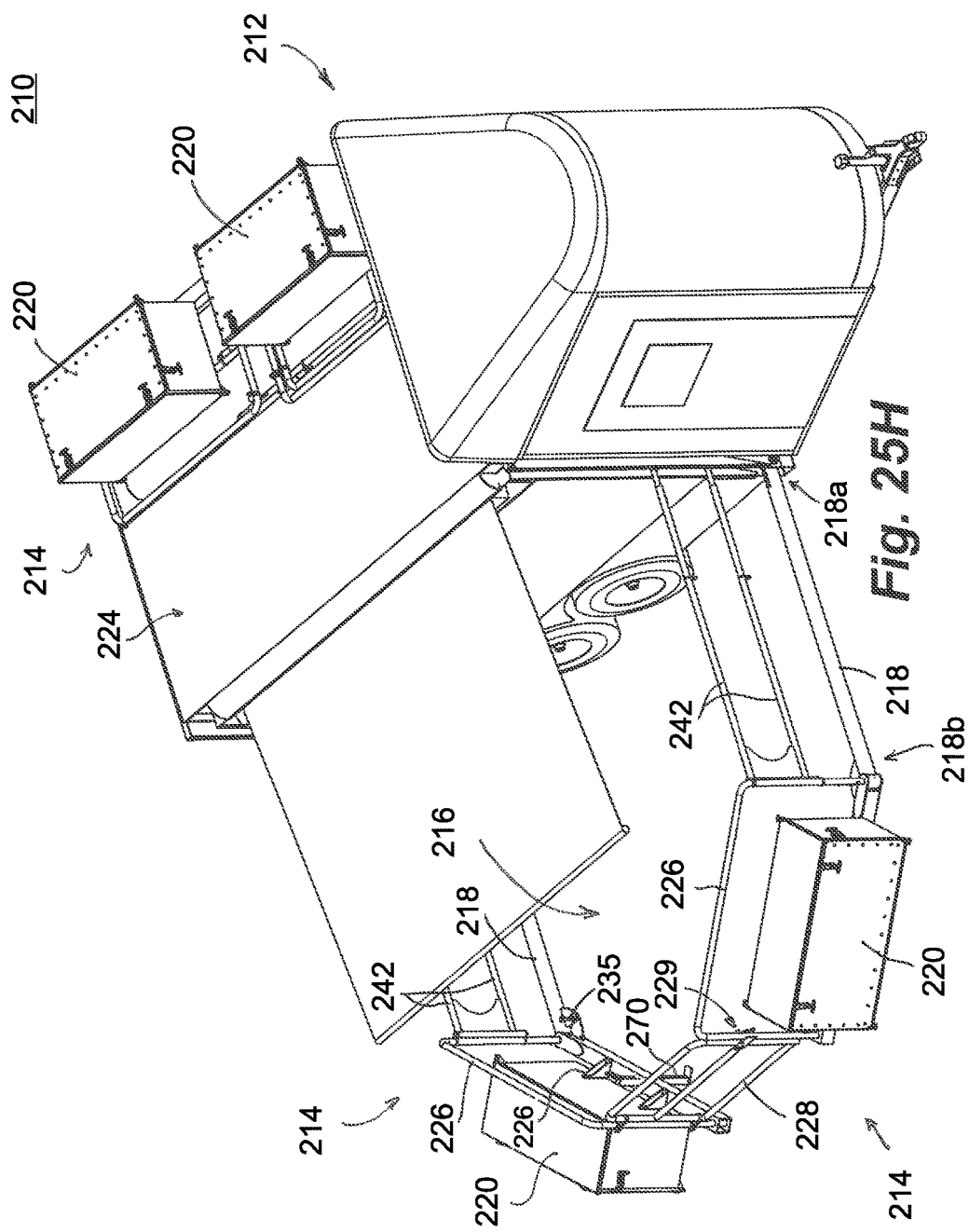

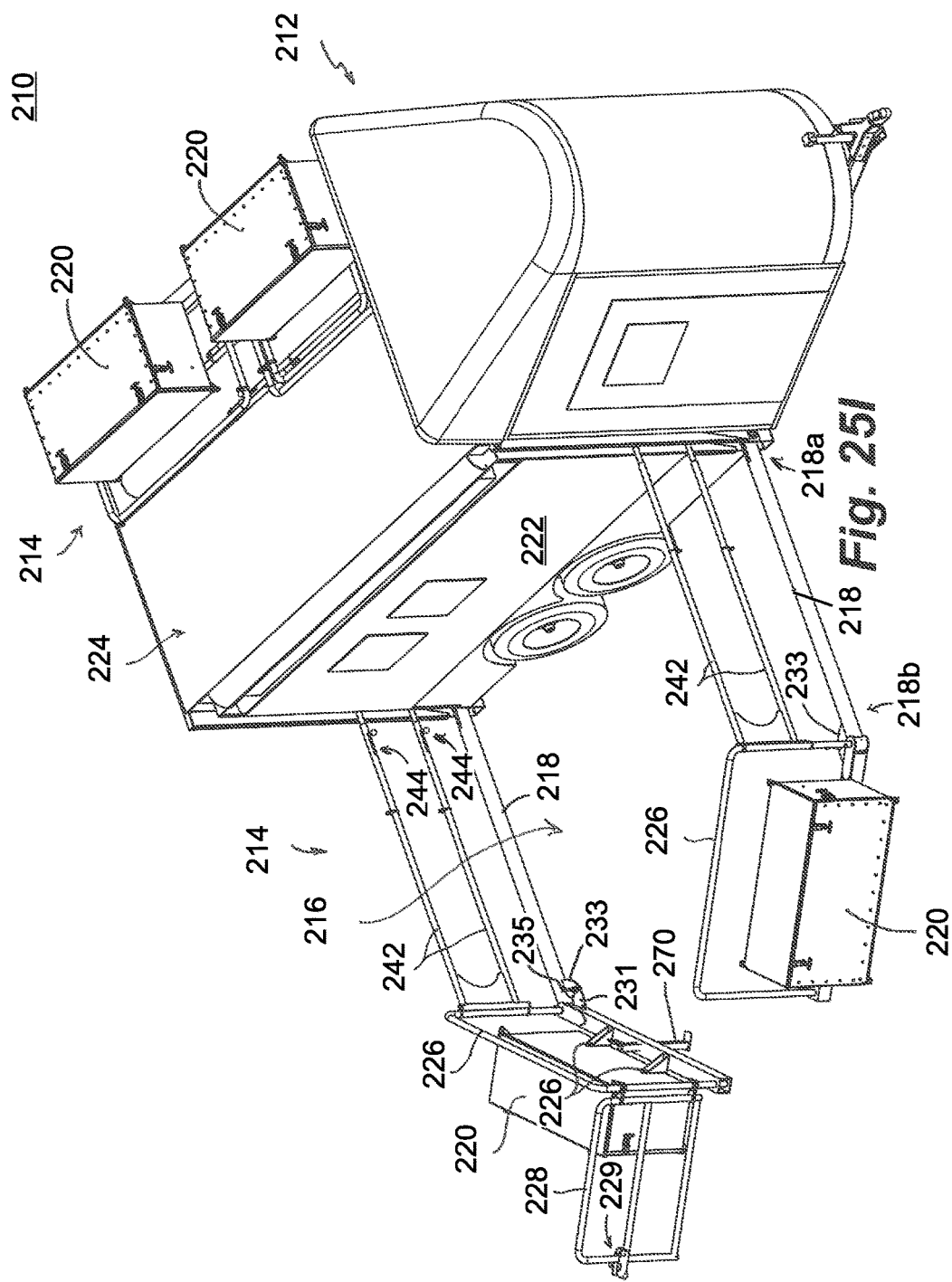

TRANSPORT TRAILER WITH DEPLOYABLE CORRAL

CROSS REFERENCE TO RELATED APPLICATION

The present application is a continuation-in-part of U.S. patent application Ser. No. 15/689,660, filed Aug. 29, 2017, now U.S. Pat. No. 10,206,369, issued Feb. 19, 2019, which claims the filing benefit of U.S. provisional application, Ser. No. 62/381,347, filed Aug. 30, 2016, which are both hereby incorporated herein by reference in their entireties.

FIELD OF THE INVENTION

The present invention relates to livestock and transport trailers and portable corral fencing.

BACKGROUND OF THE INVENTION

Those who move livestock, goods, or materials over-the-road from one location to another, for reason of work, hobby or show, typically do so using towable trailers especially designed for this purpose. For purposes of discussion, horses as a form of livestock will be referenced throughout the present application because they are a common livestock animal that is carried in over-the-road trailers, such as behind pickup trucks, vans, and other towing vehicles, but it will be appreciated that horses are intended to represent substantially any animal that is transported by trailer and should be provided with more moving space and/or outdoor time each day.

Typical horse trailers have provisions to accommodate one or more horses in a main compartment, as well as saddles, bridles, blankets and other horse-related equipment known generally as "tack". In addition, when horses are being transported over longer distances and for a period of several days, hay, water, and bedding (e.g., wood shavings) are also carried in the trailer or the tow vehicle. Some known horse trailers have a designated roof top area where several bales of hay can be stored.

After a day of travel it is necessary or desirable, for the safety and wellbeing of the horses, to unload them from the confines of the trailer's interior and provide them with an area where they can be free to move about in the open air. Although one option for traveling horse handlers is to identify and rent a horse boarding facility for overnight accommodations, it is not uncommon for a horse handler to carry portable sections of steel fencing, such as in the back of the tow vehicle or strapped to the side of the trailer, in order to construct a temporary makeshift corral or pen. For example, handlers may generally carry a sufficient quantity of fencing to erect their own ten to twelve foot diameter corral at a temporary site along their travel route. The process of loading, unloading, erecting, disassembling, and storing these corral fences is laborious and time consuming, and can be prohibitive for horse handlers of smaller stature or those with certain physical limitations or disabilities. Once at a destination such as a work site, a fair or a showing event where the horses will be temporarily corralled for several days, this difficult process must be repeated to return the livestock to their home quarters.

SUMMARY OF THE INVENTION

The present invention provides, in its various forms, a transport trailer with an integrated and deployable corral that creates a fenced-in space outside the trailer, such as for animals or even for sales personnel to have a walking space, and which optionally includes storage for feed, bedding materials, tools, water, display goods or other vendor displays, equipment, and the like. The integrated corral system can be deployed and retracted manually or automatically by means of an onboard hydraulic or electrical power system or the like, which may be powered by a rechargeable battery, a combustion engine, or a tow vehicle electrical or pneumatic system, for example. The transport or livestock trailer with integrated corral system can deploy a corral to at least one side or to a rear of the trailer, and can optionally provide feed storage, tack storage, and the like, substantially without changing the trailer's dimensions when the corral system is stowed. Optionally, the deployable corral system provides simplified push-button deployment and retraction, with heavy lifting and stowing handled by the deployment mechanism, which may reduce or eliminate the need for a horse handler to manually lift bedding, hay, water, and tack substantial vertical distances such as to a rooftop storage area. Optional features include an integrated and automatically or manually deployable shade canopy, and an integrated and automatically or manually deployable water trough that is accessible to animals penned in the corral.

According to one form of the present invention, a deployable corral system for a livestock trailer or other type of transport trailer provides a readily deployable corral along the trailer, and may be integrated into the trailer to provide one or more self-deploying and self-stowing temporary corrals, such as for overnight or short term use during travel with horses or other livestock. The corral includes a pair of extendable corral rails with at least one cross-rail extending between distal ends of the extendable rails. When the extendable corral rails are extended, the cross-rail is spaced from an exterior side of the trailer, and when the extendable corral rails are retracted the cross-rail is positioned near an upright wall of the trailer. Optionally, a powered drive system moves the extendable corral rails between the extended and retracted positions in response to a command received from a user, such as via a pushbutton controller. Optionally, the drive system is powered by motors driving linear or rotary actuators. Further options include storage bins along the cross-rail, which can be lifted by the powered drive system and positioned atop the trailer roof for over-the-road transport, as well as a deployable shade awning and a deployable trough.

In one aspect, proximal end portions of the extendable corral rails are pivotably coupled to a lower region of the trailer at forward and rearward ends of the trailer. The pivots define a substantially horizontal pivot axis of the extendable corral rails, which axis is oriented longitudinally along the lower region of the trailer.

In another aspect, proximal end portions of the extendable corral rails are slidably coupled to a lower region of the trailer at forward and rearward ends of the trailer. The slides define a substantially horizontal path of movement of the extendable corral rails, which horizontal path of movement is oriented perpendicular to the upright wall of the trailer.

In another aspect, distal end portions of the extendable corral rails are telescopically extendable and retractable relative to the respective proximal end portions. Optionally, a corral rail extension system is provided for extending and retracting the distal end portions of the extendable corral rails relative to the proximal end portions thereof. Optionally, the corral rail extension system is part of the deployable corral system's drive system.

In yet another aspect, the drive system is a pulley and cable system. Optionally, the pulley is configured for mounting at the trailer, and the cable includes a proximal end wound around the pulley and a distal end attached to a respective one of the extendable corral rails.

In a further aspect, a storage bin is coupled to an outboard side of the corral cross-rail. In this arrangement, the corral cross-rail and the storage bin are positioned above the roof panel of the trailer when the extendable corral rails are retracted. Optionally, the storage bin includes a pivotable top lid and a pivotable front panel, wherein the front panel is pivotable to an open configuration and the front panel is configured to maintain a substantially horizontal orientation in the open configuration.

In yet a further aspect, a storage bin is coupled to an outboard side of the corral cross-rail. In this arrangement, the corral cross-rail and the storage bin are positioned near the upright wall of the trailer when the extendable corral rails are retracted. Optionally, the storage bin includes a pivotable top lid and a pivotable front panel, wherein the front panel is pivotable to an open configuration and the front panel is configured to maintain a substantially horizontal orientation in the open configuration.

In a still further aspect, an upper corral rail is attached to the distal end portion of each of the extendable corral rails, and is pivotable between a retracted position in which the upper corral rail is substantially parallel to the corral cross-rail, and an extended position in which the upper corral rail is substantially parallel to the extendable corral rails. The upper corral rails have distal end portions that are securable to the upright wall of the trailer when the upper corral rails are in their extended positions.

In still another aspect, the corral cross-rail is pivotably coupled to the extendable corral rail, and the corral cross-rail is pivotable between a retracted configuration in which the corral cross-rail is substantially perpendicular to the extendable corral rail, and an extended configuration in which the corral cross-rail is set at an obtuse angle relative to the extendable corral rail.

In another aspect, the corral cross-rail pivot utilizes a hinge locking system situated on the exterior side of the pivot relative to the enclosed portion of the corral. The hinge locking system includes an upper and lower arc shaped guide channel, a tracking pin, and opposing pivot plates. The pivot plates are secured to a proximal end of the corral cross rail and extend axially beyond the pivot. The pivot plates are disposed with one on top of the extendable corral rail distal end and the other on the bottom of the extendable corral rail distal end. The guide channels are disposed between the pivot plates and guide the tracking pin, which is disposed on the extendable corral rails near the distal end of the extendable corral rail. The tracking pin includes a hole through its center to receive a locking pin. The locking pin is inserted through a hole in the top pivot plate, through the tracking pin hole, and through the bottom pivot plate to lock the corral cross rail into position. Holes may be disposed along the pivot plates and within the guide channel to facilitate securing the corral cross rail at any one of a selection of different angles relative to the extendable corral rail.

According to another aspect, a support leg is pivotably coupled to the distal end portion of each of the extendable corral rails. The support legs extend downwardly when the extendable corral rails are in their extended positions, and the support legs extend upwardly when the extendable corral rails are in their retracted positions. Optionally, a linkage is coupled to each of the support legs, wherein the linkages are configured to pivot each of the support legs relative to the extendable corral rails in response to the extendable corral rails moving between the extended and retracted positions.

According to another aspect, a support leg is slidably coupled to the distal end portion of each of the extendable corral rails. The support legs extend downwardly when the extendable corral rails are in their extended positions, and the support legs extend upwardly when the extendable corral rails are in their retracted positions. The support legs include multiple adjustment holes and a lock pin configured to lock the support leg at a desired height by passing through the slide mount and the adjustment holes. Optionally, a support leg is slidably coupled to the distal end portion of each of the corral cross-rails.

According to another form of the present invention, a transport trailer with deployable corral system includes a plurality of upright walls and a pair of wheels supporting them, a pair of extendable corral rails, a corral cross-rail, and a drive system for moving the extendable corral rails between extended and retracted positions. The extendable corral rails each have respective proximal end portions coupled to one of the upright walls, and distal end portions spaced from the proximal end portions. The corral cross-rail is coupled to the distal end portion of at least one of the extendable corral rails. When the extendable corral rail is in the extended position, the corral cross-rail is spaced horizontally away from the upright wall, and when the extendable corral rail is retracted the corral cross-rail is positioned at or above an upper end portion of the upright wall. The extendable corral rails and the corral cross-rail, in the extended position, cooperate with the upright wall to define a corral area.

In one aspect, a feed or water trough is pivotably coupled to the upright wall, so that the trough is selectively extendable into the corral area and retractable into the upright wall.

In another aspect, a roof panel is positioned atop the upright walls, a storage bin is coupled to an outboard side of the corral cross-rail, and a fairing is located at a forward end of the roof panel and extends above the roof panel. The corral cross-rail and the storage bin are positioned above the roof panel when the extendable corral rails are retracted, and the fairing is sized and shaped to provide a wind break for at least the storage bin and the corral cross-rails when the extendable corral rails are moved to their retracted positions.

In yet another aspect, the upright wall where the extendable corral rails are mounted includes a pair of upright recesses for receiving at least portions of respective ones of the extendable corral rails in their retracted positions.

In still another aspect, a roof panel is positioned atop the upright walls, and a retractable awning system is provided, the awning system a flexible awning sheet, an end support rod, and a pair of awning support arms. The awning sheet has a proximal edge configured for attachment to the roof panel or to the upright wall, and a distal edge that is extendable outwardly from the roof panel and/or the upright wall. The end support rod is attached to the distal edge of the flexible awning sheet, and the awning support arms have upper end portions coupled to the end support rod, with lower end portions pivotably coupled to respective extendable corral rails or to the upright wall.

In a still further aspect, a pair of upright recesses are formed in the upright wall where the extendable corral rails are mounted, the recesses for selectively receiving at least portions of the respective extendable corral rails in the retracted position, and for selectively receiving at least portions of the respective awning support arms. Optionally, a horizontal recess is formed along an upper end portion of the at least one upright wall, and/or a side edge portion of the roof panel, and/or along an intersection of the at least one upright wall with the roof panel. The horizontal recess is configured to receive the end support rod and at least a portion of the flexible awning sheet when the distal edge of the flexible awning sheet is retracted toward the upright wall.

In a still further aspect, a flap is pivotably mounted to the upright wall in proximity to a recess for selectively receiving a portion of the extendable corrals in the retracted position. The pivotable flap is configured to retain the extendable corral rails in vertical orientations along exterior side panels, so that the piston-cylinders (or other corral rail support structures or mechanisms) are not solely relied upon to maintain corrals in their raised and stowed positions during transport. The pivotable flap may further include a position sensor capable of determining if the pivotable flap is in an open or closed position. The position sensor is configured to communicate the position of the pivotable flap to a user or to a motor drive to disable the extension or retraction of the extendable corral rails. Optionally, the pivotable flap includes mounts configured to accept and support the ends of the upper corral rails while the corral system is in the deployed configuration.

In another aspect, the trailer interior defines a livestock manger including at least one stall defined by a trailer floor surface, a chest wall set at an oblique angle relative to one of the upright walls, and an interior sidewall extending rearwardly away from the chest wall, with the interior sidewall set at another oblique angle relative to the trailer sidewall. Optionally, the interior sidewall is generally perpendicular to the chest wall, which cooperates with the trailer sidewall to define a storage space accessible from outside the trailer or from inside the interior livestock manger.

Therefore, the deployable corral system of the present invention allows users to easily provide a corral or enclosed area along the exterior of a vehicle such as a transport trailer, such as a livestock trailer, a commercial display or vendor trailer, or the like. The corral system can be actuated between extended and retracted configurations using a drive system, such as a powered drive system that requires little more than pushbutton or remote actuation by an operator. Optional storage bins can be placed on rails or fence portions of the corral, and lifted by the system to an elevated storage position atop the trailer. When the corral system is integrated into a trailer, a motor vehicle, or other vehicle, its various components can be recessed into channels in their stowed configurations in order to avoid altering the vehicle's length or width.

These and other objects, advantages, purposes, and features of the present invention will become more apparent upon review of the following specification in conjunction with the drawings.

BRIEF DESCRIPTION OF THE DRAWINGS

FIGS. 25A-25I are front-right perspective views of another transport trailer with deployable corral in accordance with the present invention, depicting sequential steps of deploying the right side deployable corral;

DETAILED DESCRIPTION OF THE PREFERRED EMBODIMENTS

Figure 1:
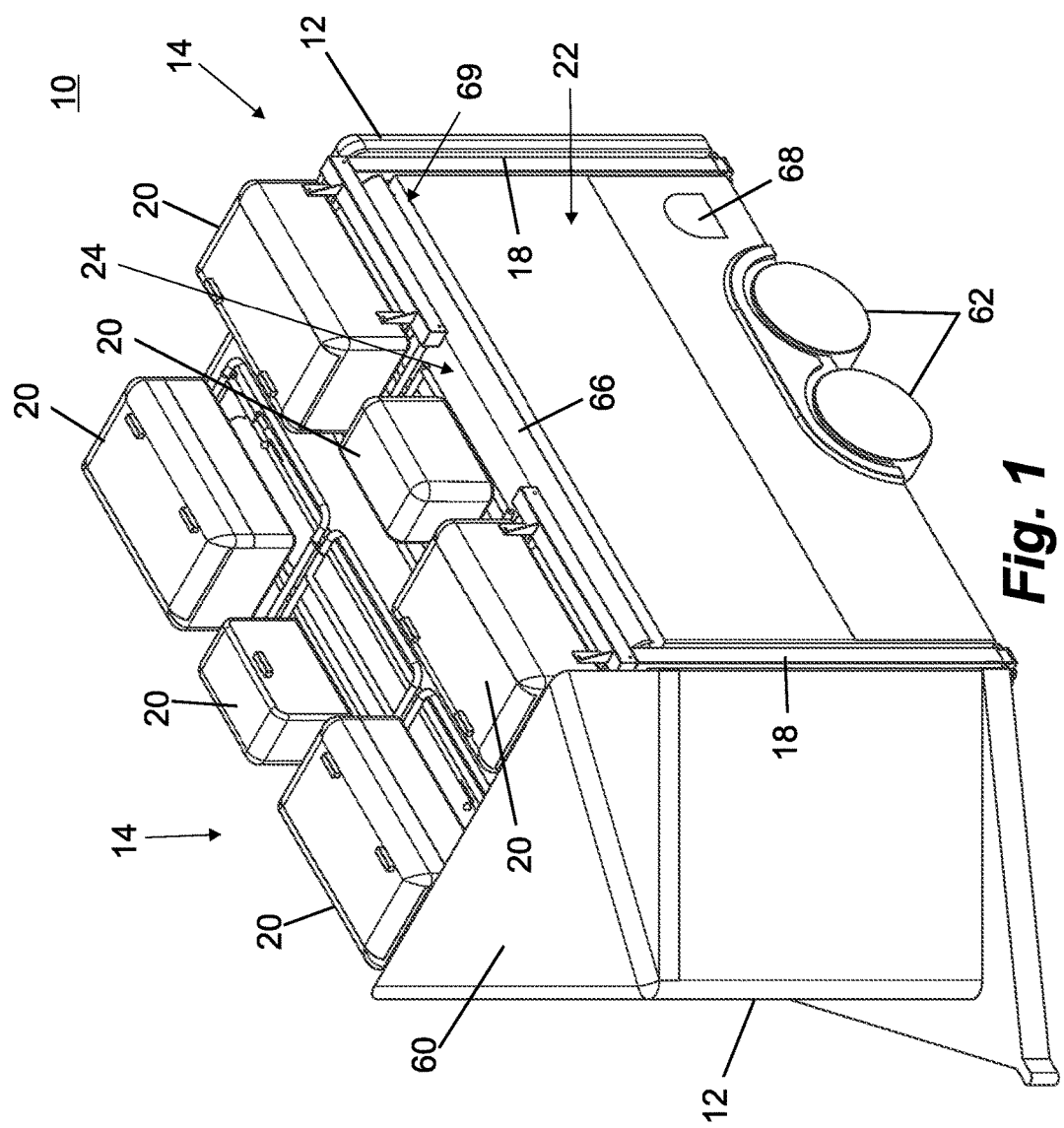
FIG. 1 is a front perspective view of a transport trailer with deployable corral in accordance with the present invention, shown in a travel-ready configuration.
Figure 2:
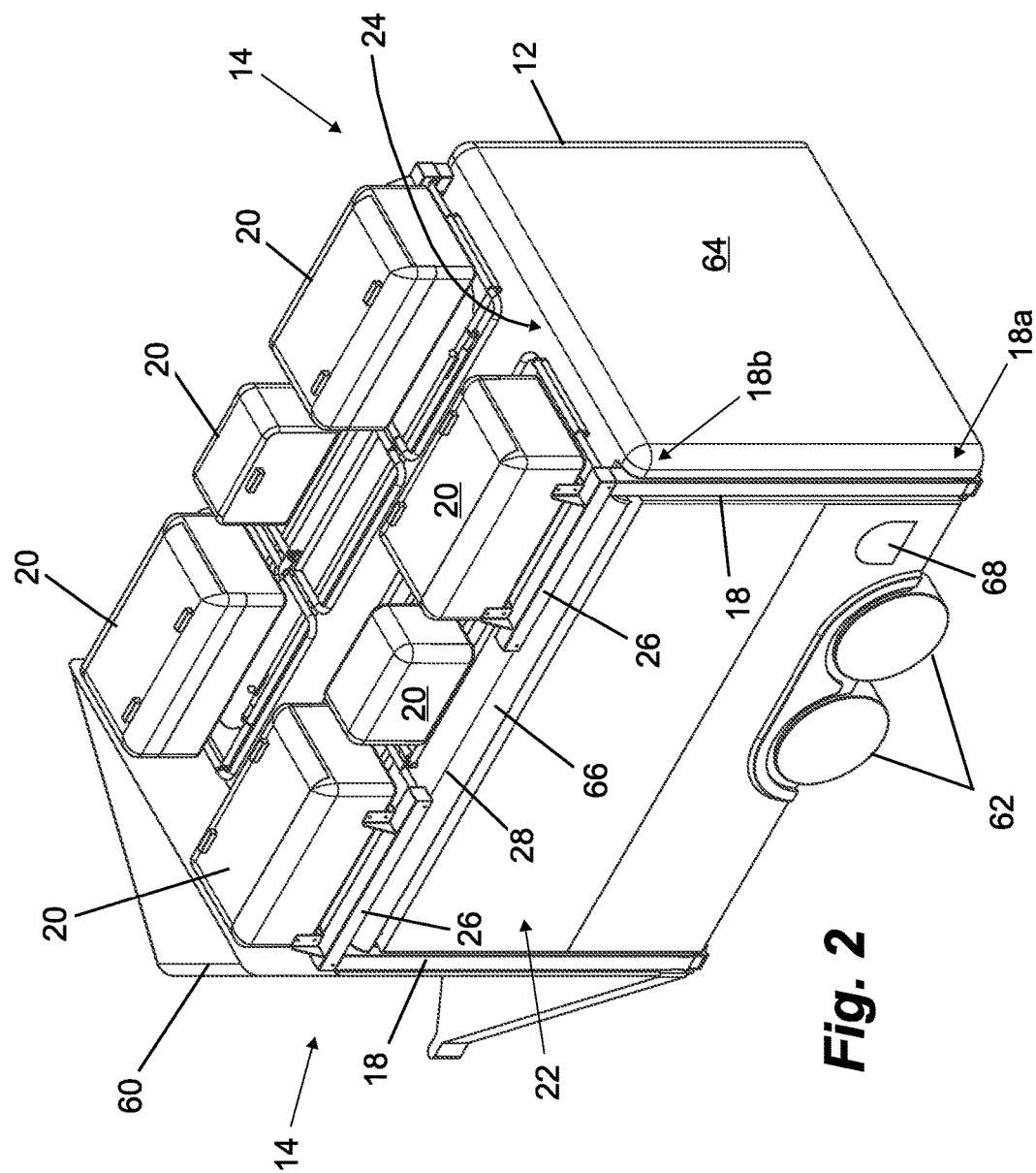
FIG. 2 is rear perspective view of the transport trailer with deployable corral of FIG. 1.
Figure 3:
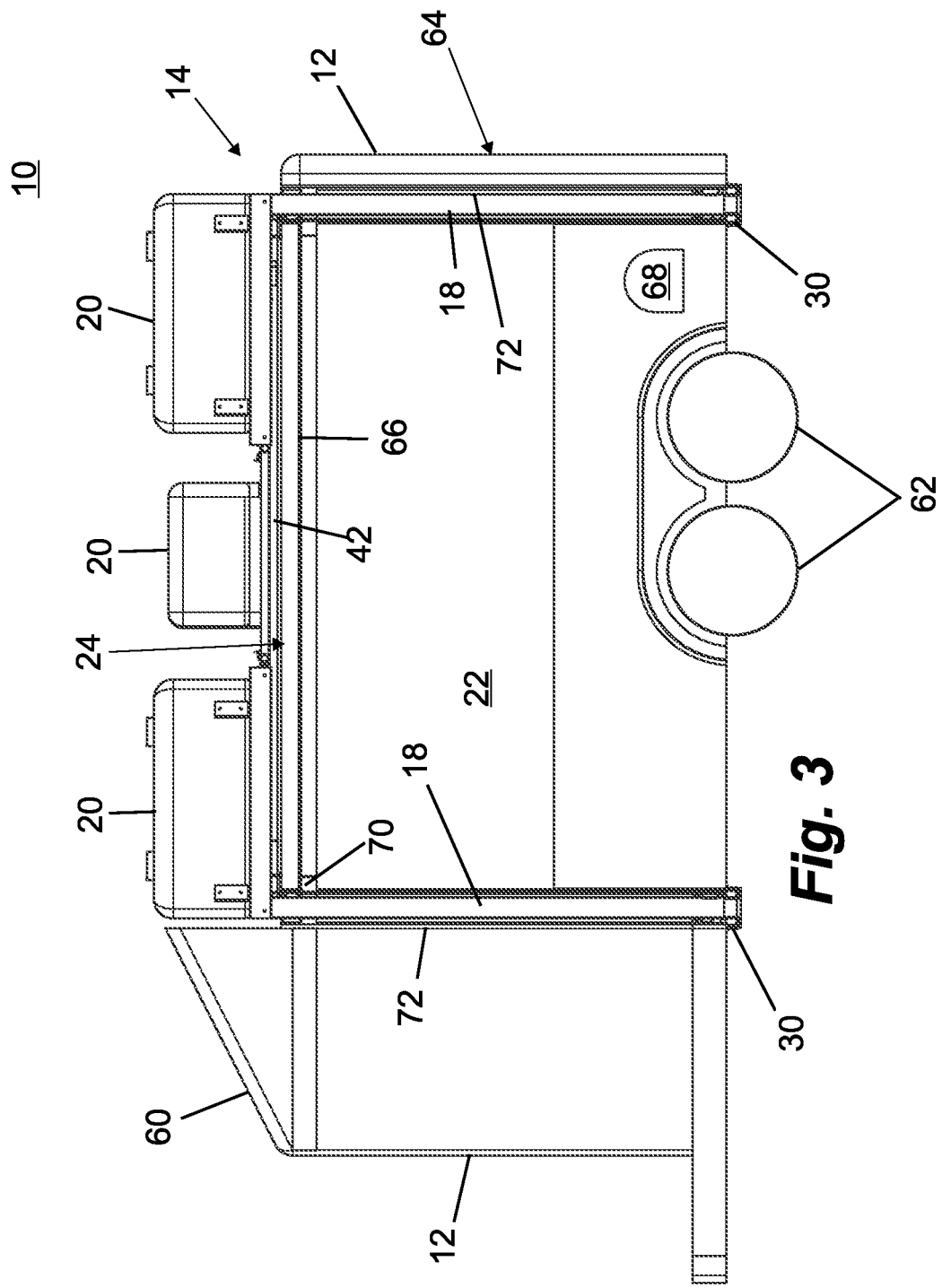
FIG. 3 is left side elevation of the transport trailer with deployable corral of FIG. 1.

Referring now to the drawings and the illustrative embodiments depicted therein, a transport trailer with integrated corral system 10 includes a transport trailer 12, such as a livestock trailer, and two deployable corrals 14 that extend and retract relative to respective sides of trailer 12, such as shown in FIGS. 1-7. In the illustrated embodiment, corrals 14 are essentially self-contained and integrated into trailer 12, and are capable of push button deployment and retraction by a single operator or user. Corrals 14 deploy to create fenced-in spaces 16 outside the trailer 12 for animals to have a walking space while they are not being transported. The corrals 14 may provide storage for feed, bedding materials, tools, water, saddles, and the like in one or more bins 20, which are positioned above the trailer 12 in the retracted or stowed position of FIGS. 1-3. Thus, the transport trailer with integrated corral system 10 greatly simplifies the setup and takedown of a portable corral that travels with the trailer, and which is self-powered so as to reduce or eliminate much of the manual lifting that is usually associated with temporary care of livestock.

Although it is expected that the principles of the present invention would commonly be implemented in the context of livestock trailers, it will be appreciated that other applications are also envisioned, such as for use as portable vendor displays for goods or services, as will be described below. Thus, the term "corral", as used herein, is not to be construed as being limited to livestock containment applications, but instead may refer to substantially any containment or barricade or wall for substantially any purpose. Likewise, it will be understood that references to horses or other livestock herein are for purposes of providing examples of applications and features of the disclosed embodiments, and are not intended to limit the invention to livestock transport and containment applications. In addition, while the various embodiments are described with reference to a towable trailer, it will be appreciated that the principles of the present invention may be adapted to cargo vans, trucks, and self-powered recreational vehicles, and even to stationary structures such as sheds and homes where temporary corrals or pens are desired, without departing from the spirit and scope of the present invention.

Each deployable corral 14 includes a pair of pivotally extendable corral rails 18 having respective proximal end portions 18a that are pivotally coupled at or along an exterior side panel or upright wall 22 of livestock trailer 12, the rails 18 having distal end portions 18b that extend out from exterior side panels 22 when in the deployed or extended positions of FIGS. 4-7. When corral rails 18 are moved to the stowed or retracted position of FIGS. 1-3, distal end portions 18b are positioned near upper corners of trailer 12 where exterior side panels 22 meet a roof panel 24. A corral cross-rail 26 is coupled to each distal end portion 18b of each extendable corral rail 18, and cooperates with the corral rails 18 and the trailer's side panel 22 to define fenced-in corral space 16 when the corral 14 is deployed. In the illustrated embodiment, a corral swing gate 28 is pivotably coupled to each rearward cross-rail 26, and provides access to corral space 16 when swing gate 28 opened, such as shown at left in FIGS. 4 and 5 in which the gate 28 is illustrated simultaneously in both opened and closed positions. It will be appreciated that each forward cross-rail 26 may also be fitted with a swing gate, so that one swing gate may be used to close the access opening to fenced-in area 16, and the other swing gate may be used to support a storage bin 20 that is accessible to livestock in the fenced-in area 16.

Extendable corral rails 18 are pivotably coupled to trailer 12 at respective rail pivots 30 located at bottom corners of trailer 12 near where exterior side panels 22 terminate (FIGS. 7-9 and 14A-14F). Rail pivots 30 define a common horizontal pivot axis that extends longitudinally along trailer 12 below each side panel 22. In the illustrated embodiment, corral rails 18 are two-piece units including an inboard rail portion 32 (which forms proximal end portion 18a) and an outboard rail portion 34 that forms distal end portion 18b and is longitudinally extendable and retractable relative to inboard rail portion 32, such as shown in FIGS. 4-7 and 14A-14C. When corral rails 18 are moved to the stowed or retracted position of FIGS. 1-3, distal end portions 18b are positioned near upper corners of trailer 12 where exterior side panels 22 meet a roof panel 24.

Optionally, in an alternative embodiment, the extendable corral rails are slidably coupled to trailer at respective rail slides located at bottom corners of trailer 12 near where exterior side panels 22 terminate. Rail slides define a horizontal movement path that extends laterally into a footprint of the trailer 12 defined by the trailer walls. In this embodiment, the corral rails may be two-piece units including an inboard rail portion and an outboard rail portion that is longitudinally extendable and retractable relative to the inboard rail portion similar to the arrangement shown in FIGS. 4-7 and 14A-14C. When the corral rails are slidably moved to the stowed or retracted position, their distal end portions are positioned near lower corners of exterior side panels 22 of trailer 12, and their corresponding cross-rails are positioned along the exterior side panels 22, or may be contained within recesses formed in the side panels 22, similar to the recessed channels 58 provided to receive the extendable corral rails 18, which are described below in more detail.

A support leg 36 is pivotably coupled to each of the distal end portions 18b of the extendable corral rails 18 where the corral rail 18 meets cross-rail 26, with another support leg 36 at the opposite end of each cross-rail 26. Each support leg 36 has a support wheel 38 rotatably mounted at its distal end, for rolling support of corral rails 18, cross-rails 26, and storage bins 20 along the ground or other support surface. Optionally, instead of support wheels it is envisioned that each support leg 36 may be fitted with a skid plate or the like, which would slide along the ground or support surface during extension and retraction of the corral rails. It is further envisioned that each support leg could be length-adjustable to accommodate uneven terrain.

Support legs 36 extend downwardly from the corral rails 18 and cross-rails 26 when the corral rails 18 are in the extended position of FIGS. 4-7 and 14A. Support legs 36 extend upwardly from the corral rails 18 and cross-rails 26 when the corral rails 18 are in the retracted position of FIGS. 1-3 and 14F, although it should be understood that the support legs and wheels are not illustrated in FIGS. 1-3. The mechanism that causes support legs 36 to pivot approximately 90-degrees while corral rails 18 also pivot approximately 90-degrees, which results in approximately 180-degree change of orientation for support legs 36, is part of the mechanism that raises and lowers corral rails 18 and cross-rails 26, and will be described below.

Figure 28A:
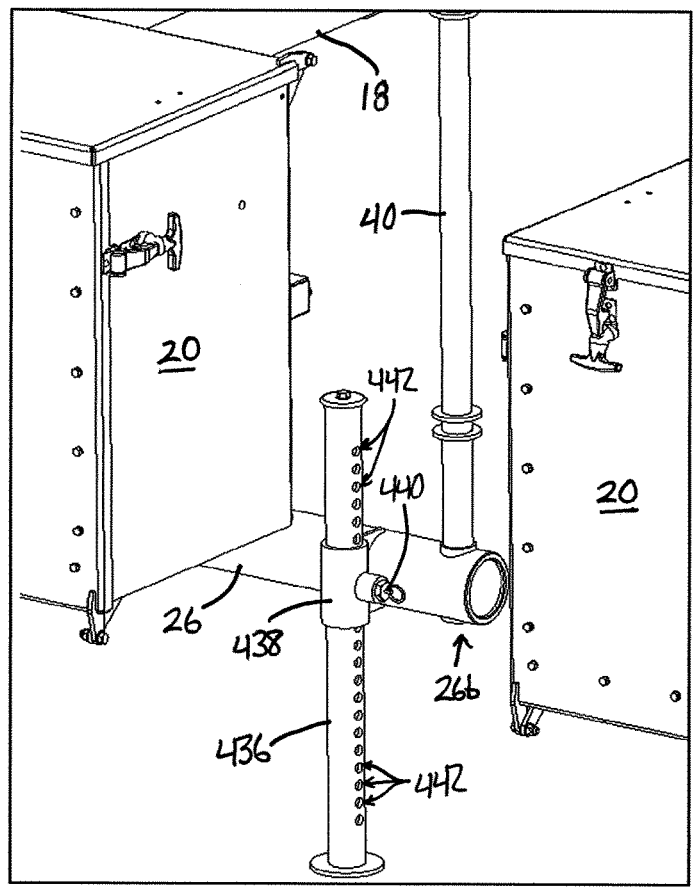
FIGS. 28A-28B are perspective views of an extendable support leg, depicting sequential steps of raising and lowering the support leg.
Figure 28B:
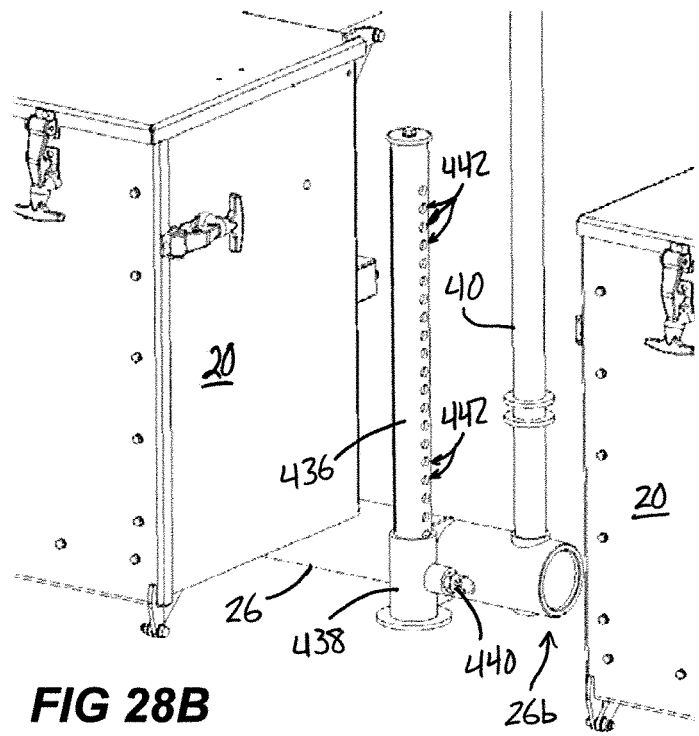
Figure 29A:
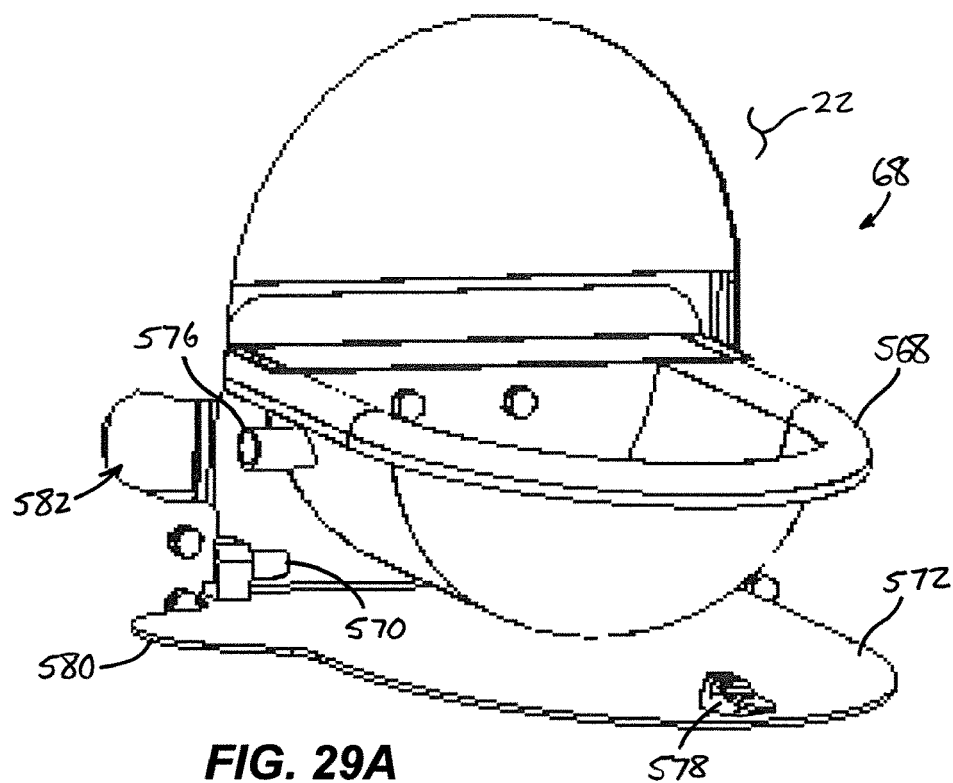
FIGS. 29A-29D are perspective views of a pivotable water trough, depicting sequential steps of deploying and stowing the water trough.
Figure 29B:
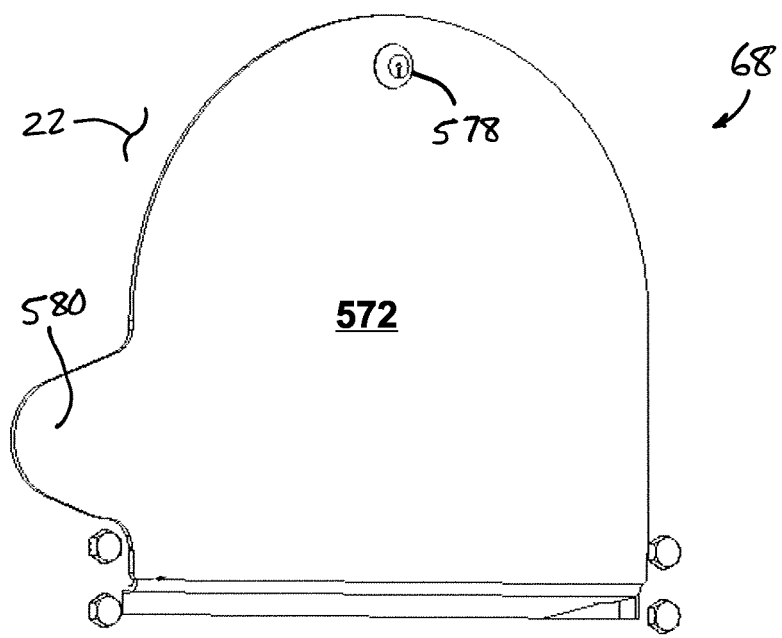
Figure 29C:
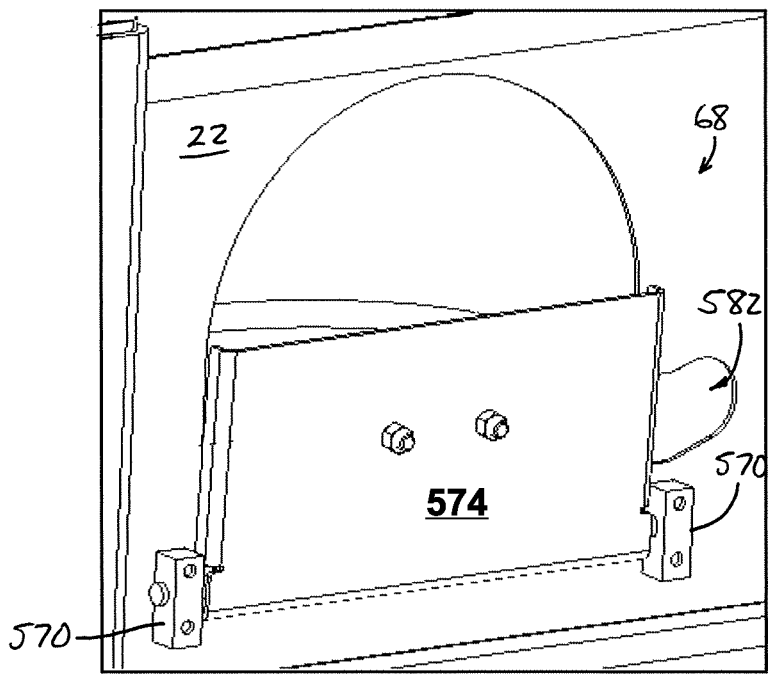
Figure 29D:
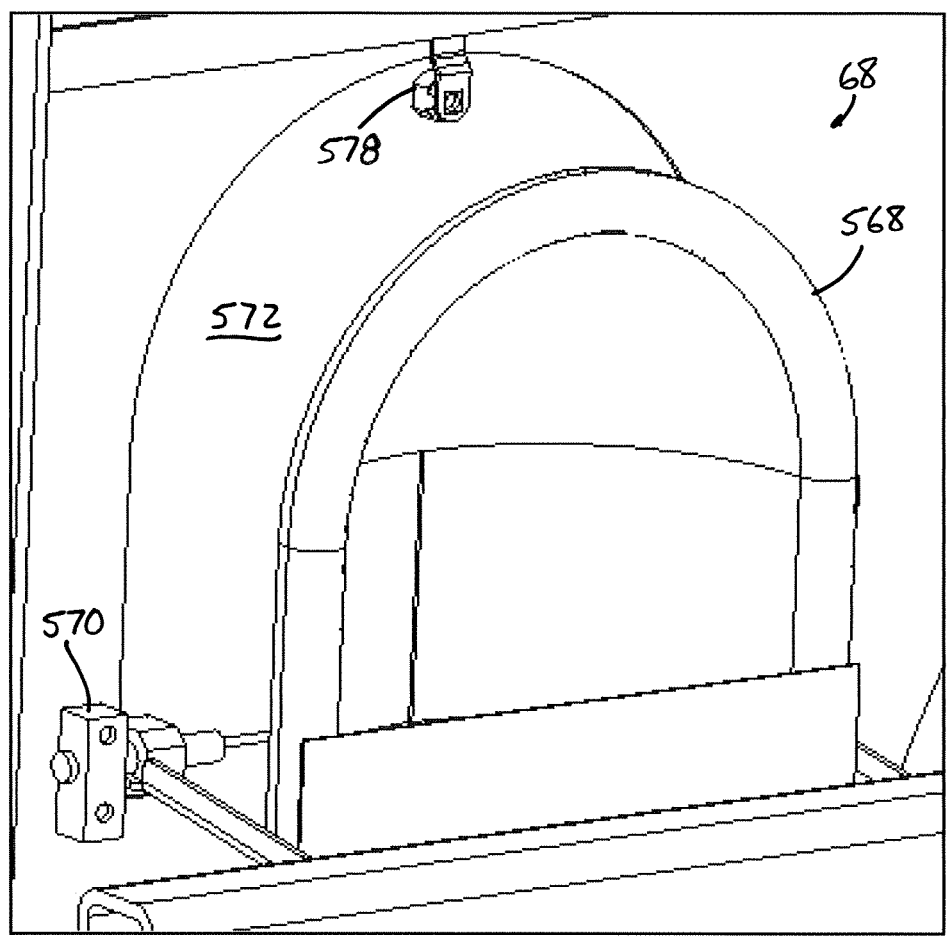

Optionally, and with reference to FIGS. 28A-28B, similar support legs 436 extend downwardly from the cross-rails 26 to support the corral rails 18 and cross-rails 26 when they are in the extended position. Support legs 436 are configured to slidably extend downward through a slidable mount 438 to a deployed position, and slidably retract upward through the slidable mount 438 to a stowed position. Support legs 436 are adjustable to a desired height via respective pins 440 that pass through the slidable mount 438 and into one or more of a plurality of holes 442 disposed along the support leg 436, such that the support leg 436 is constrained from vertical movement when the pin 440 is inserted as shown. In the illustrated embodiment the holes 438 are evenly spaced and arranged along most of the length of the support legs 436. Optionally, the pin 440 includes a spring-release detent or spring-loaded actuator that secures the pin in the aligned holes 438 until manually released by the user.

Each of the extendable corral rails 18 has a respective corner post 40 extending upwardly from its distal end portion 18b. Corner posts 40 also form the upright ends of respective corral cross-rails 26, such as shown in FIGS. 4-14F. A pair of upper corral rails 42 is pivotably attached at its proximal end 42a to each corner post 40, and rails 42 are movable between a stowed position that is generally parallel to cross-rails 26 and perpendicular to extendable corral rails 18 (FIGS. 8-11 and 14A-14F), and a deployed position that is generally perpendicular to cross-rails 26 and parallel to extendable corral rails 18 (FIGS. 4-7 and 13). The individual rails of each set of upper corral rails 42 of each deployable corral 14 are staggered in height, such as shown in FIGS. 7, 9-11, and 14A-14F, so that the two sets of upper corral rails 42 may overlap one another vertically when in their stowed position of FIGS. 1-3, 9-11, and 14A-14F, for compactness.

Figure 12:
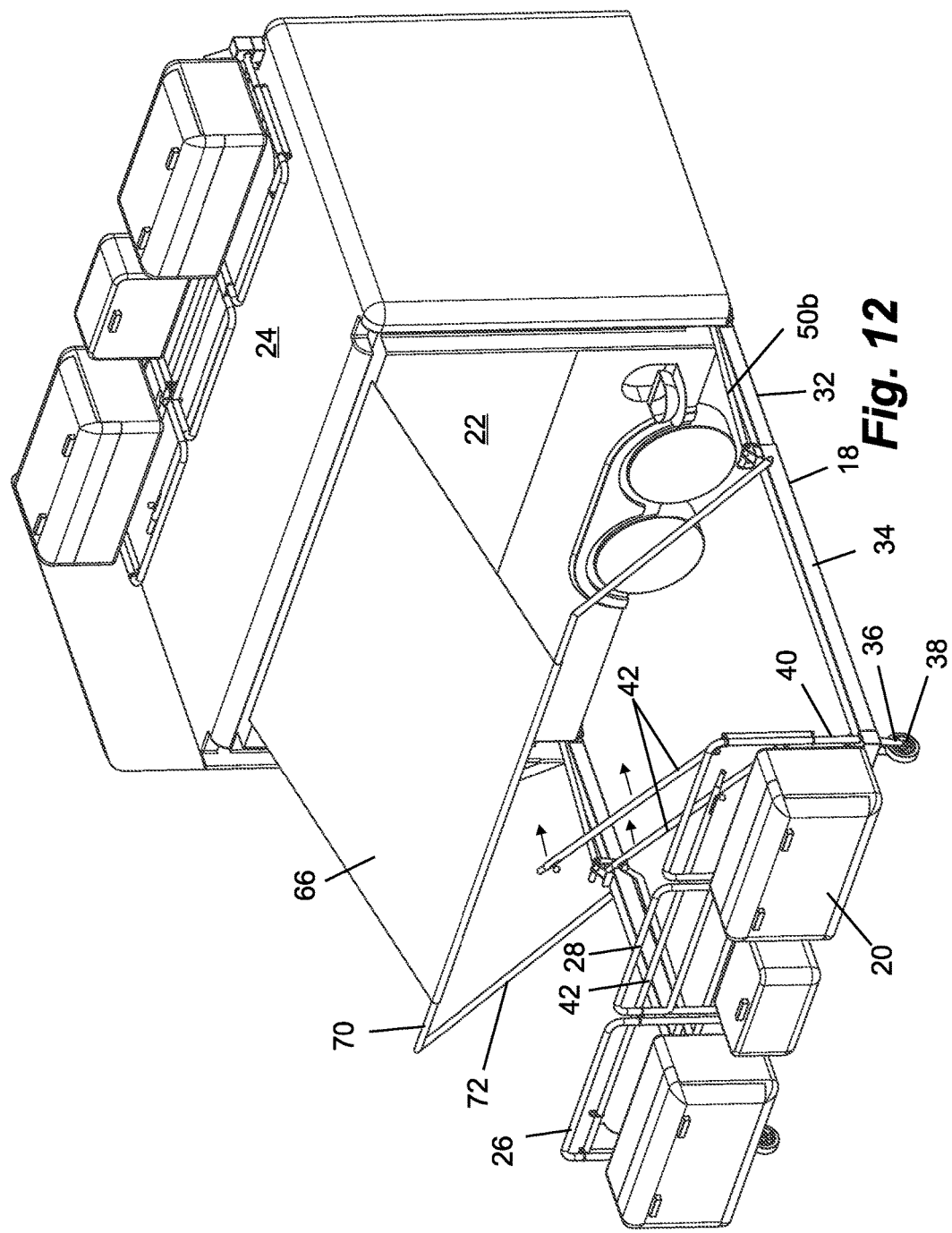
Figure 13:
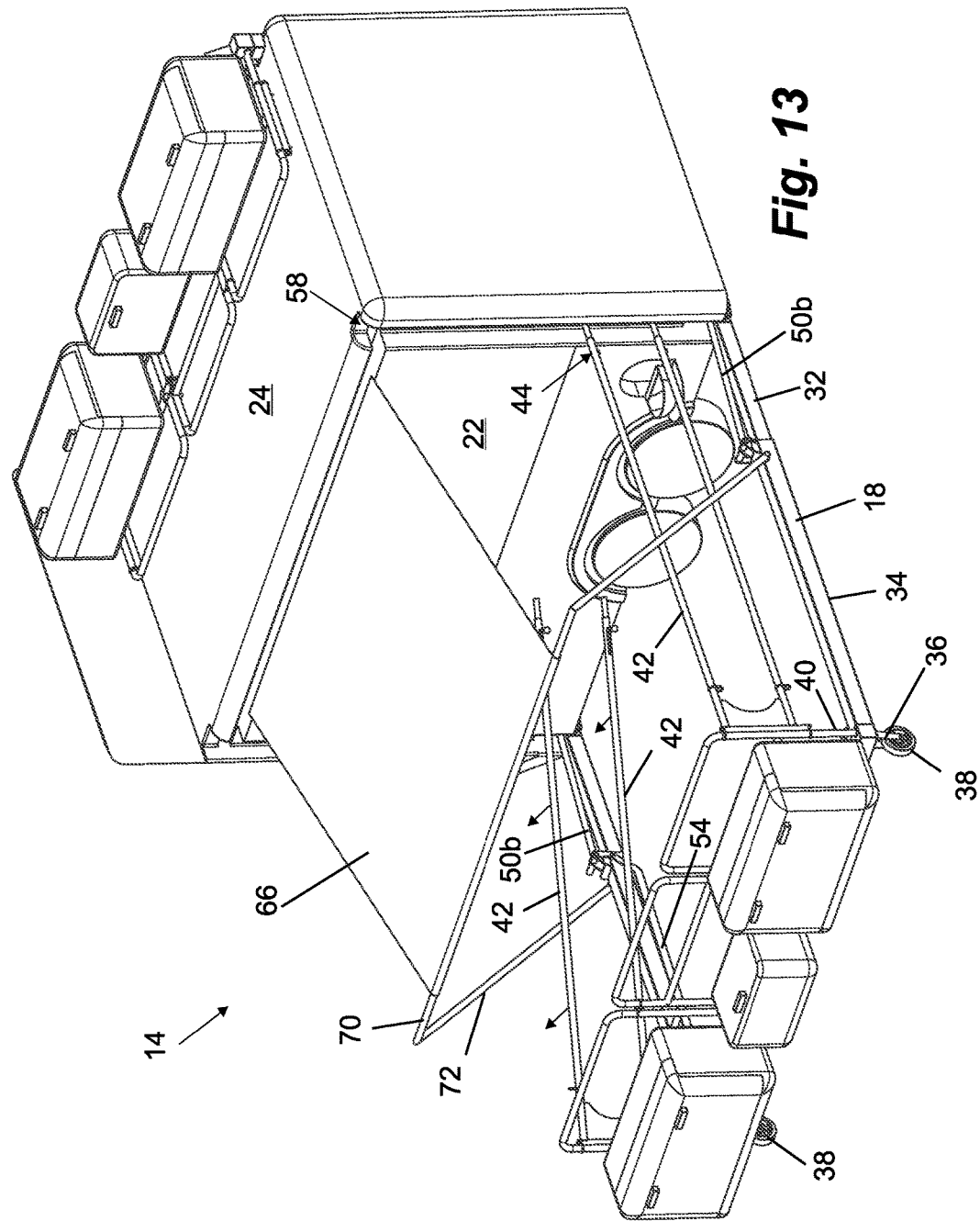

Once extendable corral rails 18 are fully extended, upper corral rails 42 may be manually pivoted to their deployed positions by pivoting them in the manner indicated by arrows in FIGS. 12 and 13, so that they are parallel to their respective extendable corral rails 18. In the deployed position, each upper corral rails' distal end 42b is proximate the trailer's exterior side panel 22. Optionally, each upper corral rail 42 may be longitudinally extendable and retractable, such as in a two-piece telescoping arrangement, to substantially match the overall length of extendable corral rails 18 in extended or retracted positions. This permits a user to decide whether to fully extend the corral rails 18, such as due to space constraints where the trailer 12 is located, and then size the upper corral rails 42 accordingly.

A latch 44 (FIGS. 4-7) in each individual rail of upper corral rails 42 is actuatable to secure distal ends 42b of upper corral rails 42 at exterior side panel 22, to prevent undesired pivoting of upper corral rails 42 when corral 14 is deployed and in use, such as could be caused by a horse or other livestock leaning against upper corral rails 42. In the illustrated embodiment, latches 44 are slide-pins disposed in hollow tubular upper corral rails 42, whose tips extend from the rails 42 and into receiving bores 46 (FIGS. 7 and 20) or the like in exterior side panel 22. However, it will be appreciated that other types of manual or automatic actuating latches may be used. In addition to latches 44 securing upper corral rails 42 in their deployed positions, latches 44 may be used to secure upper corral rails 42 in their stowed positions in a similar manner, although it will be appreciated that clips, straps, or other securing devices or fasteners may be used to secure upper corral rails 42 in their stowed positions, along cross-rails 26, prior to raising them with extendable corral rails 18 and cross-rails 26.

Figure 24:
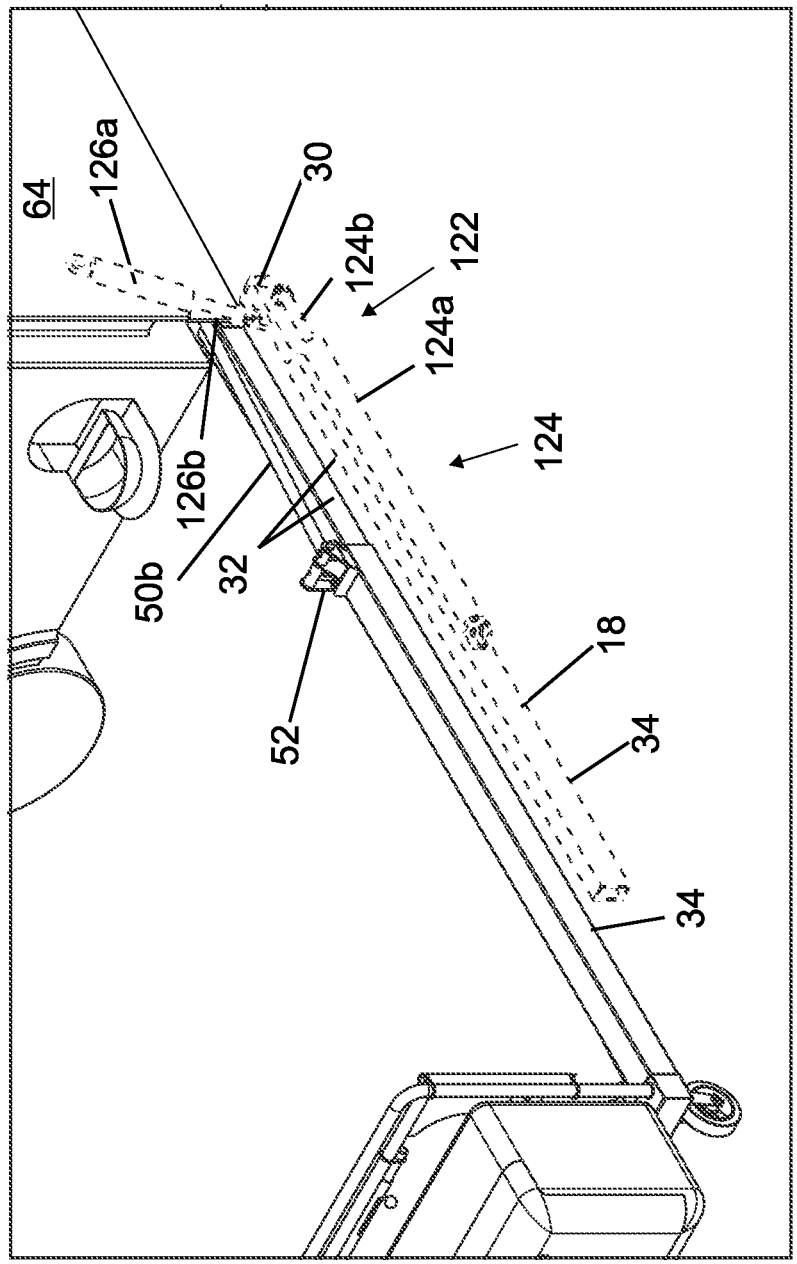
FIG. 24 is a rear perspective view of a transport trailer with superimposed alternative double-cylinder linkage corral deployment and stowage mechanism.

A powered drive system 48 is provided for raising and lowering the deployable corrals 14, as best shown in FIGS. 7 and 14A-14F. Drive system 48 includes a double-acting piston-cylinder 50 operatively coupled to each extendable corral rail 18 and to a lower region of trailer 12. In the illustrated embodiment, piston-cylinders 50 include a pivotally-mounted hydraulic cylinder 50a coupled to trailer 12, which cylinder 50a receives pressurized hydraulic fluid from a motor-driven pump (not shown), and an extendable and retractable piston and associated piston rod 50b that extends laterally outwardly from exterior side panel 22 (or from below or in front of the side panel 22, such as between a forward vertical edge of the side panel and a fairing) and is pivotally coupled to an upward-extending tab 52 at a proximal end of outboard rail portion 34. A pivot arm 53 is coupled to tab 52 and piston rod 50b by a small shaft, as best shown in FIG. 24, and rotates relative to corral rail 18 and piston rod 50b as corral rail 18 pivots up and down. Pivot arm 53 is pivotally coupled to a support leg link 54, which is coupled at its opposite end to an upward-extending tab 56 associated with support legs 36, with support leg link 54 causing support legs 36 to pivot relative to extendable corral rails 18 and cross-rails 26 during raising and lowering of corrals 14, but not during extension and retraction of outboard rail portions 34 relative to inboard rail portions 32.

Figure 14A:
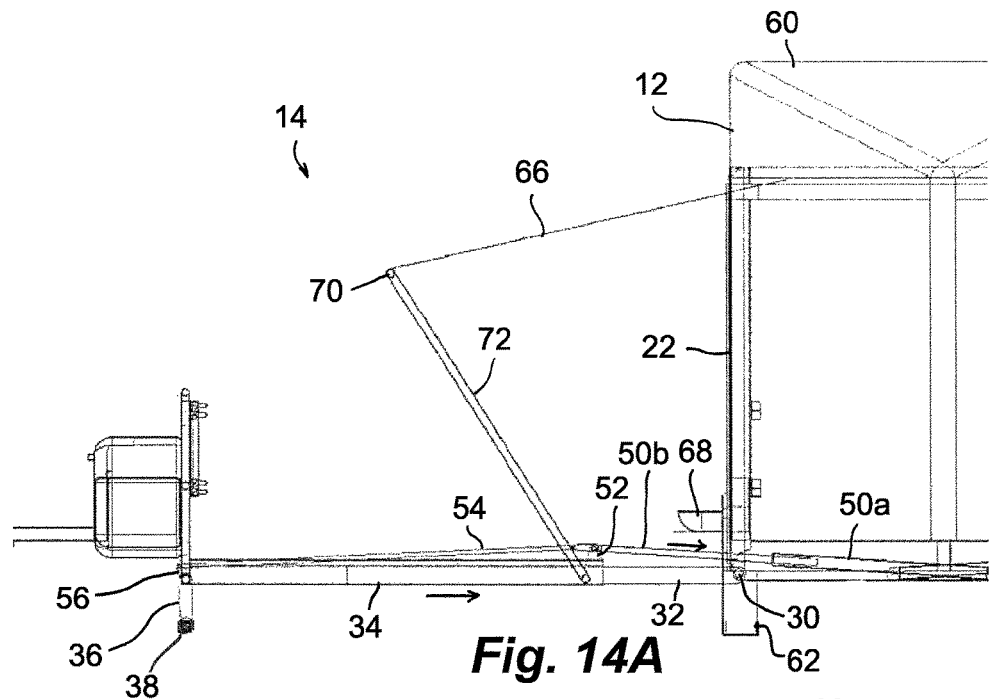
FIGS. 14A-14F are rear elevation transparent line drawings of a left side portion of the transport trailer with deployable corral of FIG. 1, depicting sequential steps of stowing the left side deployable corral.
Figure 14B:
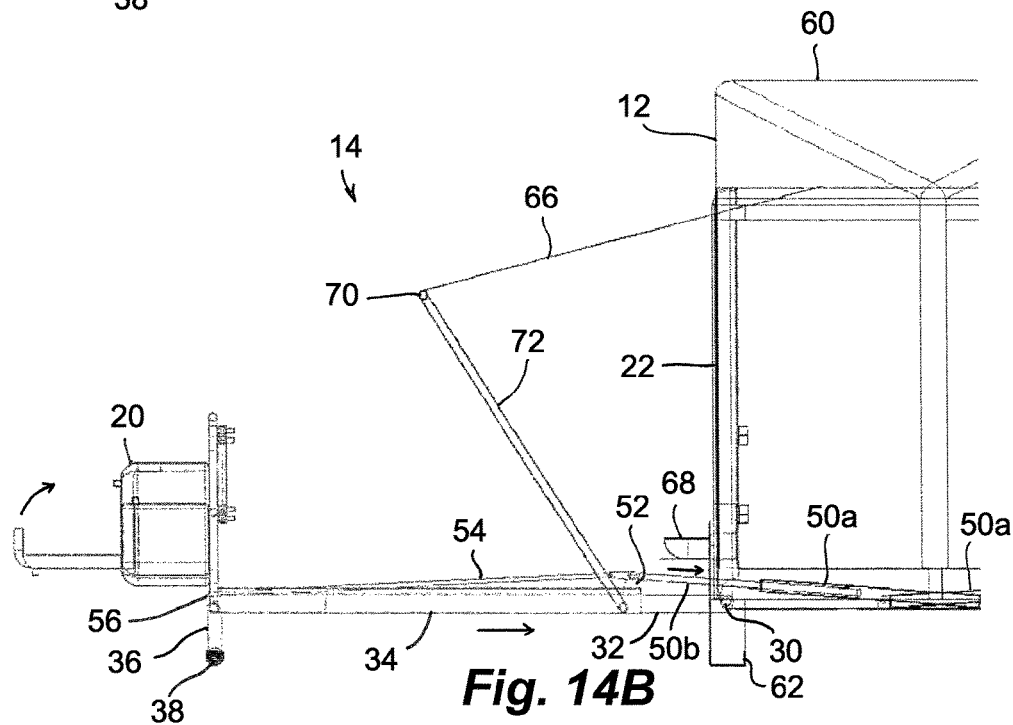
Figure 14C:
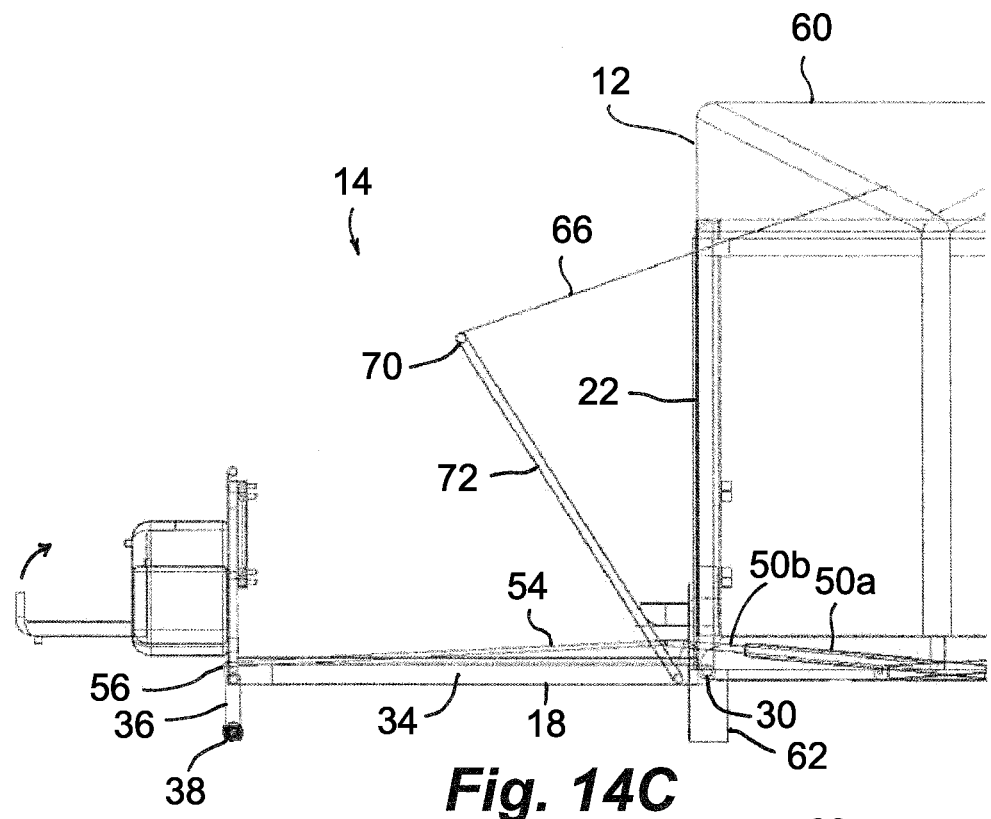
Figure 14D:
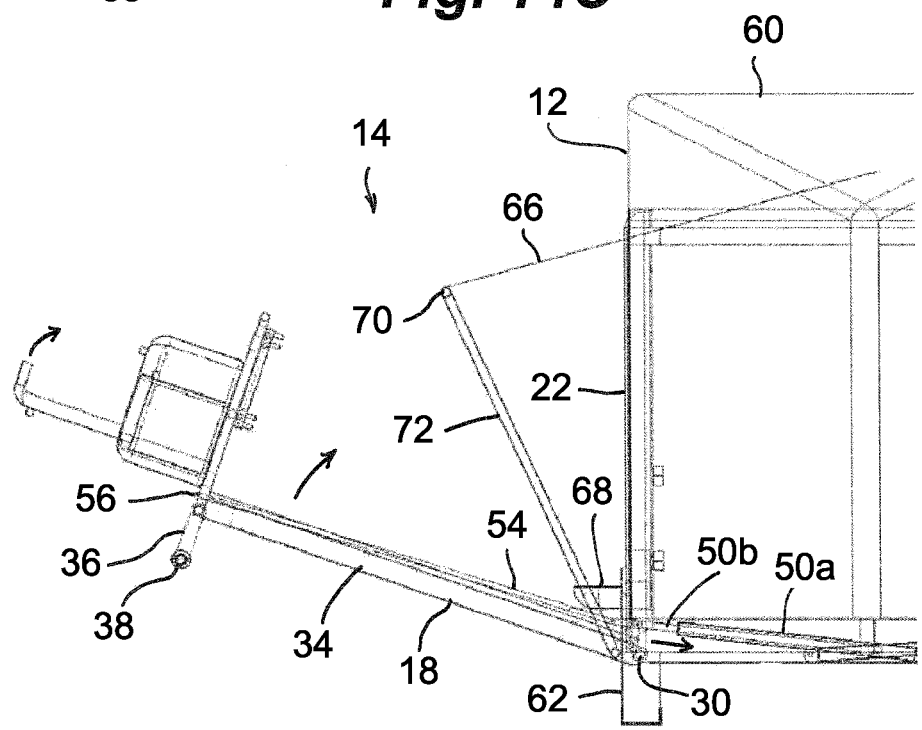
Figure 14E:
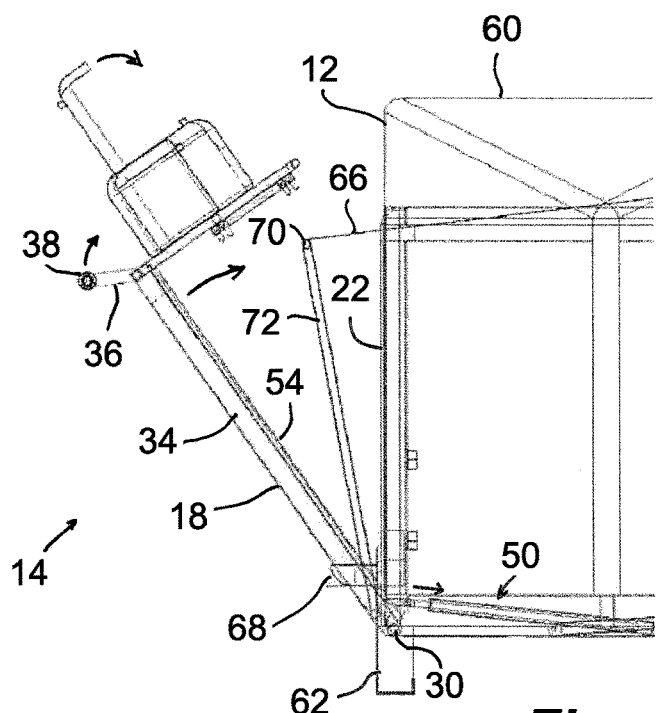
Figure 14F:
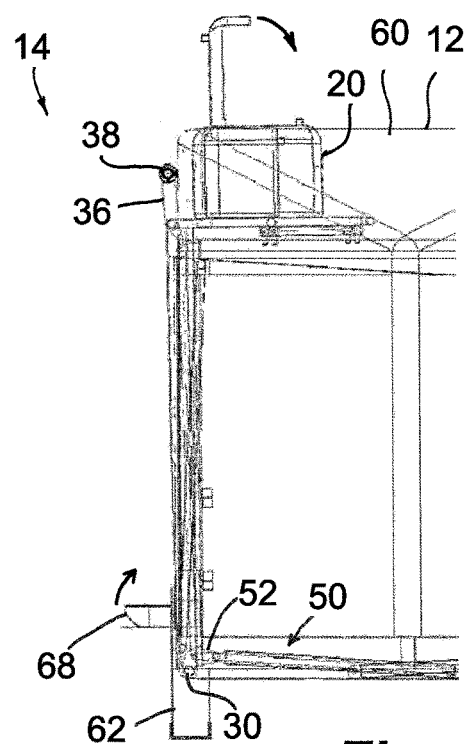

Referring to FIGS. 14A-14F, in which several steps of corral retraction and raising are depicted, from the deployed or fully extended position of FIG. 14A to the stowed or fully retracted position of FIG. 14F, the retraction of outboard rail portion 34 relative to inboard rail portion 32, the pivoting of support legs 36, and the raising of extendable corral rails 18, cross-rails 26, and associated components, are all accomplished by operating piston-cylinder 50 to retract piston rod 50b into cylinder 50a. It will be appreciated that other stowage steps, such as closing lids or covers of storage bins 20, and moving upper corral rails 42 to their stowed positions, may be accomplished manually prior to operating piston-cylinder 50. In addition, various sensors may be provided to ensure that piston-cylinder 50 cannot be operated when upper corral rails 42 are deployed, when swing gate 28 is open, or when lids of storage bins 20 are open or unlocked, to ensure that the corral 14 is ready for retraction before powered drive system 48 is operated.

From the fully extended configuration of FIG. 14A, piston-cylinder 50 is activated to begin drawing piston rod 50b into cylinder 50a and thereby pulling outboard rail portion 34 (via upwardly-extending tab 52) laterally inboard toward trailer 12. This causes outboard rail portion 34 to slide along inboard rail portion 32 while support wheels 38 roll along the ground or other support surface, such as shown in FIG. 14B. Once outboard rail portion 34 is fully retracted (FIG. 14C), extendable corral rails 18 are at their minimum length and further retraction of piston rod 50b causes extendable corral rails 18, cross-rails 26, and attached components to rise in a pivoting manner (FIG. 14D) due to the laterally inward force being applied by piston rod 50b to upwardly-extending tab 52, which is spaced a distance above the fixed rail pivots 30.

As extendable corral rails 18, cross-rails 26, and their attached components continue to pivot upwardly about rail pivots 30, the portions of piston rods 50b that extend beyond tabs 52 (i.e., where support leg links 54 are attached) are pivoted to be closer to extendable corral rails 18 and moved into closer proximity to rail pivots 30. This movement causes support leg links 54 to be moved inward, generally toward rail pivots 30, as extendable corral rails 18 rise upwardly about rail pivots 30, which in turn causes upward-extending tabs 56 to move inwardly toward rail pivots, thus causing the associated support legs 36 to pivot upwardly (clockwise as viewed in FIGS. 14D-14F) until they are substantially parallel to extendable corral rails 18 and extend upwardly once corrals 14 reach their stowed or fully retracted configuration of FIGS. 1-3 and 14F. Deployment of the corrals 14 is accomplished in essentially the reverse order of the retraction steps described above, and may be further understood with reference to FIGS. 8-13.

Figure 30A:
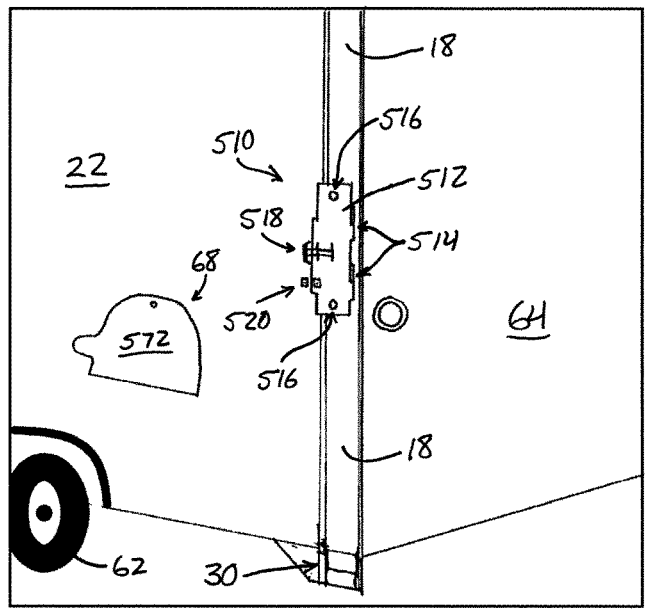
FIGS. 30A-30C are perspective views of a pivotable flap, depicting sequential steps of deploying and stowing the pivotable flap.
Figure 30B:
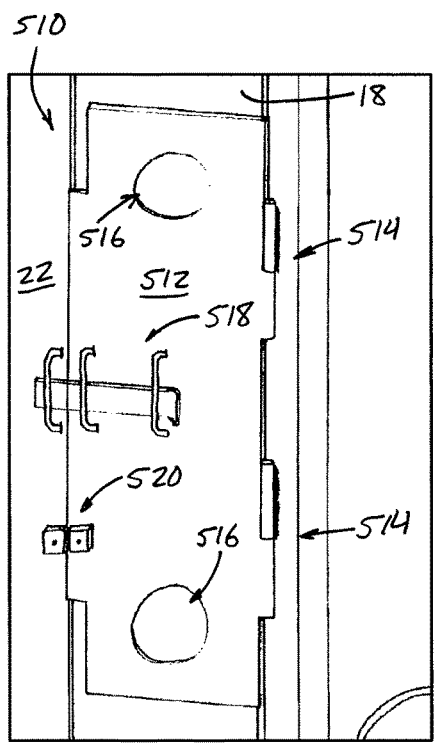
Figure 30C:
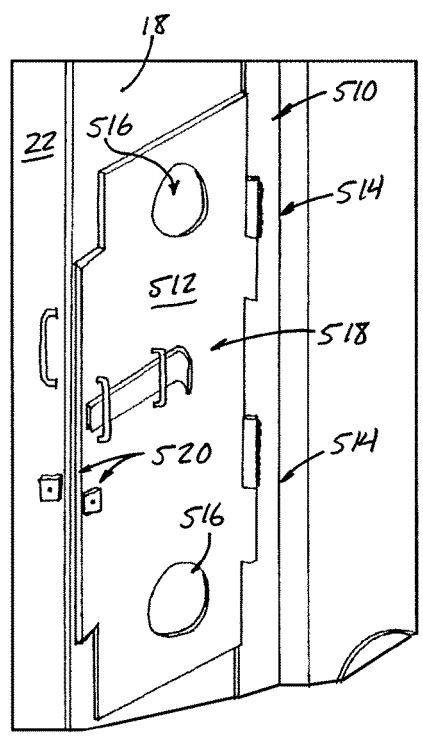

Optionally, and with reference to FIGS. 30A-30C, additional securing members in the form of latches 510 are provided to secure corral rails 18 in their vertical orientations along exterior side panels 22, so that piston-cylinders 50 are not solely relied upon to maintain corrals 14 in their raised and stowed positions during transport. Each latch 510 includes a flap 512 pivotally mounted to the exterior side panel 22 of the trailer 12 via hinges 514. However, it will be appreciated that other types of latch or securing member may be used, such as a slide latch that slides between a blocking or secured position, and an unblocking or released position.

In the illustrated embodiment, each flap 512 defines a pair of support holes 516 that receive and support the distal ends 42b of respective upper corral rails 42 when the upper corral rails are extended toward the trailer 12, such as in the manner described above. Latch 510 further includes a lock mechanism 518, such as a simple slide member, to secure the flap 512 when the latch 510 is in a closed position. Optionally, each latch 510 further includes a position sensor 520 configured to communicate the position of the flap to a user or to a controller. The sensor 520 generates a signal indicative of flap position, such as a warning indicator to warn a user that the corral 14 should not be raised or lowered until the flaps 512 are opened. When a controller is provided, the signals from the sensors 520 can be used to disable the actuators and thereby prevent the deployable corral 14 from extending or retracting unless the flap 512 is indicated to be in an open position.

Referring to FIGS. 4-13, trailer 12 includes vertical recessed channels or recesses 58 at forward and rearward ends of exterior side panels 33. Recessed channels 58 receive extendable corral rails 18 and other components of corrals 14 when corrals 14 are raised, so that corral rails 18 are substantially flush with exterior side panels 22 when corrals 14 are fully stowed. Trailer 12 further includes a forward aerodynamic fairing 60 that extends a sufficient distance upwardly above the trailer's roof panel 24 so as to provide a wind break for storage bins 20, cross-rails 26, swing gate 28, and upper corral rails 42 when these components are all positioned above roof panel 24 for over-the-road transport. Trailer 12 includes other standard components including dual axle wheels 62 and a rear lift gate and ramp 64, which may also be considered an upright wall when closed as shown. Although deployable corrals 14 are shown as being mounted and deployable along the side panels 22 of trailer 12, it will be appreciated that a deployable corral may also (or instead) be fitted at a rear of the trailer, with the rear lift gate and ramp 64 being lowerable into the fenced-in corral space created by the rear-mounted deployable corral, without departing from the spirit and scope of the present invention.

Power drive system 48 may be operated by a pushbutton controller or the like, placed anywhere along the trailer that allows or causes the user to stay clear of the moving components while monitoring their operation to ensure that corrals 14 deploy and stow correctly, and without contact with obstructions. For example, a handheld pendant controller may be connected via wire to the powered components (e.g., electric motor or combustion engine, fluid valves, solenoids, etc.) of drive system 48, and stowed in a storage area when not in use. It is further envisioned that a wireless remote control may be used to operate drive system 48, and/or that a key system may be provided to ensure that only authorized users are able to actuate the system.

In addition, the controller may provide fault or warning messages or other visual or audio indications to the operator in the event that a sensor detects an obstruction or a not-ready indication (e.g., a storage bin 20 left open or upper corral rails 42 locked in the deployed positions when corral 14 is to be raised). Additional functionality may be provided, such as by adding powered actuators to move upper corral rails 42 after extendable corral rails 18 are fully extended, or prior to retraction of the extendable corral rails 18, and automatically sequenced as appropriate so that a single user input can be used to initiate a full extension or retraction sequence. A programmable logic controller (PLC) or the like may be used to facilitate operation and control of the powered drive system 48 as desired.

Optional features of trailer 12 and deployable corrals 14 include a shade awning 66 that is stored in rolled form along an upper edge of each side panel 22, and a retractable feed or water trough 68 that extends outwardly from side panel 22 and retracts into the side panel 22 for transport. Shade awning 66 is a flexible sheet supported on a rotatable spring-loaded or motor-driven spool (not shown) that is mounted in a longitudinal recess 69 (FIG. 1) at each corner where roof panel 24 is nearest to the respective side panel 22. It should be understood that in FIGS. 14A-14E presented herein, shade awning 66 appears as a rigid sheet that appears to pass through other components and does not wind onto a spool, which reflects a limitation in the software used to generate those particular images and should not be taken literally. A distal end of shade awning 66 is mounted to an elongate end support rod 70 that is supported at its opposite ends by a pair of awning support rods 72, which are pivotally mounted at their lower ends to proximal end portions of respective outboard rail portions 34, near upwardly-extending tabs 52. Awning support rods 72 may be spring-biased outwardly away from side panels 22 so that they will act on end support rod 70 to draw shade awning 66 off of its spool and out over at least a portion of fenced-in corral space 16 as the spool unwinds the shade awning (FIGS. 6-13). The unwinding and rewinding of shade awning 66 may be accomplished manually, or in a self-powered manner such as in response to an extend/retract switch or control. When shade awning 66 and extendable corral rails 18 are retracted, awning support rods 72 recess into vertical recessed channels 58 alongside corral rails 18, for unobtrusive storage.

Water troughs 68 may be manually unlatched and pulled down to deploy when corrals 14 are in use (FIGS. 4-7, 11-14A, 29A-29D), and manually raised and re-latched to stow for transport when corrals (14) are not in use (FIGS. 1-3, 8-10, 29B and 29D). However, it is envisioned that water troughs 68 may be raised and lowered in a powered manner, such as in response to a pushbutton control, and may be raised and lowered automatically in response to retracting and extending of the corrals. For example, powered deployment and retraction of troughs 68 may be sequenced automatically with other deployment and retraction steps or functions associated with corral 14, as described above. Water troughs 68 may also be deployed independently of corrals 14, such as to provide water for livestock that are tied to trailer 12 or that are free to roam around the trailer when the corrals 14 are not deployed. Water may be added to each trough 68 from an on-board water reservoir stored on trailer 12, such as by a pump or gravity feed, or may be added from an external source such as a bucket or hose. It is envisioned that troughs may be drained of water through a drain opening or valve prior to stowage, or may simply be stowed with water still present, such that the water spills out as the trough 68 is lifted and tilted up to its stowed position.

Water troughs 68 include a pivotably deployable trough vessel 568, a pivotable hinge mount 570, an exterior panel 572, and a hinge mounting plate 574. Optionally, the water trough 68 includes a fill port 576 that is configured to receive a water line used to fill the trough vessel 568. When deployed, the trough vessel 568 may be filled using a water line (not shown) extending between fill port 576 and a plumbing system of the trailer. This allows that trough vessel 568 to be filled from a water tank (not shown) contained within the trailer, with gravity-feed or a pump arrangement used to supply water pressure, and a valve (not shown) provided to selectively fill the vessel 568. The valve may be accessed through a cutaway portion 582 formed in the trailer side panel 22. Optionally, the trough vessels 568 may be manually filled with a bucket or external hose. A water drainage pathway may be provided within the trailer's side panel 22, so that any water remaining in the vessel 568 can simply spill down through the side panel 22 and onto the ground when the vessel 568 is pivoted up to its stowed configuration. Optionally, the water trough 68 includes a lock or latch 578 disposed on the exterior panel 572 to secure the water trough 68 while in a stowed configuration. The exterior panel 572 may include a cover portion 580 configured to cover the cutaway portion 582 of the side panel 22. The cutaway portion 582 is configured to allow the fill port 576 and a portion of the associated water line to pass through the trailer side panel 22 when the water trough 68 is pivoted between configurations.

Figure 4:
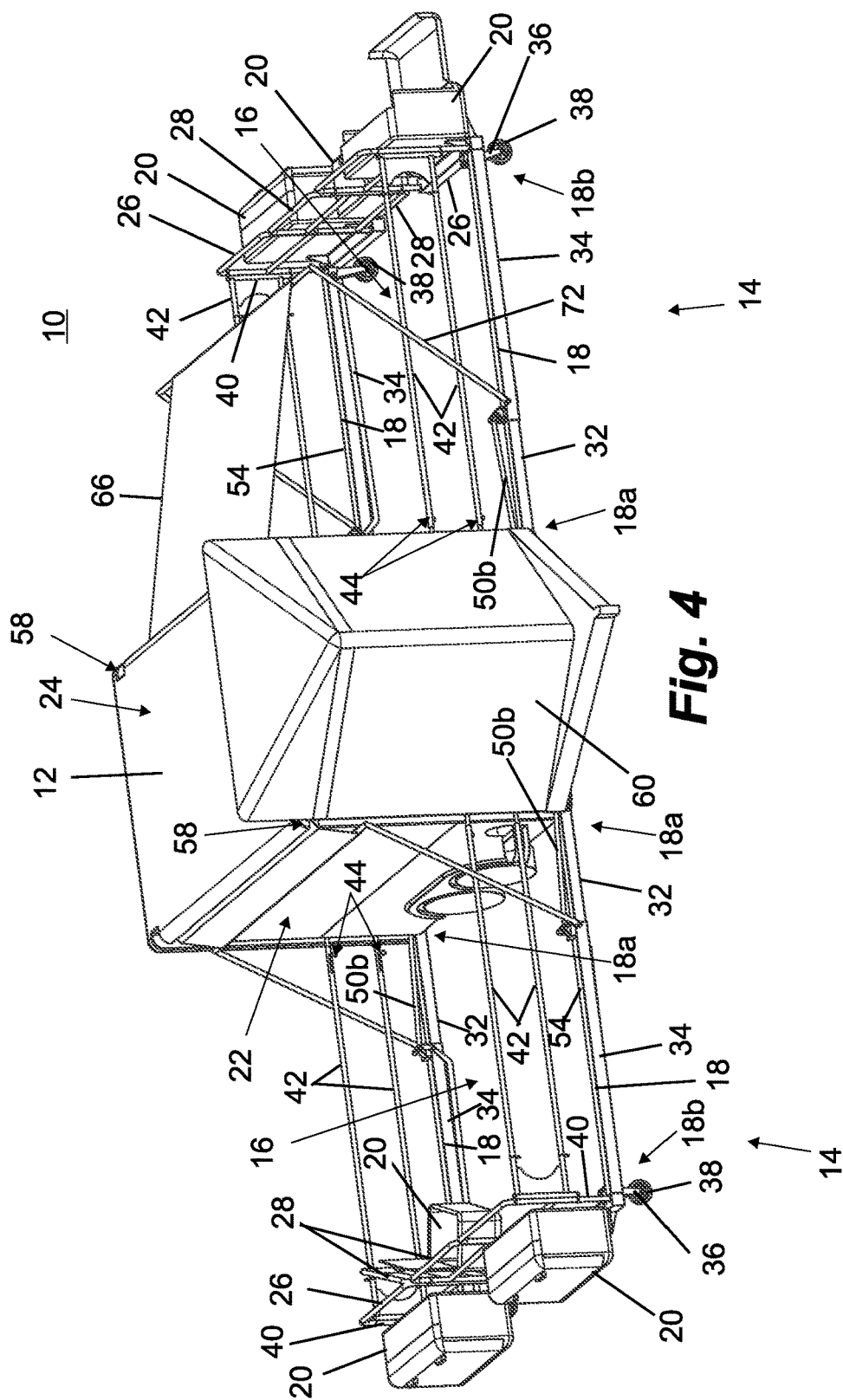
FIG. 4 is another front perspective view of the transport trailer with deployable corral, shown with two corrals in their respective deployed configurations.
Figure 5:
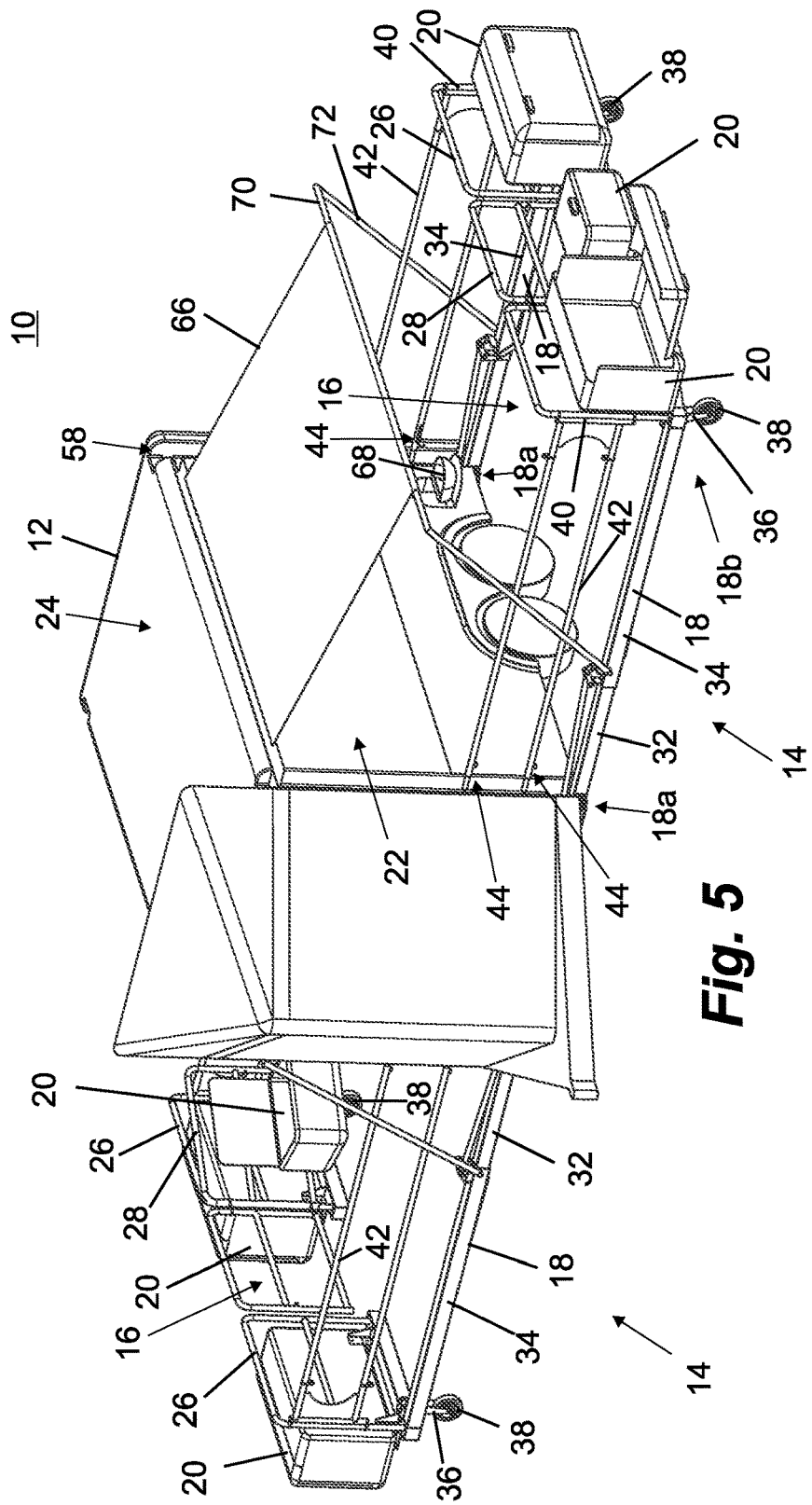
FIG. 5 is another front perspective view of the transport trailer with deployable corral of FIG. 4.
Figure 6:
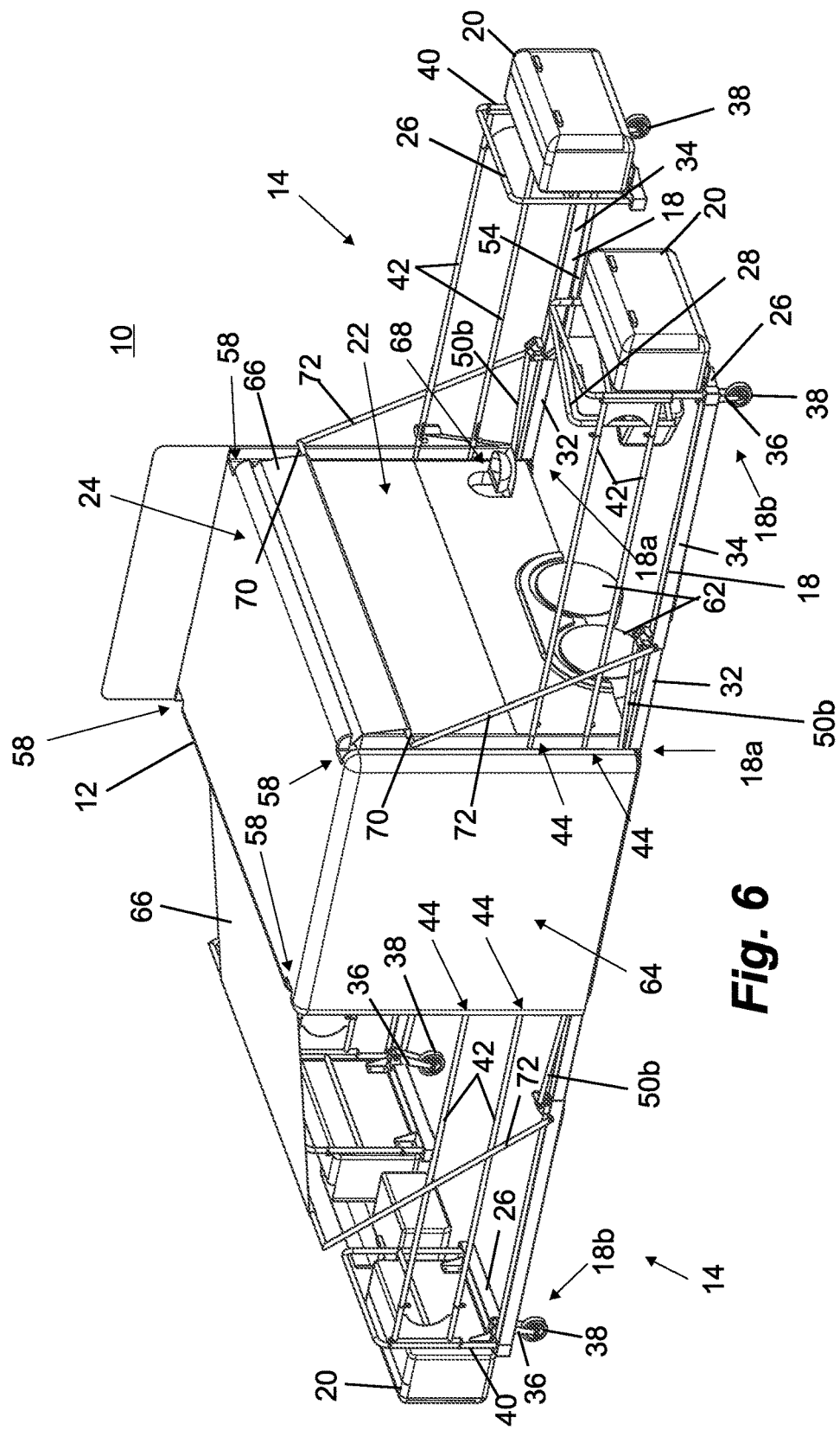
FIG. 6 is a rear perspective view of the transport trailer with deployable corral of FIG. 4.
Figure 7:
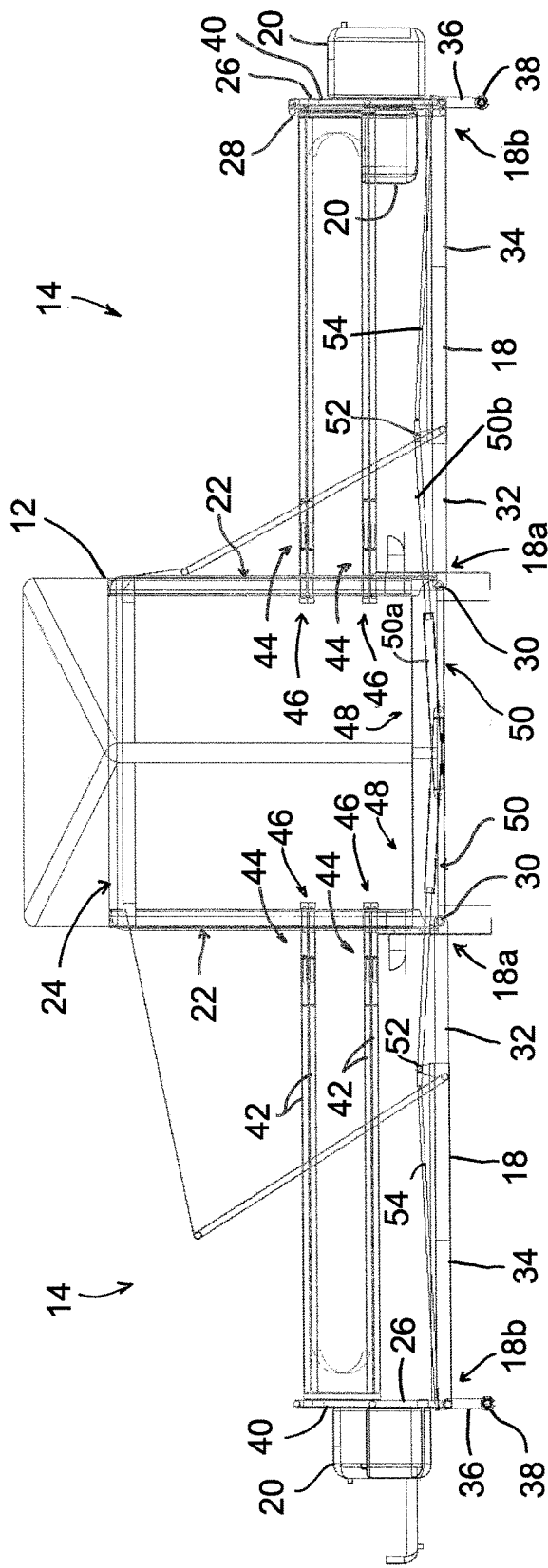
FIG. 7 is a rear elevation transparent line drawing of the transport trailer with deployable corral of FIG. 4.
Figure 8:
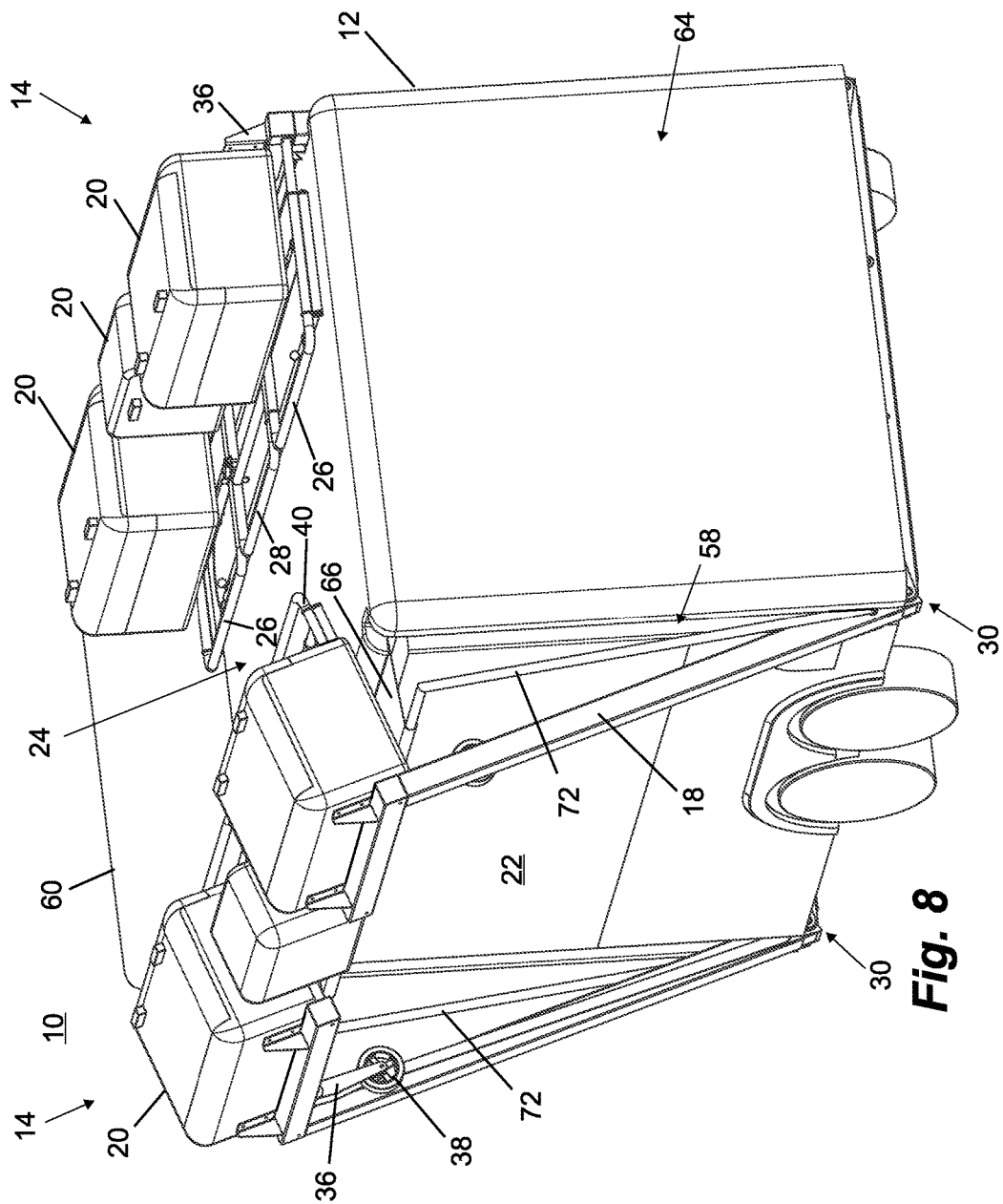
FIGS. 8-13 are left-rear perspective views of the transport trailer with deployable corral of FIG. 1, depicting sequential steps of deploying the left side deployable corral.
Figure 9:
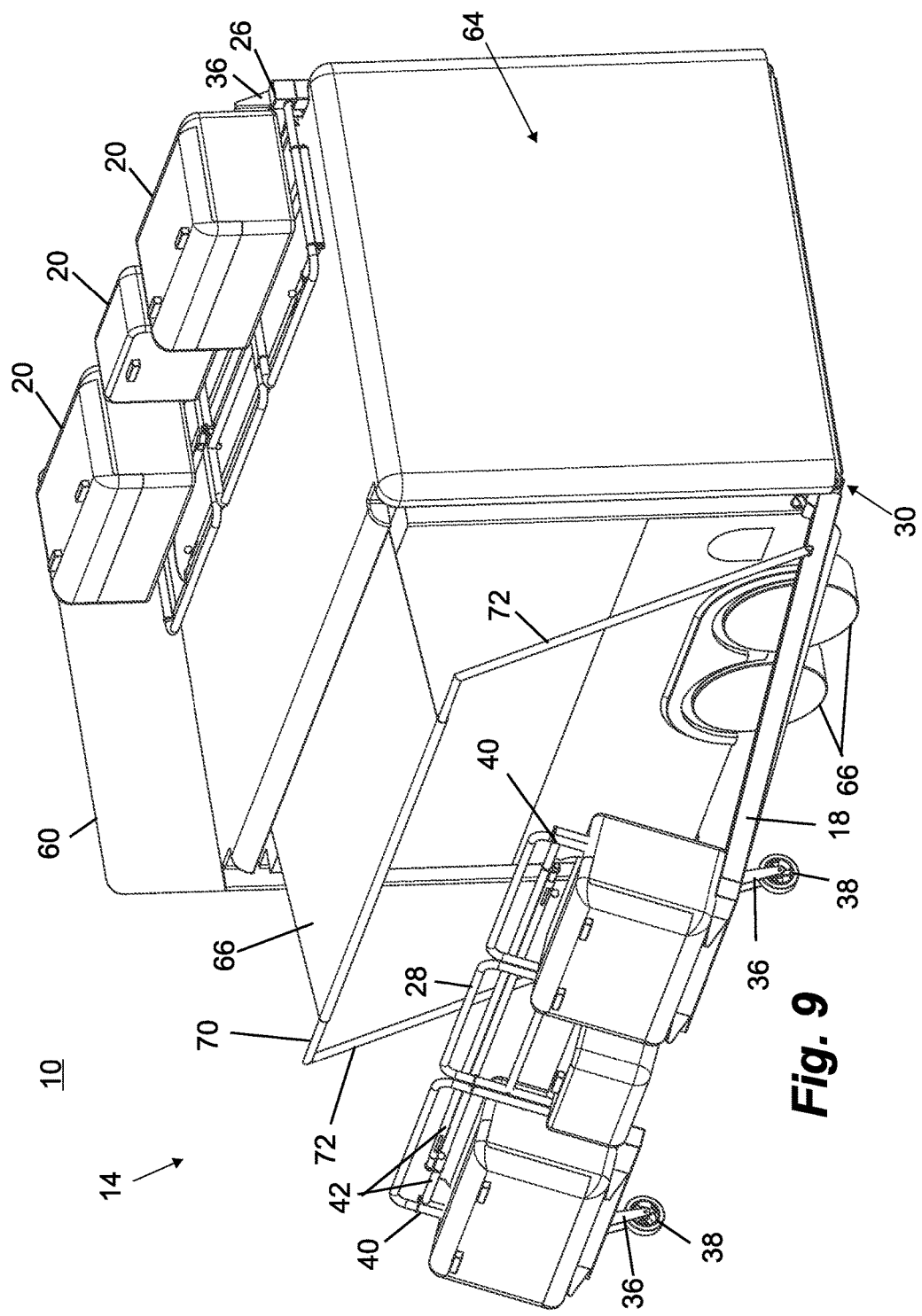
Figure 10:
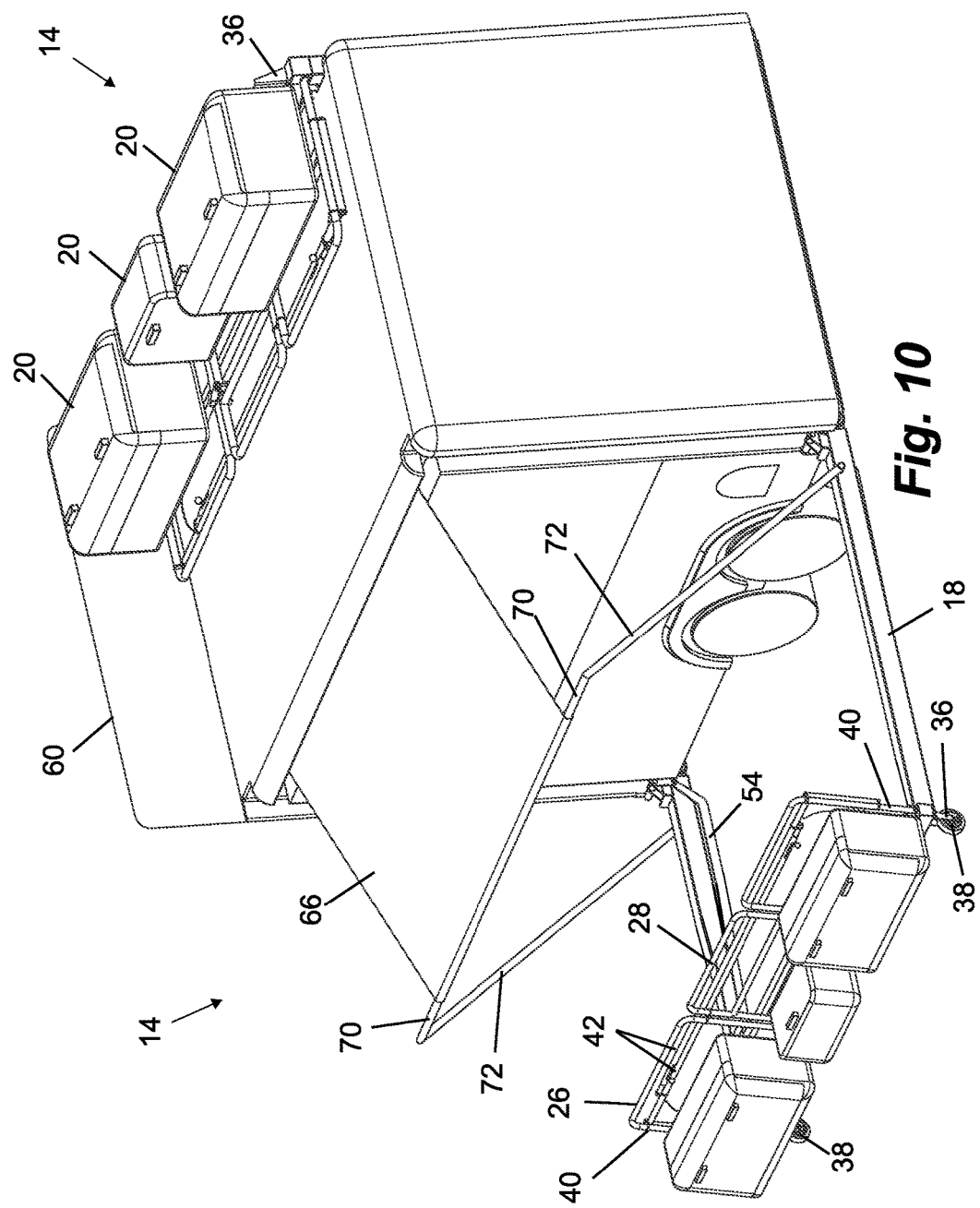
Figure 11:
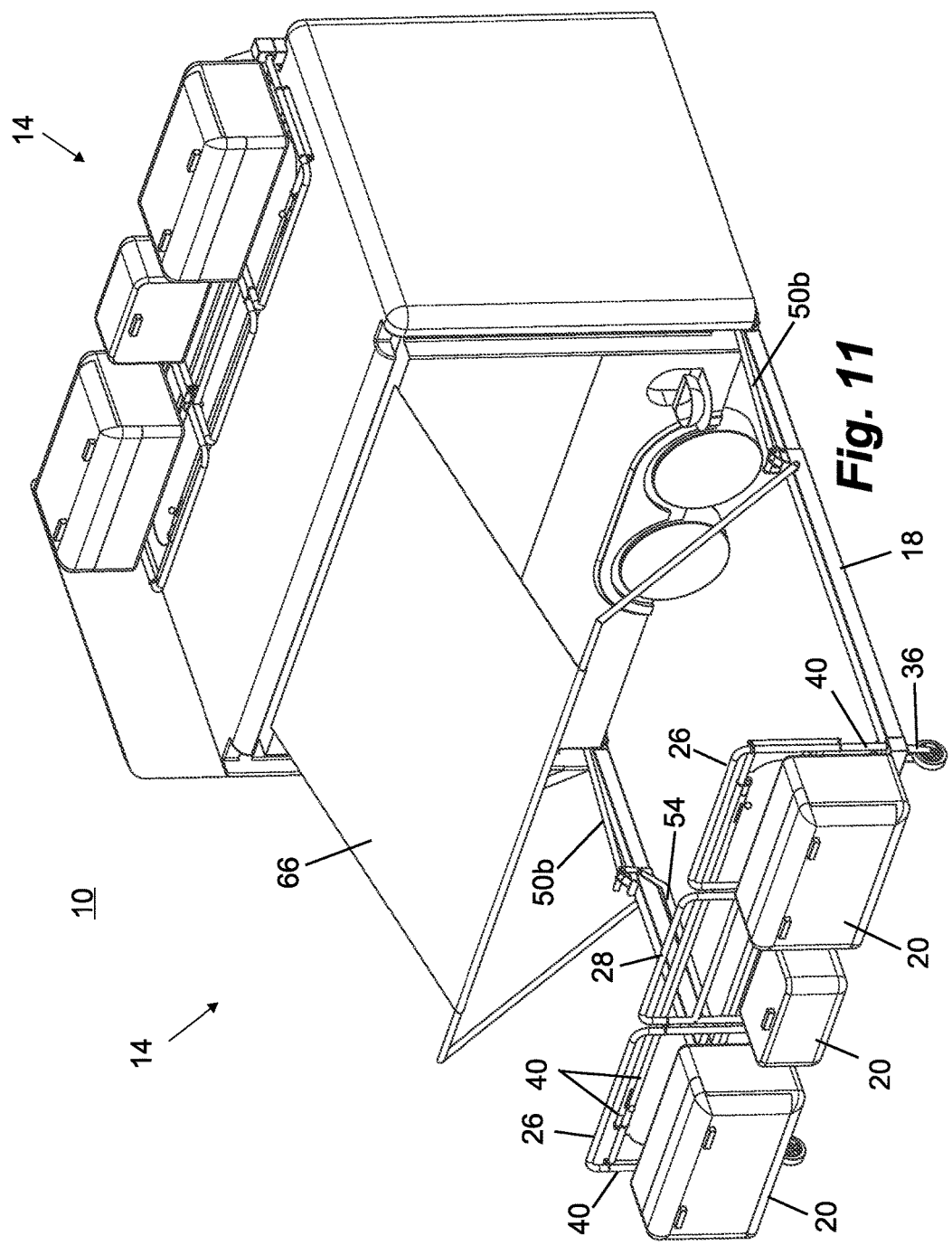
Figure 15:
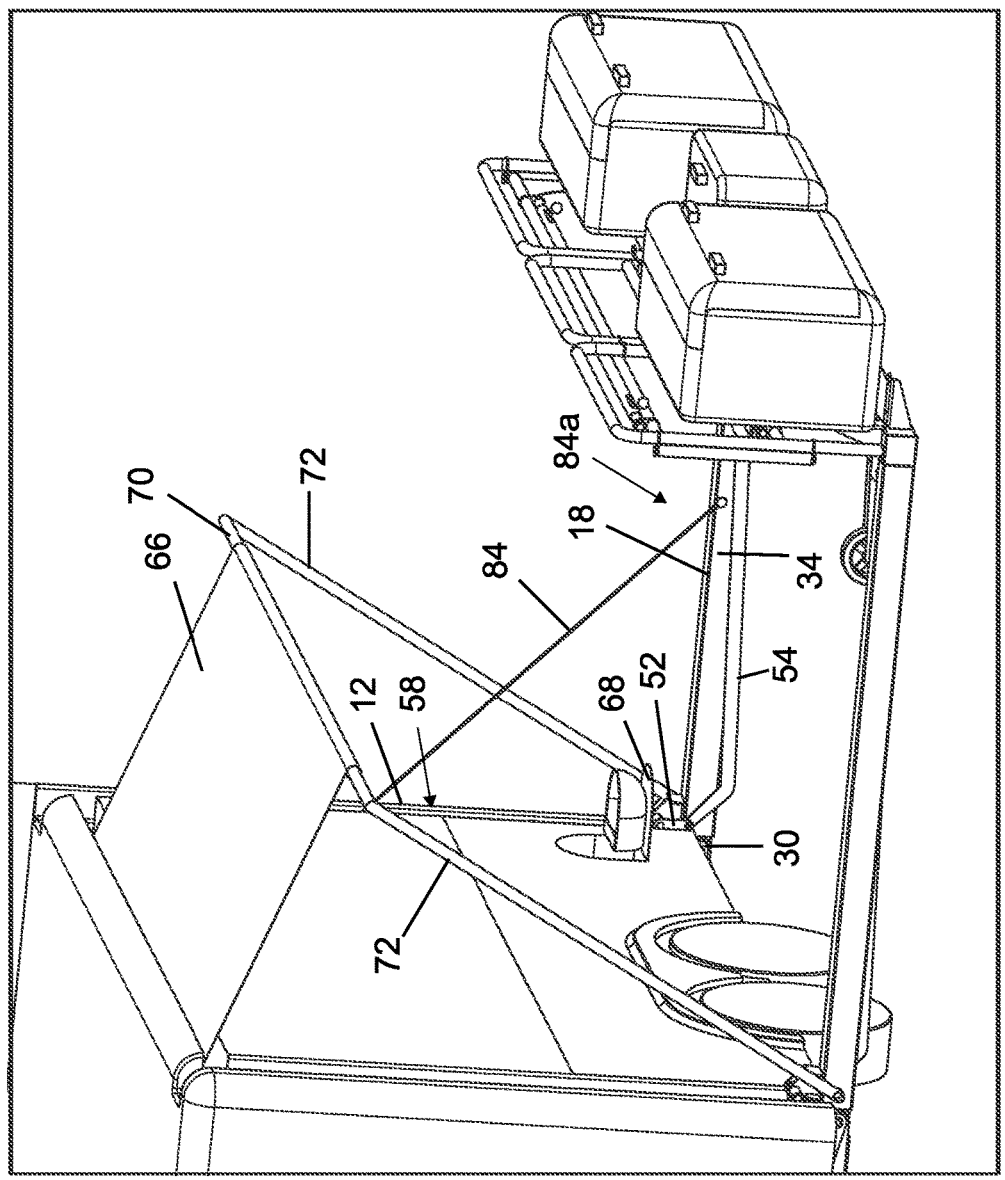
FIG. 15 is a left side perspective view of an alternative cable-drive corral deployment and stowage mechanism for a transport trailer in accordance with the present invention, taken from a forward viewpoint.
Figure 16:
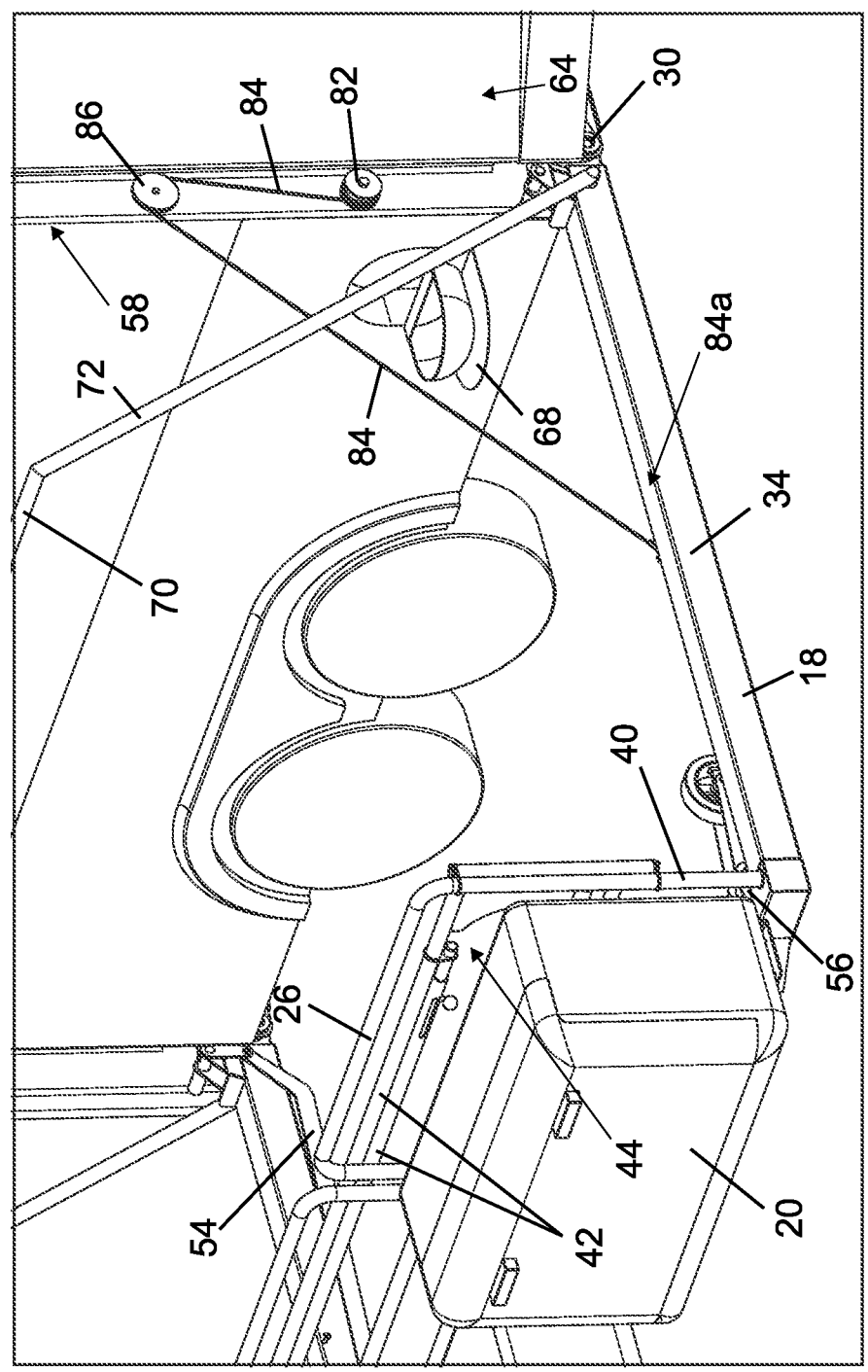
FIG. 16 is another left side perspective view of the alternative cable-drive corral deployment and stowage mechanism of FIG. 15, taken from a rearward viewpoint.
Figure 17:
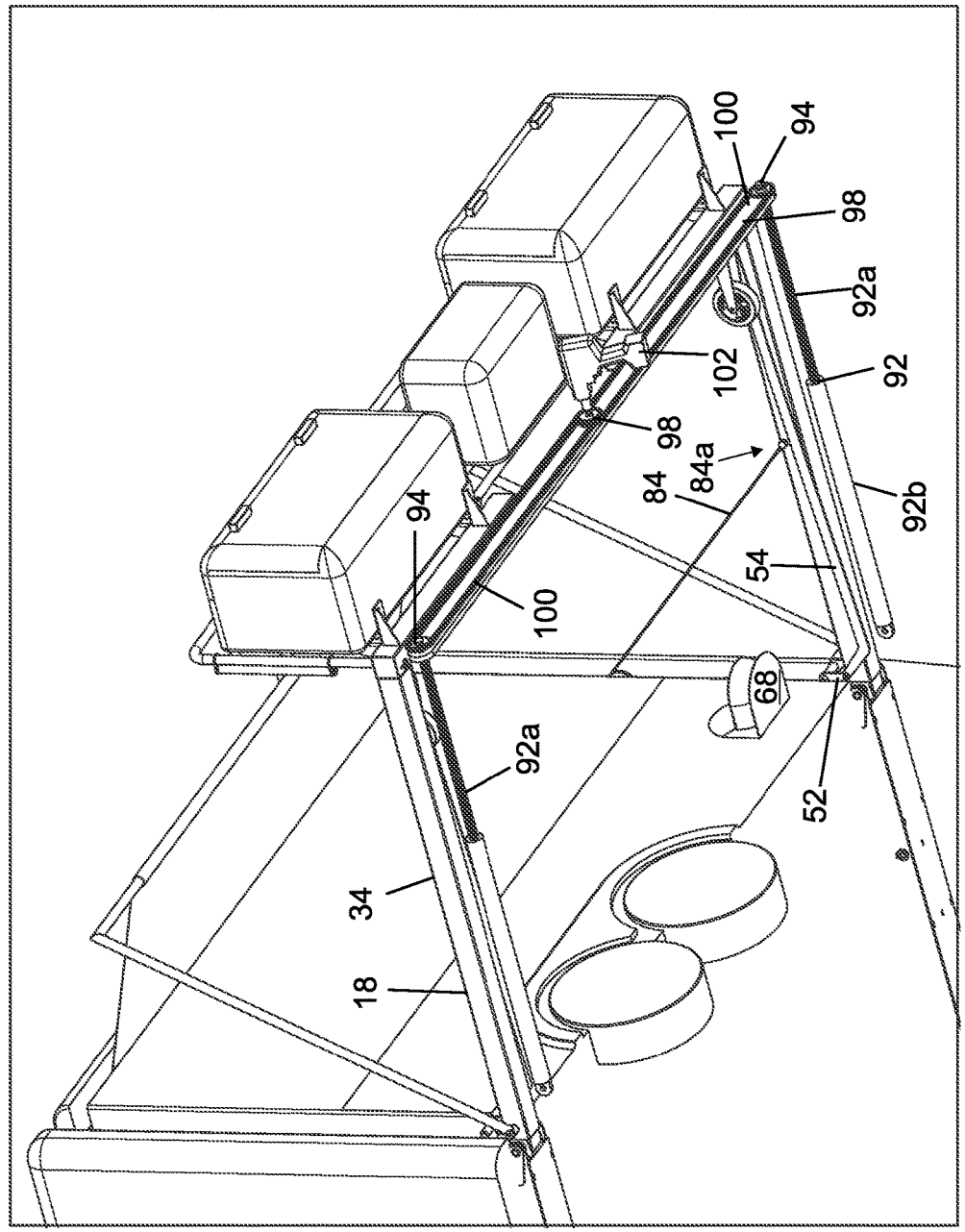
FIG. 17 is a left side perspective view of an alternative corral extension and retraction mechanism, taken from a lower viewpoint.

In addition to water troughs 68 that provide water to livestock in the fenced-in space 16 defined by a given corral 14, animal feed may be made available to the livestock from one of storage bins 20, such as the central storage bin mounted to swing gate 28. Referring to FIGS. 4 and 5, when swing gate 28 is open, fenced-in space 16 is accessible from outside the corral and the storage bin 20 that is supported on swing gate 28 is made accessible to livestock in the fenced-in space 16. However, because having swing gate 28 open leaves an opening to fenced-in space 16, it would be desirable to provide a cable or a second swing gate or other temporary closure between the cross-rails 26 while swing gate 28 is open, to limit or prevent livestock from exiting the fenced-in space 16. Alternatively, the storage bin 20 can be moved to the inward-facing side of either of the cross-rails 26 or the swing gate 28 (with swing gate 28 closed) to provide livestock with access to the contents of the bin. Although the central-mounted storage bin 20 that is mounted on swing gate 28 is described as being available for storage of animal feed and providing livestock with access to the feed as desired, it will be appreciated that the central-mounted storage bin 20 may also provide a convenient receptacle for bedding and other waste materials that a user may wish to remove from the fenced-in space 16 prior to retracting and stowing corrals 14. It will be appreciated that the principles of the cargo transport or livestock trailer with deployable corral system may be accomplished in different ways, and are not limited to those described hereinabove. For example, it is envisioned that the corral system may be retrofitted to existing livestock trailers using bolt-on components and with little modification to the trailer, albeit perhaps with a less compact stowed configuration. In addition, torsion springs, gas struts, or the like may be used to reduce the loads that must be lifted by the powered drive system. By further example, and with reference to FIGS. 15-18, an alternative cable-operated powered drive system 80 may have potentially lower weight and cost as compared to hydraulic drive system 48. Cable-operated system 80 includes a drive spool or pulley 82 at a lower region of vertical recessed channel 58, with a flexible cable 84 wound around pulley or spool 82 (FIG. 16). Cable 84 extends upwardly to an idler pulley 86 and then has a distal end 84*a* coupled to extendable corral rail 18, such as approximately mid-way along outboard rail portion 34 (FIGS. 15 and 17). Drive pulley 82 is turned by a motor (not shown) in a first direction to unwind cable 84 and lower extendable corral rails 18, and is turned in a second, opposite direction to wind cable 84 onto pulley 82 and draw the corral rails 18 up and into vertical recessed channels 58 to stow the corrals. Although idler pulley 86 could be eliminated by placing the drive pulley 82 in its location, the use of an elevated idler pulley facilitates placement of the motor associated with drive pulley 82 at a lower and less obtrusive location near the other mechanisms, including water trough 68. In addition, cable-operated system 80 can readily accommodate a manual override feature for use in the event of a drained battery or other power system failure, such as by allowing use of a wrench or hand-crank to turn the drive spool or pulley 82.

Figure 18:
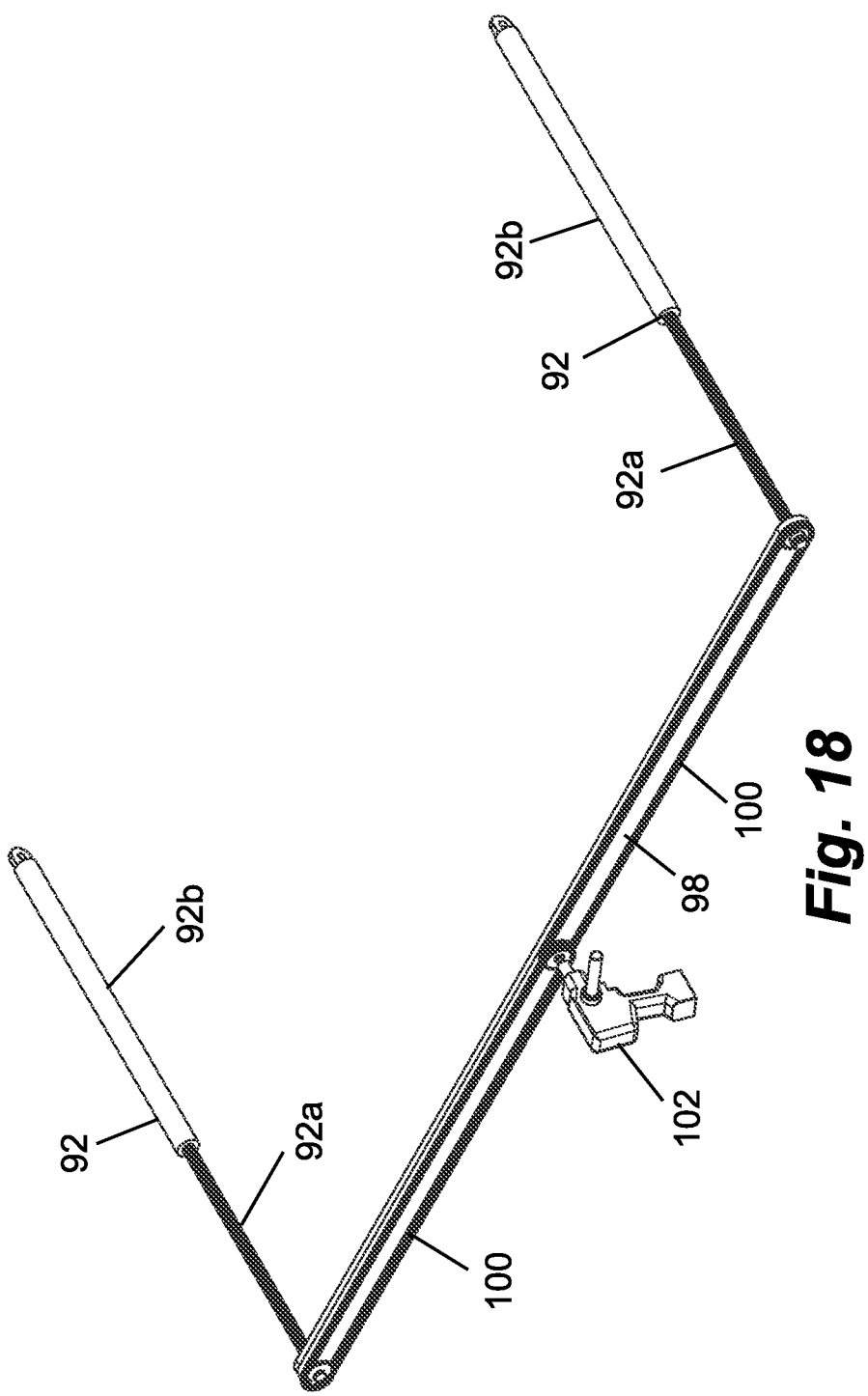
FIG. 18 is a left side perspective view of a portion of the alternative corral extension and retraction mechanism of FIG. 17.

In the illustrated embodiment of FIGS. 15-18, cable-operated system 80 is not capable of extending and retracting outboard rail portions 34 relative to inboard rail portions 32. However, such extension and retraction may be accomplished with a corral rail extension system 90 that utilizes a pair of leadscrews 92 disposed along respective corral rails 18, such as shown in FIGS. 17 and 18. Leadscrews 92 may be conventional in that they include a threaded shaft 92*a* and a threaded nut or collar (mounted inside an elongate cylinder 92*b*) arranged so that the shaft 92*a* extends and retracts longitudinally relative to the cylinder 92*b* upon rotation of the shaft 92*a*. In the arrangement of FIGS. 17 and 18, each shaft 92*a* has a driven gear or pulley 94 at its distal end, which driven gears or pulleys 94 are located at a distal or outboard end of each corral rail 18 and are operatively coupled to respective outboard rail portions 34. A drive gear or pulley 96 is centrally located between the driven gears or pulleys 94, with the three drive gears or pulleys 94, 94, 96 all rotatably mounted on a cross-beam 98 that extends generally between the distal ends of the corral rails 18.

A pair of endless flexible drive members in the form of drive chains or belts 100 extend around drive gear or pulley 96 and around respective ones of the driven gears or pulleys 94, so that rotation of the drive gear or pulley 96 causes both driven gears or pulleys 94 to rotate in a synchronized manner. This causes each leadscrew shaft 92*a* to rotate in a synchronized manner, thus causing leadscrews 92 to move outboard rail portions 34 inwardly or outwardly depending on the direction of rotation. In the illustrated embodiment, drive gear or pulley 96 includes a central drive shaft that is configured to be engaged and rotatably driven by a separate tool such as a cordless power drill 102, or by a manual tool such as a wrench or screwdriver, or the drive shaft may be fitted with a manual knob or crank that can be grasped and rotated by hand. Optionally, and to provide unobstructed access to the fenced-in area 16 through swing gate 28 when opened, cross-beam 98 and gears or pulleys 94, 96 may be readily detachable from the ends of leadscrew shafts 92*a*, which may be journaled in respective support bearings or bushings connected to outboard rail portions 34.

Figure 19:
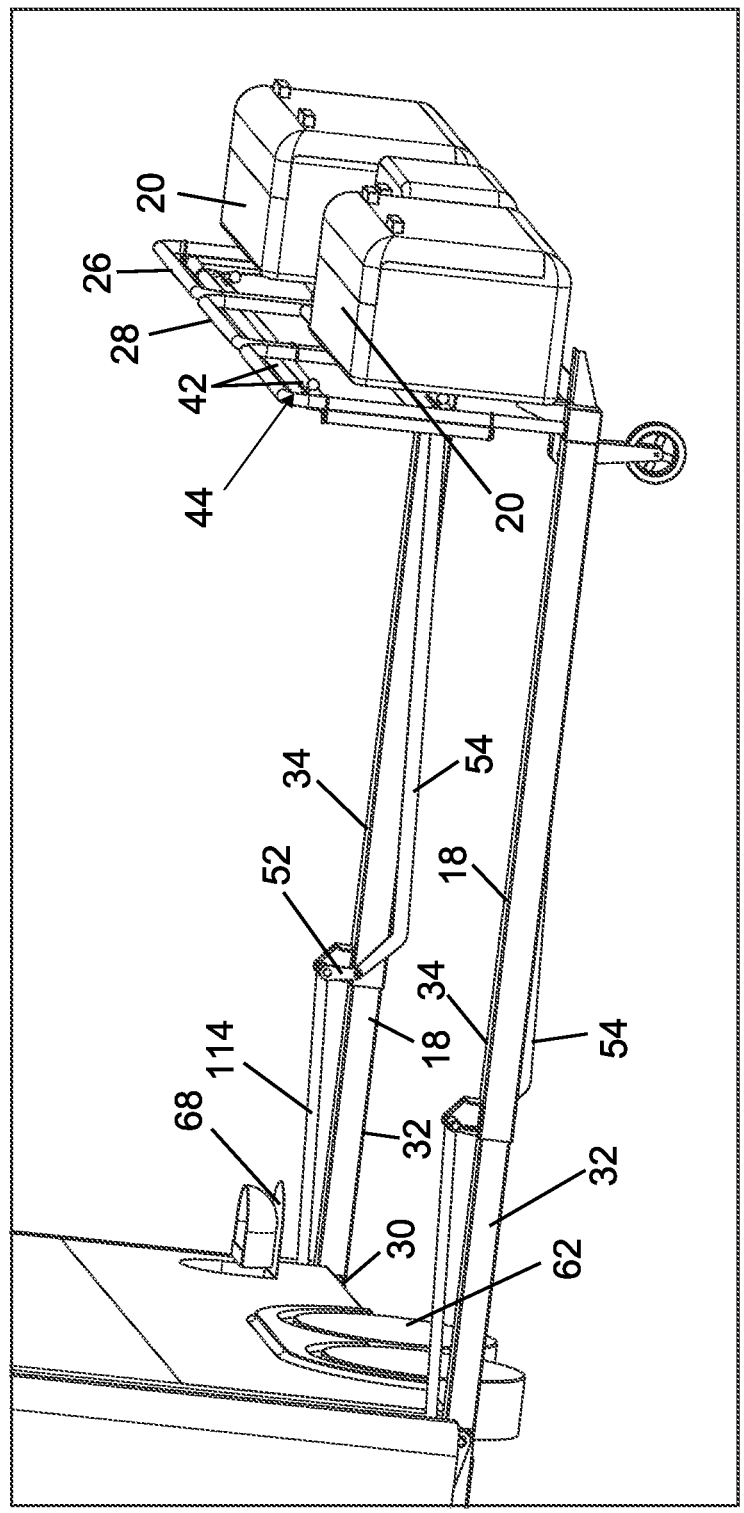
FIG. 19 is a left side perspective view of an alternative leadscrew-drive corral deployment and stowage mechanism for a transport trailer in accordance with the present invention, taken from a forward viewpoint.
Figure 20:
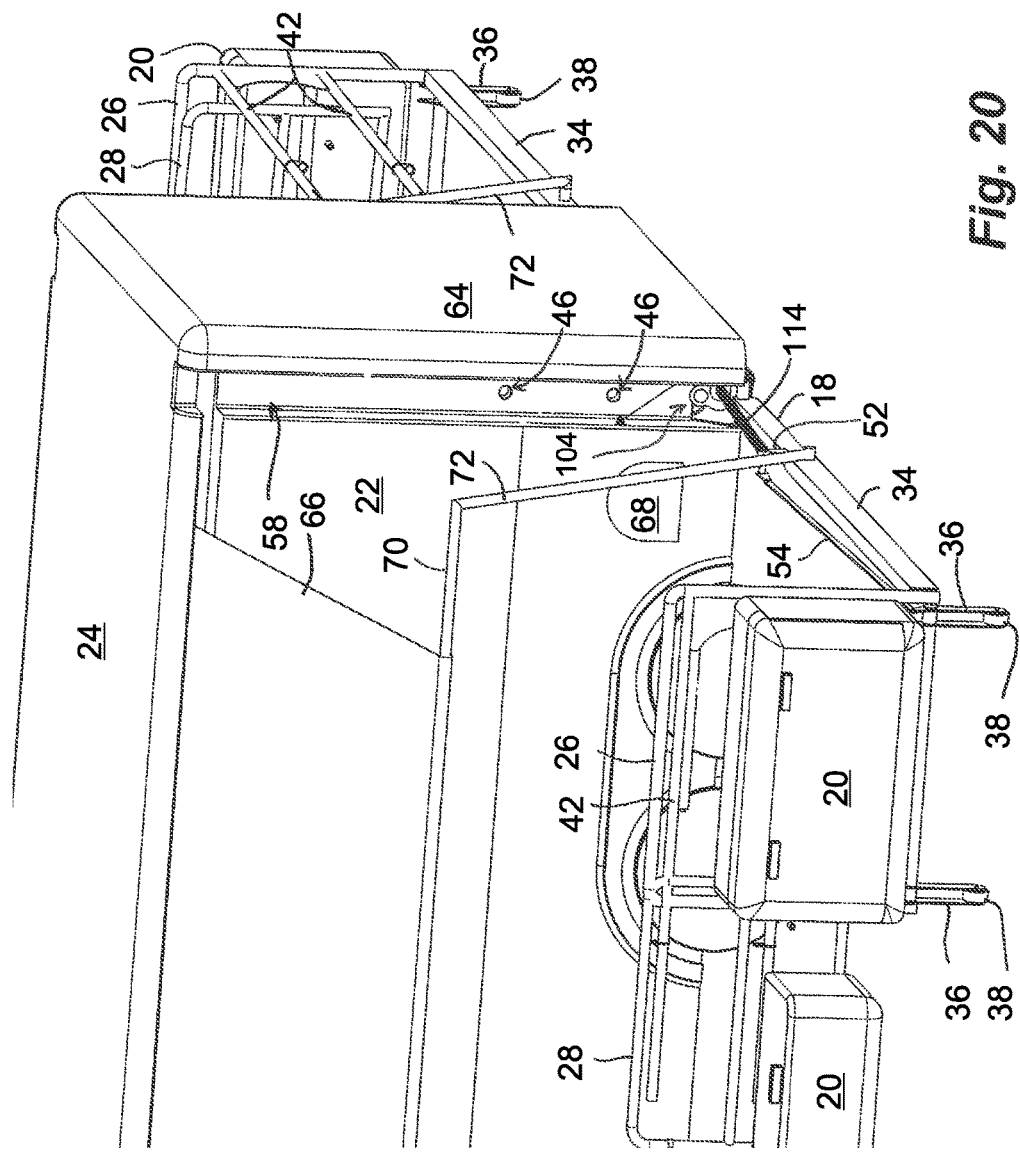
FIG. 20 is another left side perspective view of the alternative leadscrew-drive corral deployment and stowage mechanism of FIG. 19, taken from a rearward viewpoint.
Figure 21:
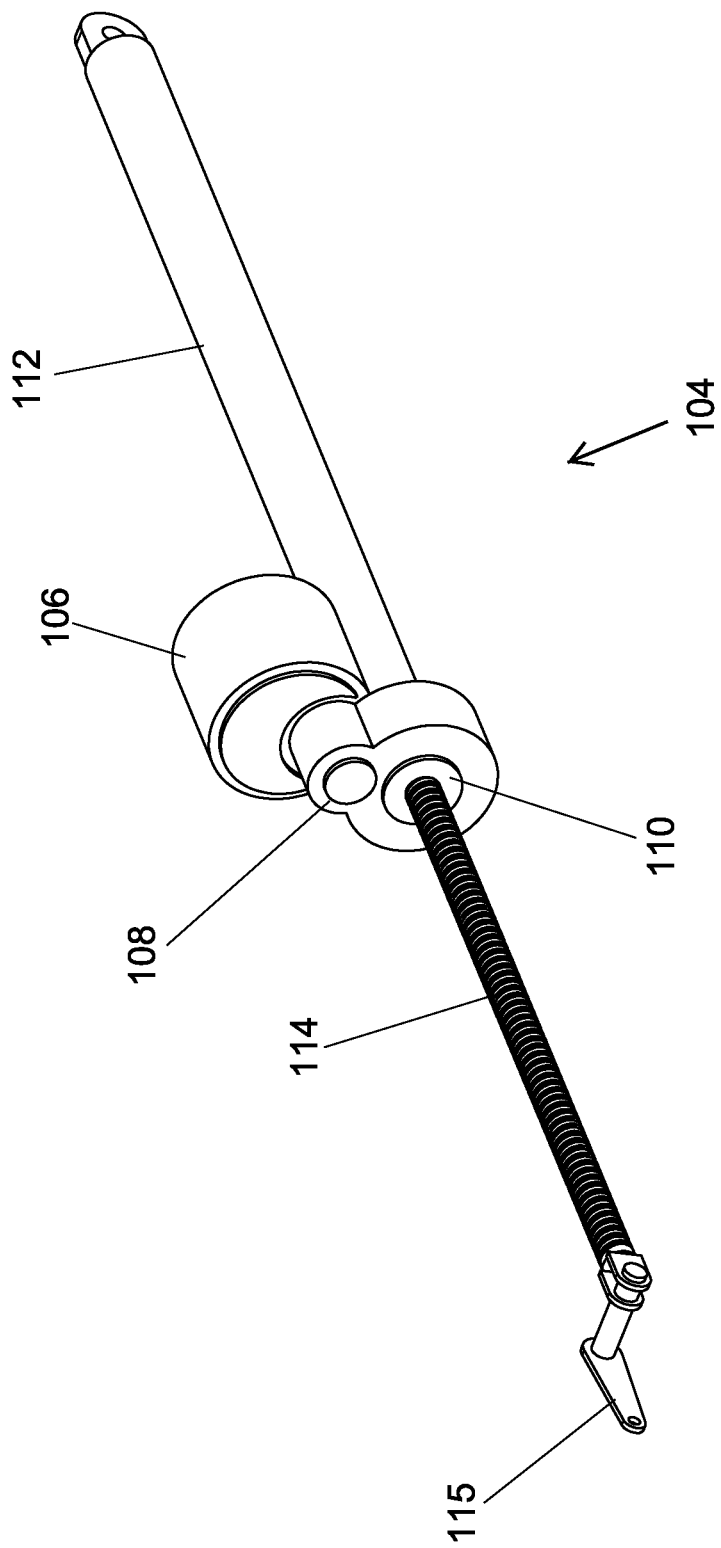
FIG. 21 is a perspective transparency line drawing of the leadscrew-drive of FIGS. 19 and 20.

In the illustrated embodiment of FIGS. 19-21, a powered leadscrew 104 is substituted for piston-cylinder 50 of powered drive system 48, described above. Powered leadscrews 104 act upon extendable corral rails 18 through upward-extending tabs 52 in substantially the same way that piston-cylinder 50 operates, but it will be appreciated that powered leadscrews 104 can eliminate the need for a hydraulic pump and associated motor, instead utilizing a relatively compact drive motor 106 that may be electrically (or hydraulically) energized, a gear train reduction 108, and a rotatably driven nut or collar 110, such as shown in FIG. 21. A cylindrical housing 112 is pivotally mounted to trailer 12 in substantially the same manner that cylinder 50*a* would be mounted, and receives a proximal portion of a threaded shaft 114 that attaches to tab 52 and extends and retracts in response to the activation of motor 106 to drive the nut or collar 110 that engages shaft 114. Powered leadscrew 104 may be modified to accommodate a manual override feature, such as by allowing use of a wrench or hand-crank 115 to turn the threaded nut or collar 110.

Figure 22:
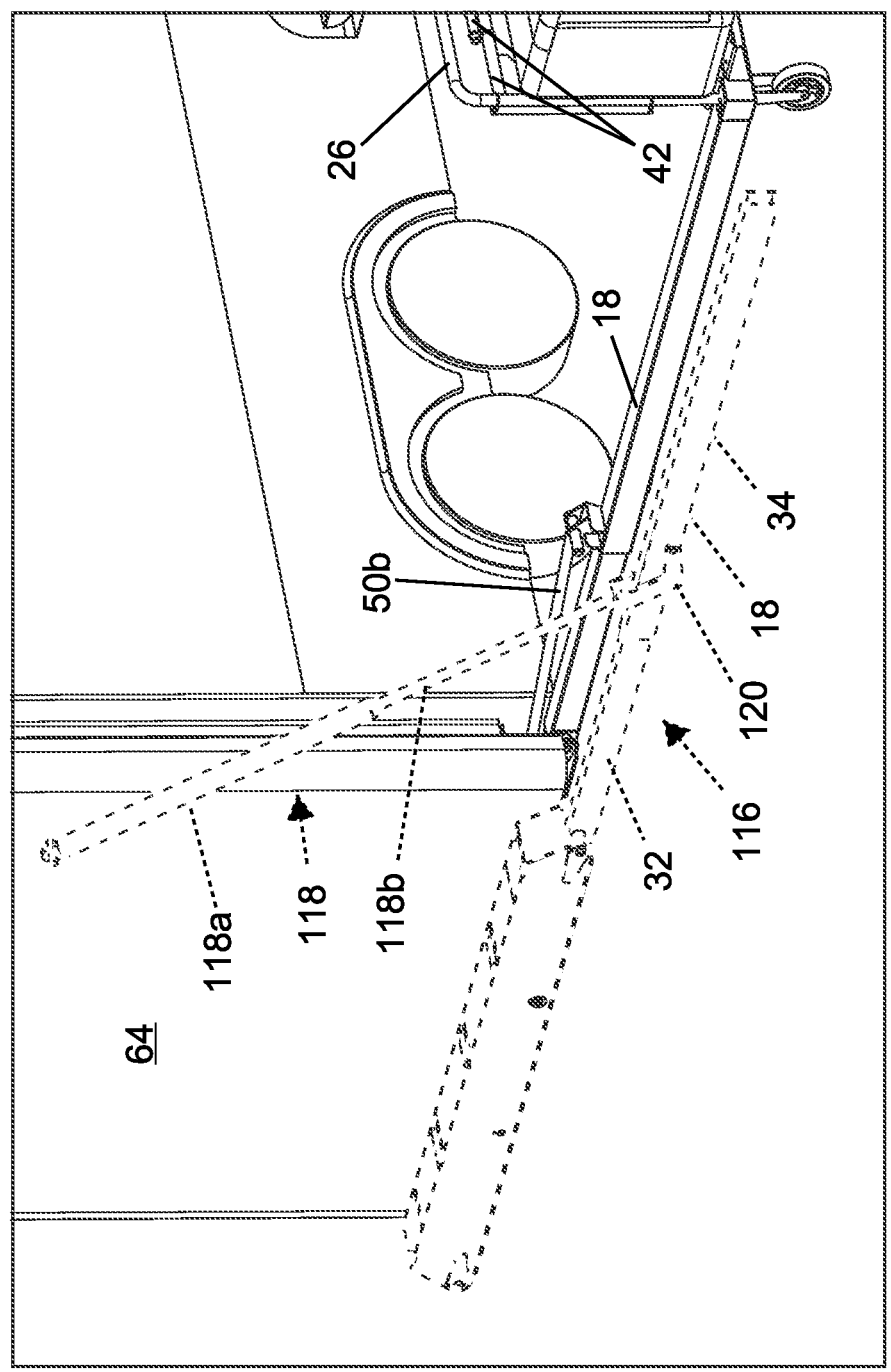
FIG. 22 is a rear perspective view of a transport trailer with superimposed alternative single-cylinder linkage corral deployment and stowage mechanism.
Figure 23A:
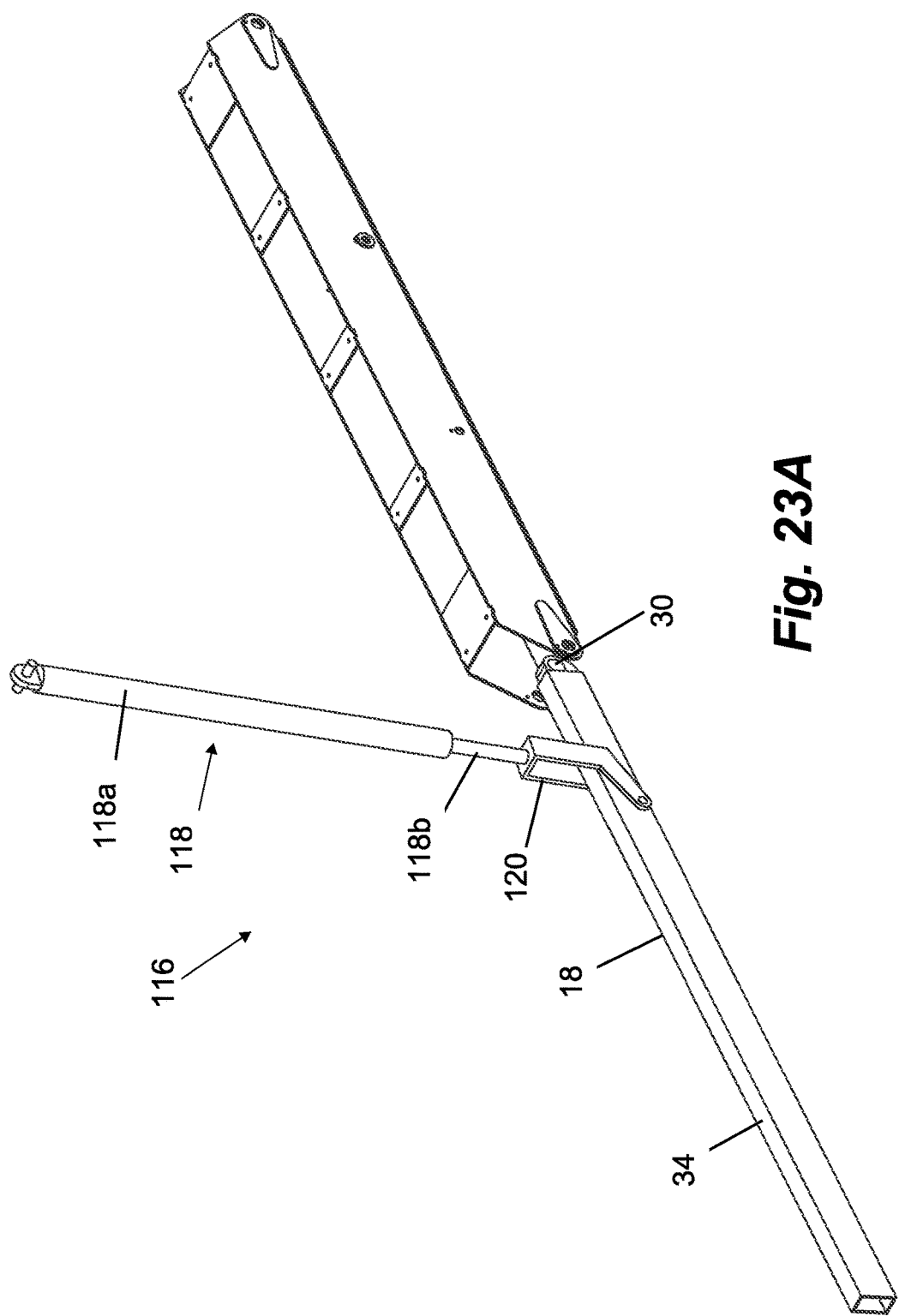
FIG. 23A is a rear perspective view of the single cylinder linkage of FIG. 22, shown in a deployed position.
Figure 23B:
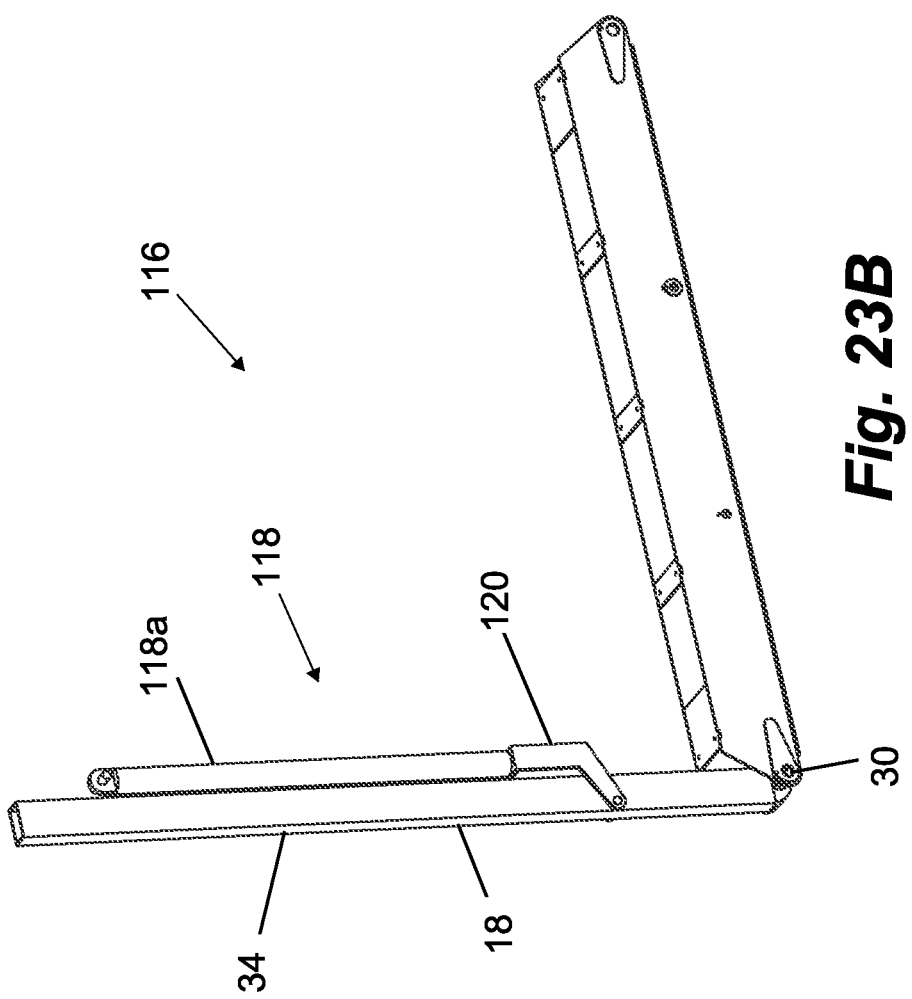
FIG. 23B is another rear perspective view of the single cylinder linkage of FIG. 23A, shown in a retracted or stowed position.

In the illustrated embodiment of FIGS. 22 and 23, an optional single cylinder linkage 116 provides lifting capability for deployable corrals, and is shown in phantom and spaced rearwardly of corral rail 18 and rear lift gate and ramp 64 in FIG. 22. Linkage 116 includes a piston-cylinder assembly 118 having a cylinder 118*a* pivotally mounted at its proximal end to trailer 12 at or near vertical recessed channel 58. It should be understood that, as mentioned above, in FIG. 22 linkage 116 is spaced rearward from its as-installed position so that its components can be clearly shown. A piston rod 118*b* extends downwardly from cylinder 118*a* and pivotally connects to a proximal end of outboard rail portion 34 via a generally L-shaped yoke 120. Cylinder 118*a* is activated to extend piston rod 118*b* and thereby cause corral rail 18 to pivot out of vertical recessed channel 58 and down to a substantially horizontal orientation, whereupon further extension of piston rod 118*b* causes outboard rail portion 34 to slide or telescope outwardly relative to inboard rail portion 32 until the corral rail 18 is fully extended (FIG. 22). Partial retraction of piston rod 118*b* causes outboard rail portion to slide fully inwardly along inboard rail portion 32 so that corral rail 18 assumes its fully retracted and shortest configuration (FIG. 23A). Full retraction of piston rod 118*b* (FIG. 23B) causes corral rail 18 to pivot upwardly for stowage in the transport position, in which corral rail 18 and piston-cylinder assembly 118 are substantially parallel to one another and stowed in vertical recessed channel 58 of trailer 12.

It will be appreciated that single-cylinder linkage 116 has a mechanical advantage over the powered drive system 48 because piston-cylinder assembly 118 acts on approximately a midpoint of corral rail 18 when outboard rail portion 34 is fully extended, which gives a much longer moment arm to rail pivots 30 than does upwardly-extending tab 52 of drive system 48. It will further be appreciated that the pivoting movement of yoke 120 relative to corral rail 18 can be used to effect pivoting movement of support legs 36 using a support leg link and tab that are similar to leg link 54 and tab 56 described above, so that the support legs 36 are oriented substantially parallel to corral rails 18 when corrals 14 are stowed.

Referring to another alternative powered drive system as shown in FIG. 24, a dual cylinder linkage 122 utilizes two separate piston-cylinder assemblies 124, 126 for providing lateral extension/retraction and pivoting movement of extendable corral rails 18, respectively. As with FIG. 22, in FIG. 24 dual cylinder linkage 122 is shown in phantom lines and is positioned rearwardly from its as-installed position so that its components can be clearly shown. Extension/retraction piston-cylinder assembly 124 has a double-acting cylinder 124*a* coupled to outboard rail portion 34 and a piston rod 124*b* coupled to inboard rail portion 32, such that extension and retraction of piston rod 124*b* relative to cylinder 124*a* causes corral rail 18 to extend and retract with outboard rail portion 34 telescoping relative to inboard rail portion 32.

Pivoting piston-cylinder assembly 126 has a double-acting cylinder 126*a* coupled to trailer 12 at or near vertical recessed channel 58, and a piston rod 126*b* coupled to inboard rail portion 32 at an upward-extending tab 128, such that extension and retraction of piston rod 126*b* relative to cylinder 126*a* causes corral rail 18 to pivotally lower to a substantially horizontal deployed position (shown) and rise to a stowed position with corral rail 18 disposed in vertical recessed channel 58. For deployment of corral 14, pivoting piston-cylinder assembly 126 would typically actuate (extend) first until the associated support wheels are resting along the ground or support surface, and then the extension/retraction piston-cylinder assembly 124 would actuate (extend) until corral rails 18 reach their maximum length. For retraction of corral 14, the pivoting piston-cylinder assembly 126 and extension/retraction piston-cylinder assembly 124 would typically actuate (retract) in the opposite order.

Optionally, and with reference to FIG. 25A-25I, another transport trailer with integrated corral system 210 includes a transport trailer 212, such as a livestock trailer, and two deployable corrals 214 that extend and retract relative to respective sides of trailer 212. Deployable corrals 214 are similar in many respects to the deployable corrals 14 described above, such that the following description will focus mainly on different aspects of corrals 214, which are lighter weight and less costly to manufacture, but which can still provide a comparable amount of fenced-in area 216 (FIGS. 25F-25I) as compared to the fenced-in area 16 of corrals 14. Each deployable corral 214 includes a pair of pivotably-extendable corral rails 218 that, unlike corral rails 18 described above, are not telescopically extendable. Deployable corrals 214 may be raised and lowered using a powered drive system such as one of the powered drive systems described above. However, because deployable corrals 214 are lighter weight and less complex than those of the embodiments described above, corrals 214 may be more suitable for a manual drive system, either as primary/sole drive system or as backup to a powered drive system.

Figure 25A:
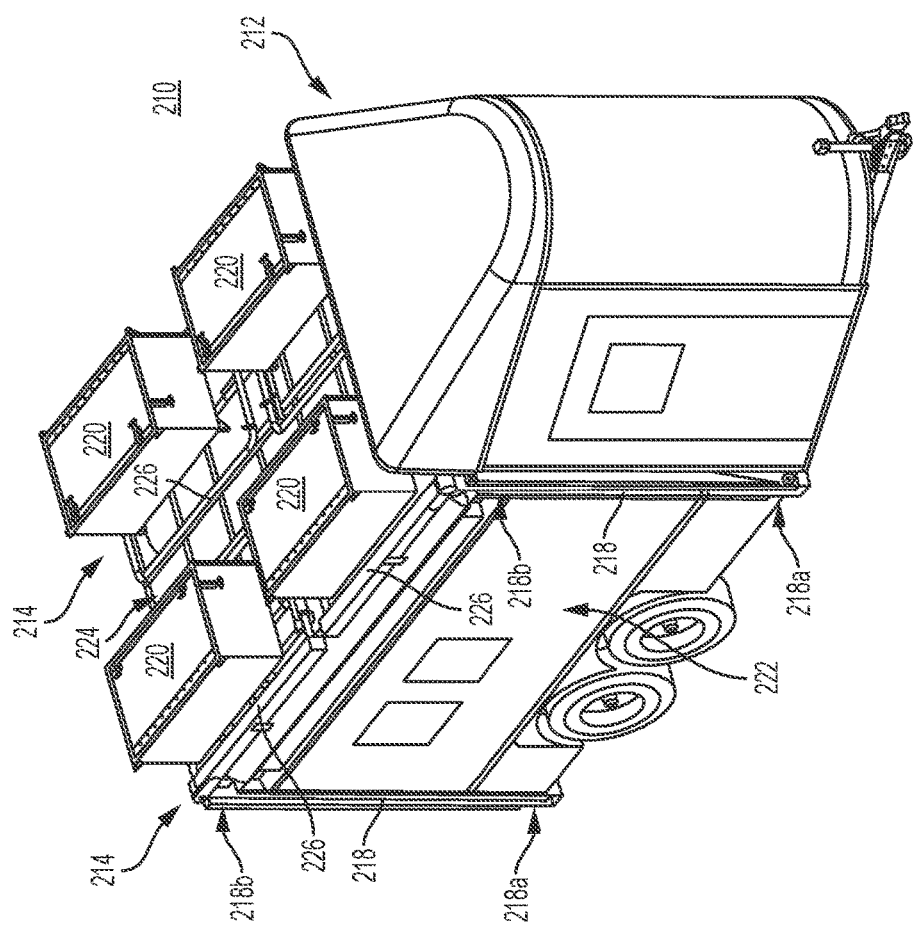
Figure 25B:
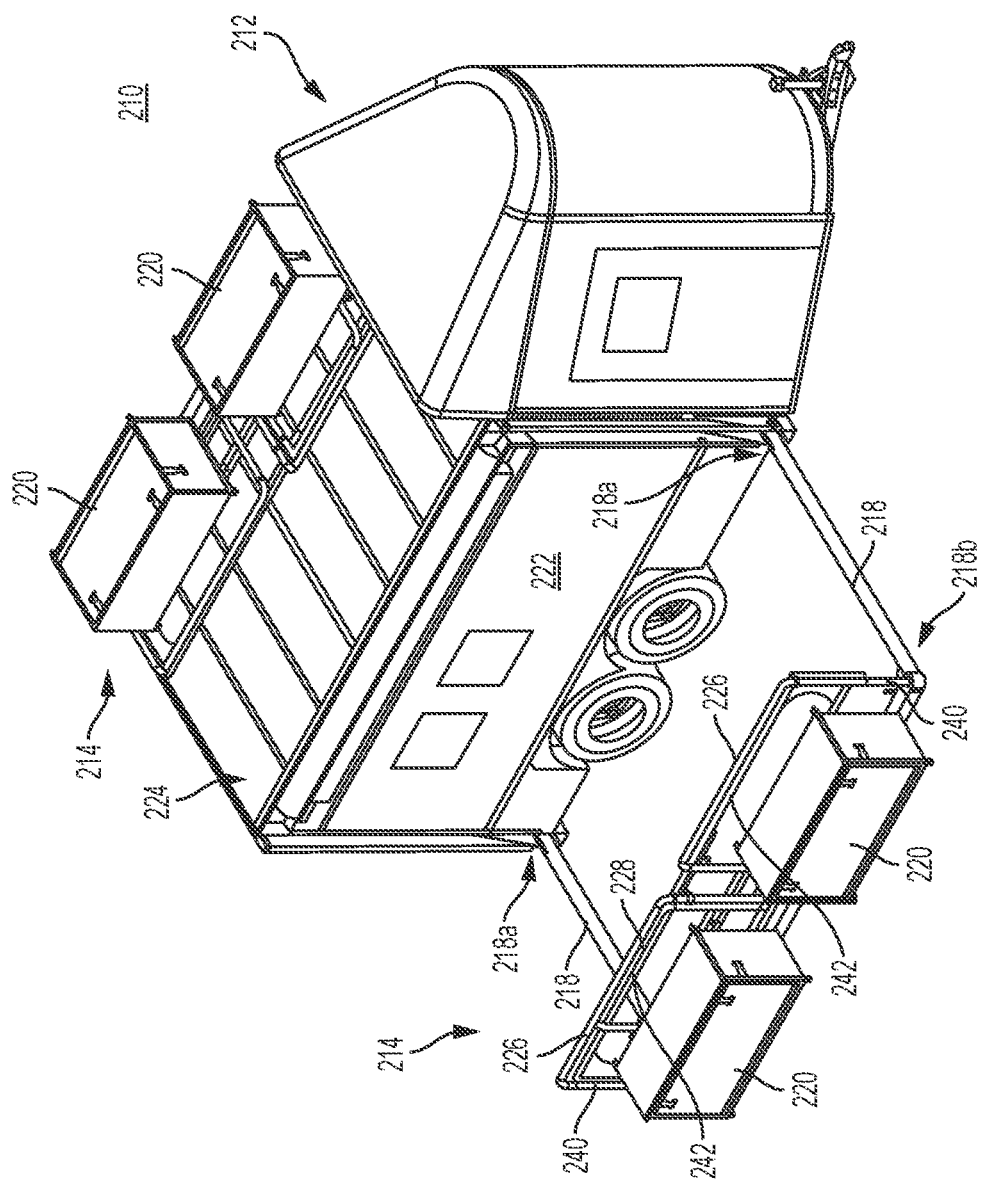
Figure 25C:
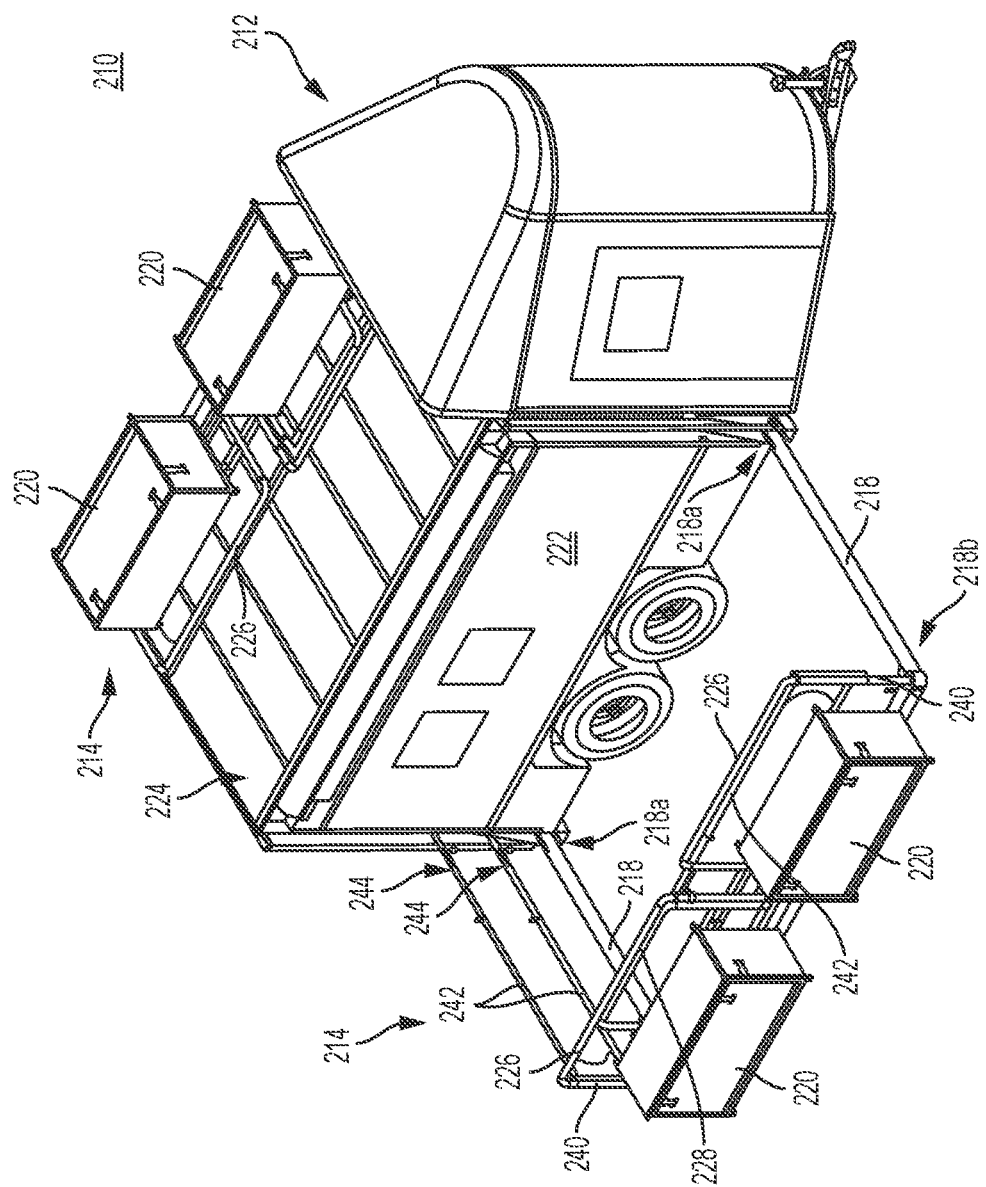
Figure 25D:
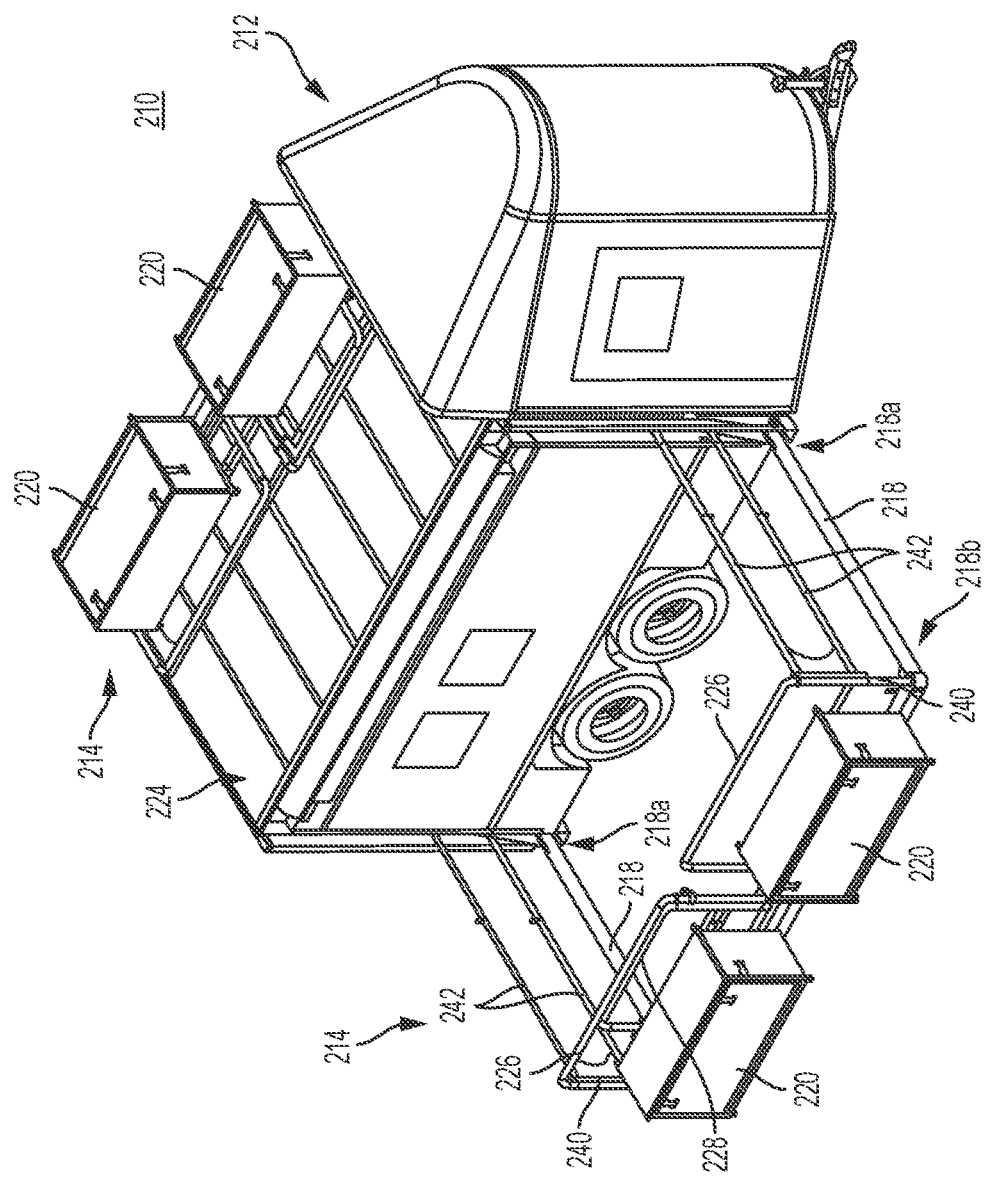
Figure 25E:
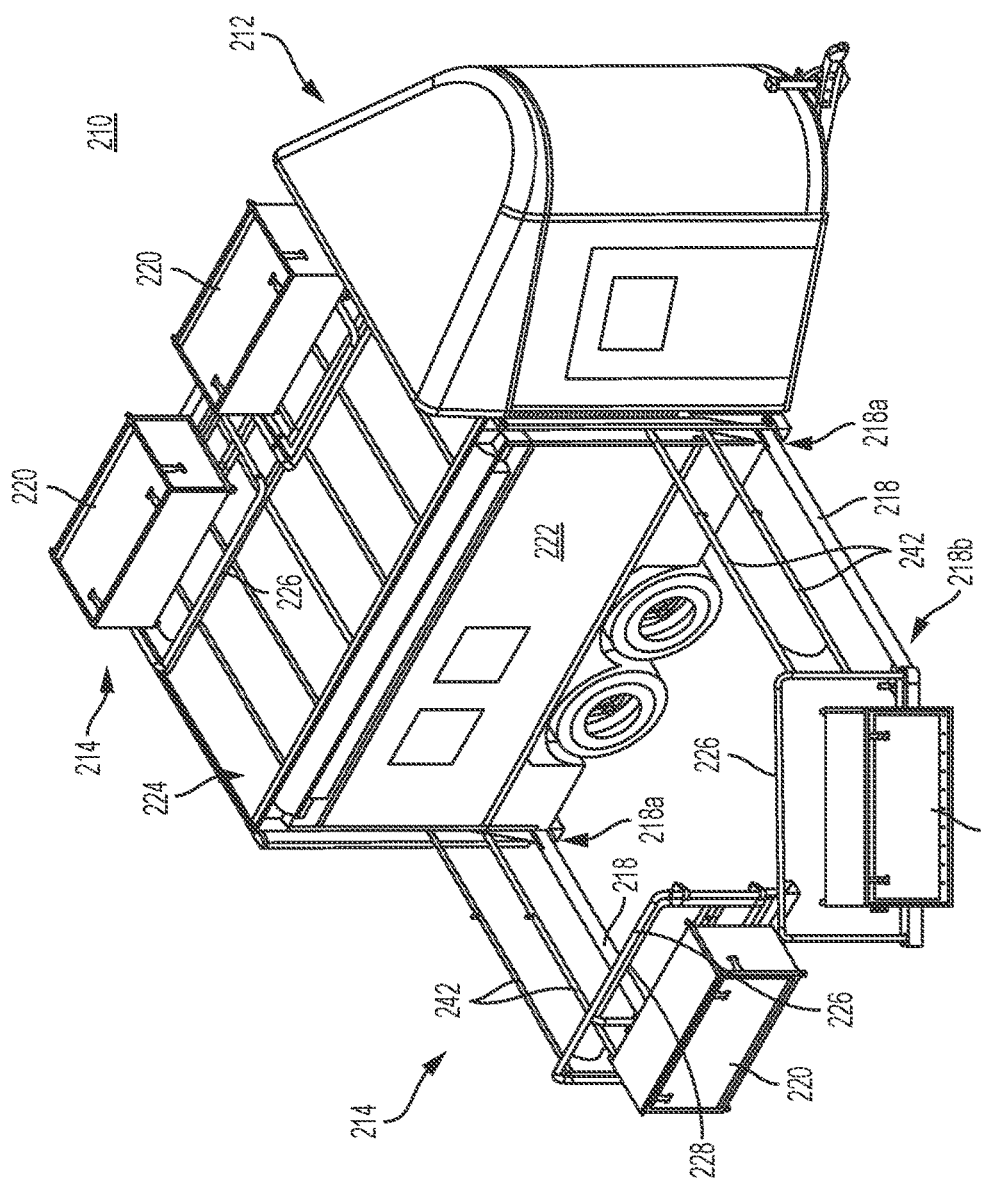
Figure 25F:
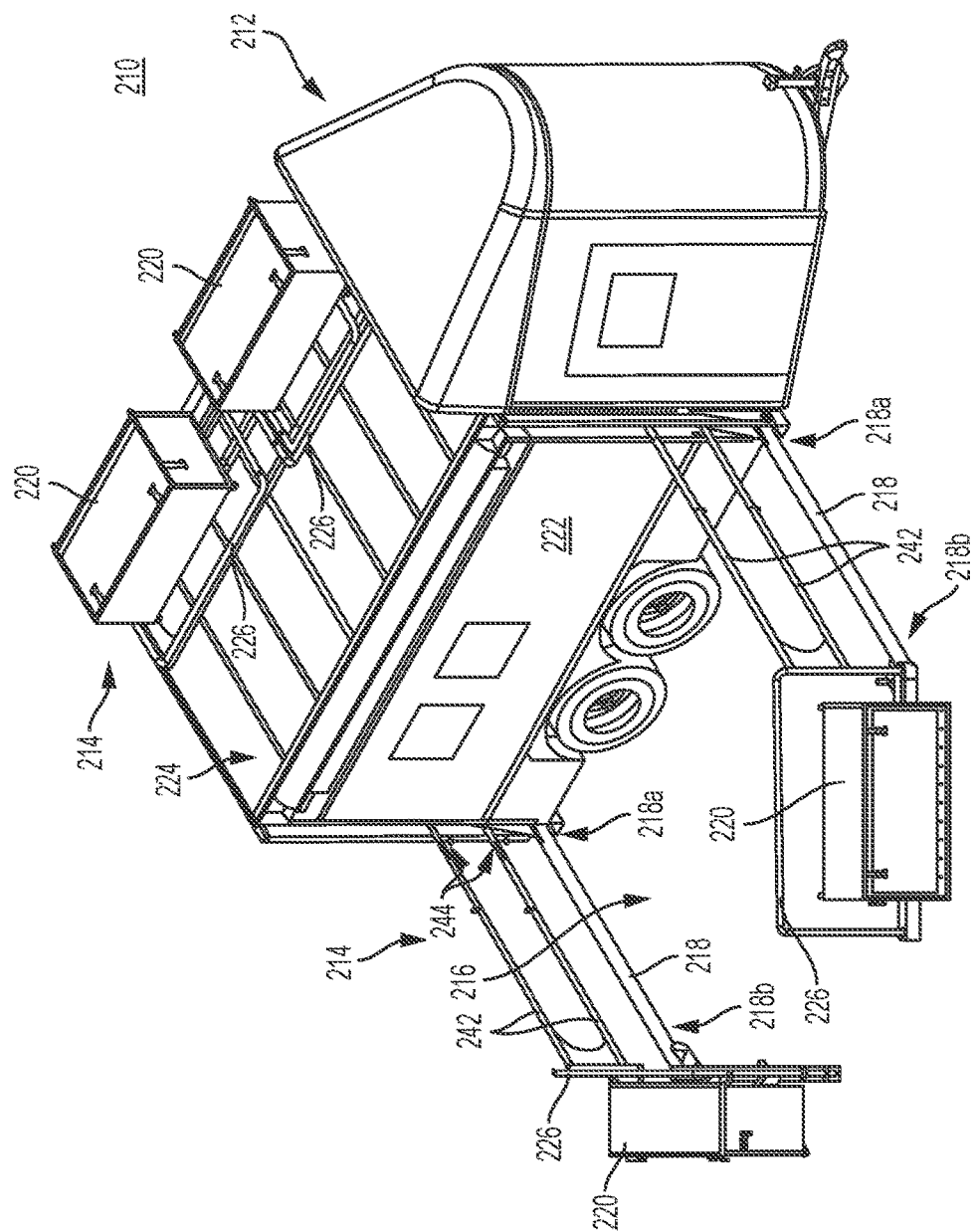

Corral rails 218 have respective proximal end portions 218*a* that are pivotably coupled at or along an exterior side panel 222 of livestock trailer 212, and respective distal end portions 218*b* that are positioned near the trailer's roof panel 224 in the stowed configuration of FIG. 25A, and are spaced laterally outwardly from trailer 212 in the deployed configuration of FIGS. 25B-25I. The corral rails' distal end portions 218 pivotably support corral cross-rails 226 that include respective upwardly-extending corner posts 240 to which a set of upper corral rails 242 are pivotably attached. Thus, upper corral rails 242 may be stored parallel to corral cross-rails 226 as in FIG. 25B, and may be pivoted so that their distal ends (which include latches 244) can be coupled to the trailer 212 near its sidewall 222, such as shown in FIGS. 25C-25I.

Corral cross-rails 226 are pivotable from their stowage position in which they are substantially perpendicular to their respective corral rails 218 (FIGS. 25A-25D) to deployed positions in which they are angled away from trailer sidewall 222 and form obtuse angles relative to corral rails 218 (FIGS. 25E-25I). This allows deployable corrals 214 to form a more rounded fenced-in area 216, which can make it easier for horses to turn and maneuver within the area, as compared to a rectangular fenced-in area. It will be appreciated that this feature may also be applied to the deployable corral 14 with telescopically extendable corral rails 18 described in earlier embodiments.

Below each corner post 240, where each corral cross-rail 226 is pivotably coupled to a respective corral rail 218, there is a pair of plates 231, 233 that are attached to corral cross-rail 226 and corral rail 218, respectively, and which are vertically offset from one another and have respective through-holes formed therein for receiving a lock pin 235. The through-holes of the plates 231, 233 align when corral cross-rail 226 is substantially perpendicular to its corral rail 218, and lock pin 235 may be spring-loaded so as to automatically extend through both through-holes upon alignment, so as to substantially lock corral cross-rail 226 against pivoting relative to corral rail 218. Optionally, an additional through-hole formed in the plate 231 of corral cross-rail 226 is positioned to align with the through-hold formed in the plate 233 of corral rail 218 when the corral cross-rail 226 is pivoted outwardly to an angled position, such as shown in FIGS. 25E-25I. Lock pin 235 is spring-loaded will automatically drop or snap down through both through-holes when the corral cross-rail 226 has reached the desired angled position, thus providing a clear indication to the user that the corral cross-rails 226 are positioned correctly for the use of a pivotable swing gate 228.

Figure 27A:
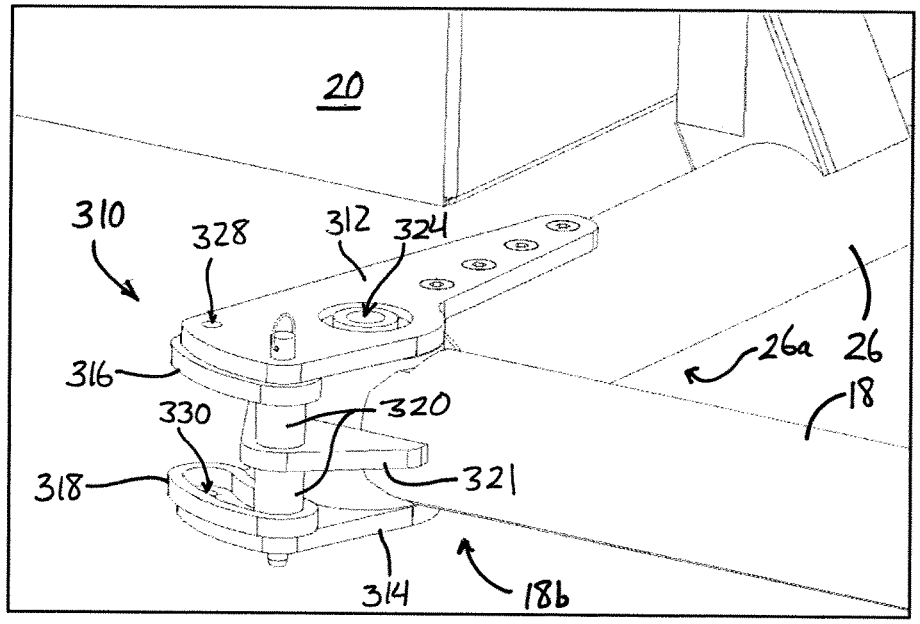
FIGS. 27A-27C are perspective views of a hinge with a hinge guide and locking system, depicting sequential steps of locking, unlocking, and operating the hinge.
Figure 27B:
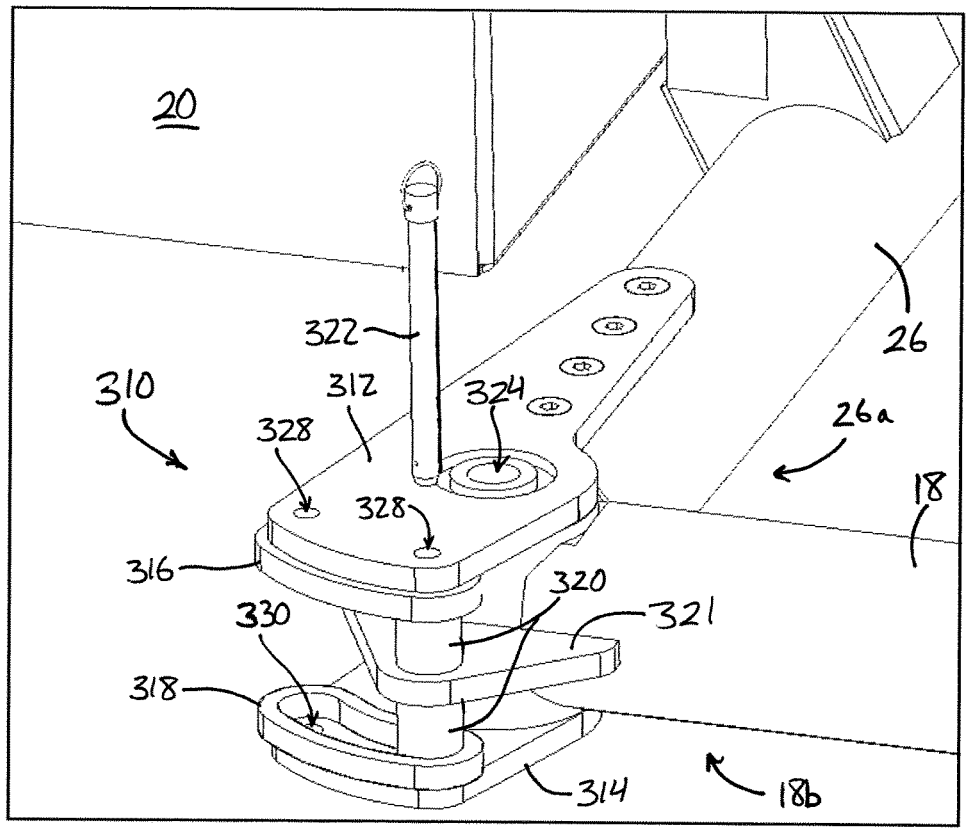
Figure 27C:
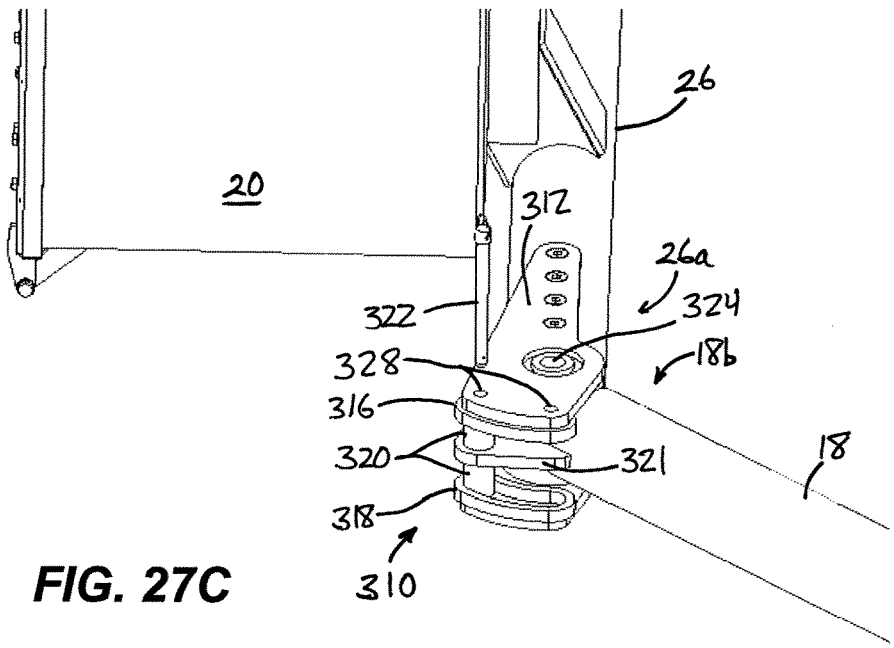

In the illustrated embodiment of FIGS. 27A-27C, the corral cross-rails 26 are pivotably coupled to extendable corral rails 18 with respective hinge locking systems 310 mounted at the distal end 18b of each extendable corral rail 18 and the proximal end 26a of each corresponding corral cross-rail 26. The hinge locking system 310 includes an upper pivot plate 312, a lower pivot plate 314, an upper guide 316 defining a downwardly-facing arcuate channel, and a lower guide channel 318 defining an upwardly-facing arcuate channel directly below the downwardly-facing channel of the upper pivot plate 312. The hinge locking system 310 further includes a tracking pin 320 with upper and lower ends received in the upper and lower guide channels, respectively, and a locking pin 322 that is used to set the angle of the corral cross-rail 26 relative to the corresponding extendable corral rail 18.

The pivot plates 312, 314 are secured to a proximal end 26a of the corral cross-rail 26 and extend beyond a pivot joint 324 coupling the cross-rail 26 to the extendable corral rail 18, such that the pivot plates 312, 314 extend laterally beyond the exterior surfaces of the corral cross-rail 26 and extendable corral rail 18 and, preferably, do not extend into the enclosed portion of the corral. Because all parts of each hinge locking system 310 are located either within the footprint of the cross-rail 26 and extendable corral rail 18, or outboard of that footprint, horses or other livestock in the fenced-in area are less likely to place a hoof atop the upper pivot plate 312 to support part of their weight upon the hinge parts from inside the fenced-in area.

The upper and lower guides 316, 318 are disposed between the pivot plates 312, 314 and guide the tracking pin 320, which is fixed relative to the distal end 18b of the extendable corral rail 18 by a bracket 321. As the corral cross-rail 26 pivots relative to the extendable corral rail 18, the tracking pin 320 tracks within the arcuate channels defined by the guides 316, 318 and as the tracking pin 320 meets the ends of the arcuate channels of the guides 316, 318, the corral cross-rail 26 is prevented from pivoting any farther. The tracking pin 320 defines an axial bore that receives the locking pin 322. The locking pin 322 is inserted through one of a plurality of holes 328 in the upper pivot plate 312, through the tracking pin 320 when properly aligned, and through a corresponding one of a set of holes 330 in the lower pivot plate 314 to lock the corral cross-rail 26 into the desired angular position. Additional holes 328 and 330 may be disposed along the pivot plates 312, 314 and within the guides 316, 318 to provide additional locking positions for the corral cross-rail 26 relative to the extendable corral rail 18.

Figure 25G:
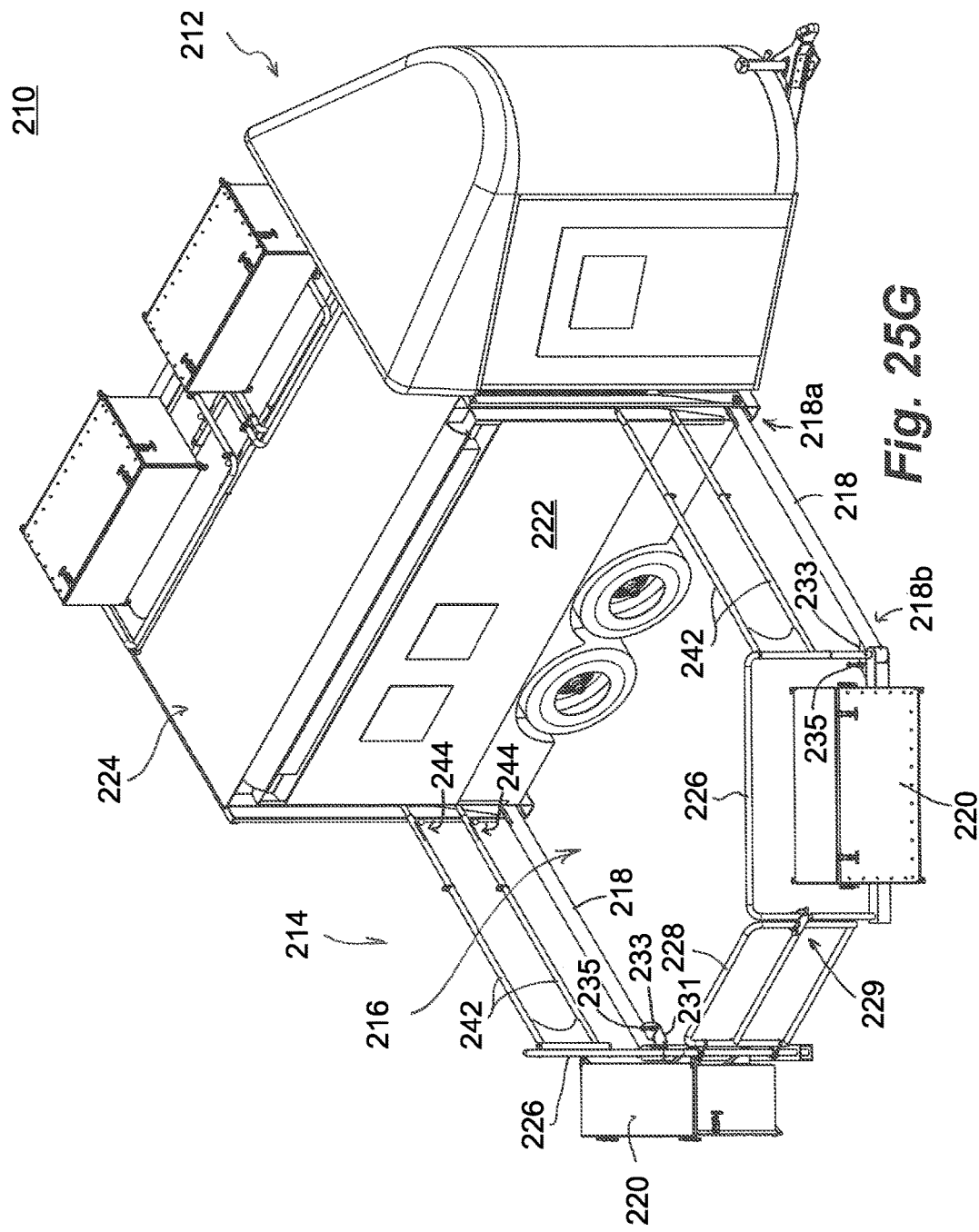

In the illustrated embodiment of FIGS. 25A-25I, the rearward corral cross-rail 226 supports pivotable swing gate 228 that latches to a distal end of the forward corral cross-rail 226, such as shown in FIGS. 25G and 25H. Swing gate 228 can be manually unlatched and swung inwardly or outwardly (FIG. 25I) to provide access to fenced-in area 216. Optionally, the swing gate's latch 229 may be lockable to help secure livestock in the fenced-in area 216.

Figure 26A:
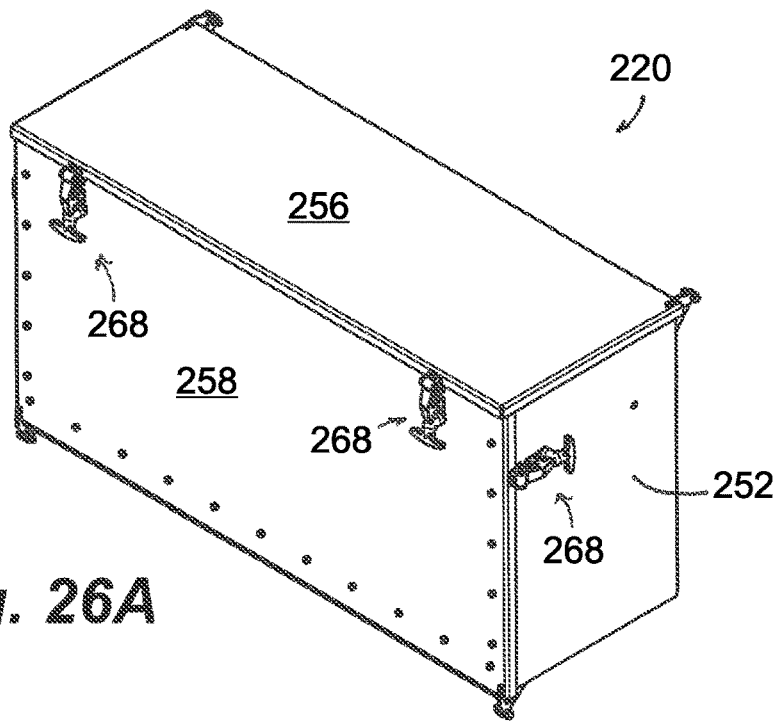
FIGS. 26A-26C are perspective views of a rail-mountable storage bin, depicting sequential steps of opening top and front panels thereof.
Figure 26B:
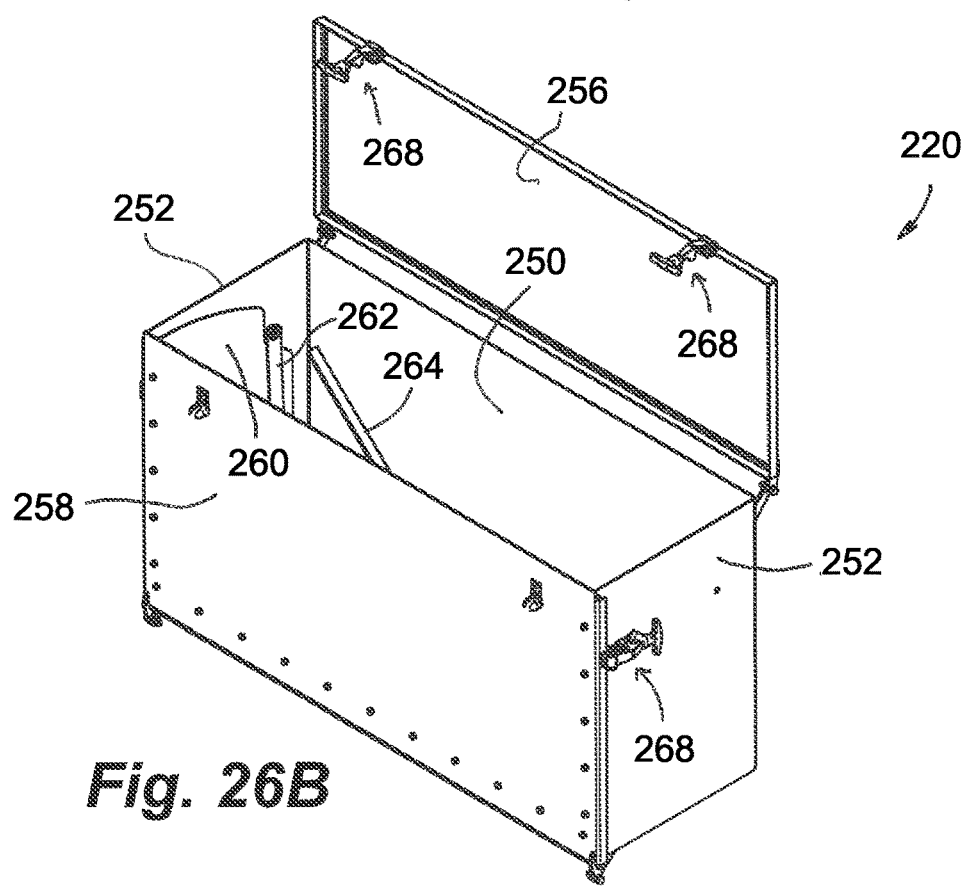
Figure 26C:
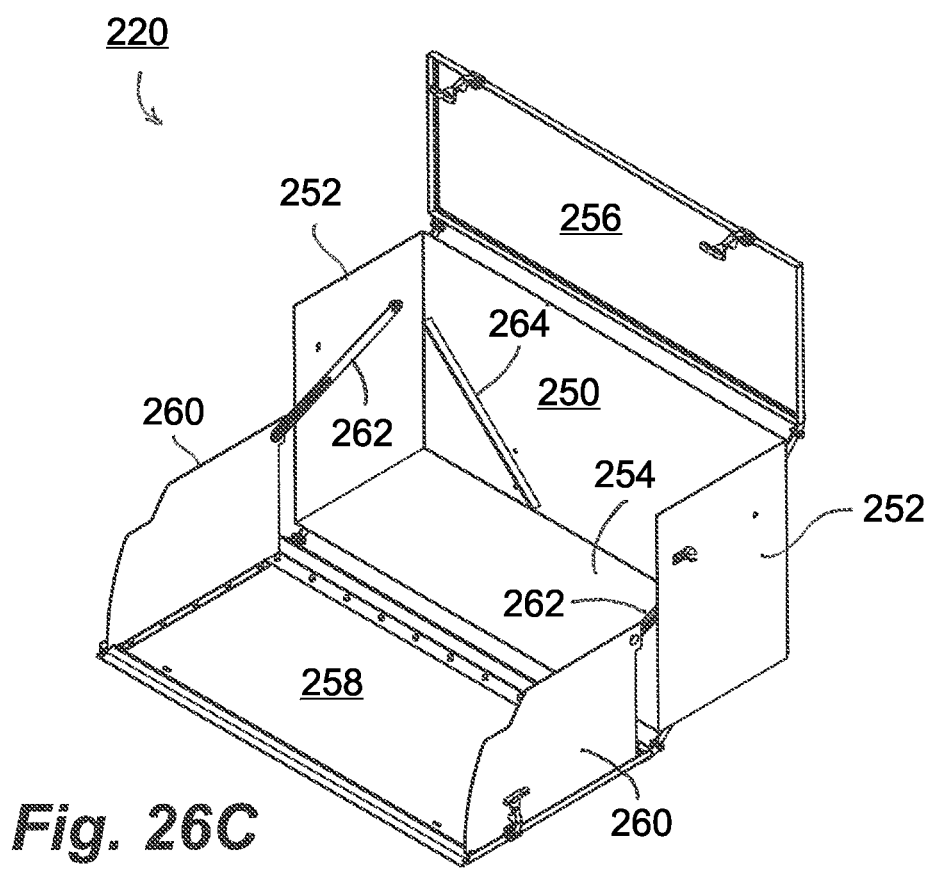

Like deployable corrals 14, deployable corrals 214 of FIGS. 25A-25I include storage bins 220 mounted along outboard sides of each corral cross-rail 226. In the illustrated embodiment of FIGS. 25A-25I, and as best shown in FIGS. 26A-26C, storage bins 220 are designed to facilitate storage and access to animal feed, tools, and other supplies that may be useful to animal handlers. Each storage bin 220 includes a fixed rear wall 250, fixed sidewalls 252, and a fixed bottom wall 254. A pivotable top wall or lid 256 is hinged to an upper region of rear wall 250, and a pivotable front wall 258 is hinged to a forward region of bottom wall 254 (FIGS. 26B and 26C). Pivotable front wall 258 includes a pair of front wall sidewalls 260 that move with the front wall 258 and are spaced inwardly from fixed sidewalls 252, with pivot-limiting struts 262 coupled between fixed sidewalls 252 and front wall sidewalls 260 and serving to hold front wall 258 in a substantially horizontal orientation when opened, such as shown in FIG. 26C. Because storage bins 220 may be mounted at their fixed rear walls 250 to vertical surfaces or supports such as corral cross-rails 226, and may be loaded with hay bales, tools, water jugs, or other heavy articles, structural bracing 264 may be provided along fixed rear wall 250 to ensure sufficient strength and durability.

The configuration of storage bins 220 makes them well-suited for storing and transporting hay bales or straw bales for animal feed or bedding, and for providing livestock with access to the contents of storage bins 220 if desired, while minimizing the amount of manual lifting required of a handler. For example, when storage bins 220 are attached to corral cross-rails 226 and corrals 214 are deployed and the storage bins' front walls 258 are open as shown in FIG. 26C, the upwardly-facing inner surface of front wall 258 provides a low platform on which a bale may be lifted and placed, without requiring that the bale be lifted to chest height or even to waist height. Once a bale or other heavy object is resting on the upwardly-facing inner surface of front wall 258, it can be accessed by livestock if desired, or it can be readily moved onto fixed bottom wall 254 by lifting the pivotable front wall 258 to the closed position shown in FIG. 26B. Pivotable front wall 258 can then be latched closed using latches 268, and top lid 256 can be closed and latched as shown in FIG. 26A. When storage bins 220 are closed as shown in FIG. 26A, they may be lifted by the powered drive system of deployable corral 214 and stored atop trailer 212, without any manual lifting by the handler or user. Thus, once a bale or heavy article has been lifted a relatively short vertical distance onto the open front wall 258 of a storage bin 220, and moved to the bottom wall 254, no additional manual lifting is required to move the bin up to a rooftop storage position such as shown in FIG. 25A.

Storage bins 220 may be attached to respective corral cross-rails 226 using brackets 266 such as shown in FIG. 25I. Because of the substantial weight that may be carried in storage bins 220, it may be desirable to provide a support leg 270 that extends downwardly from corral cross-rail 226 to engage the ground or other support surface, to thereby stabilize corral rails 218 and corral cross-rails 226 in the deployed configuration, and reduce stresses on pivot joints where cross-rails 226 are coupled to corral rails 218, and where corral rails 218 are coupled to trailer 212. Support leg 270 may be pivotable such as pivotable support leg 36 or vertically slidable such as support leg 436.

Figure 31:
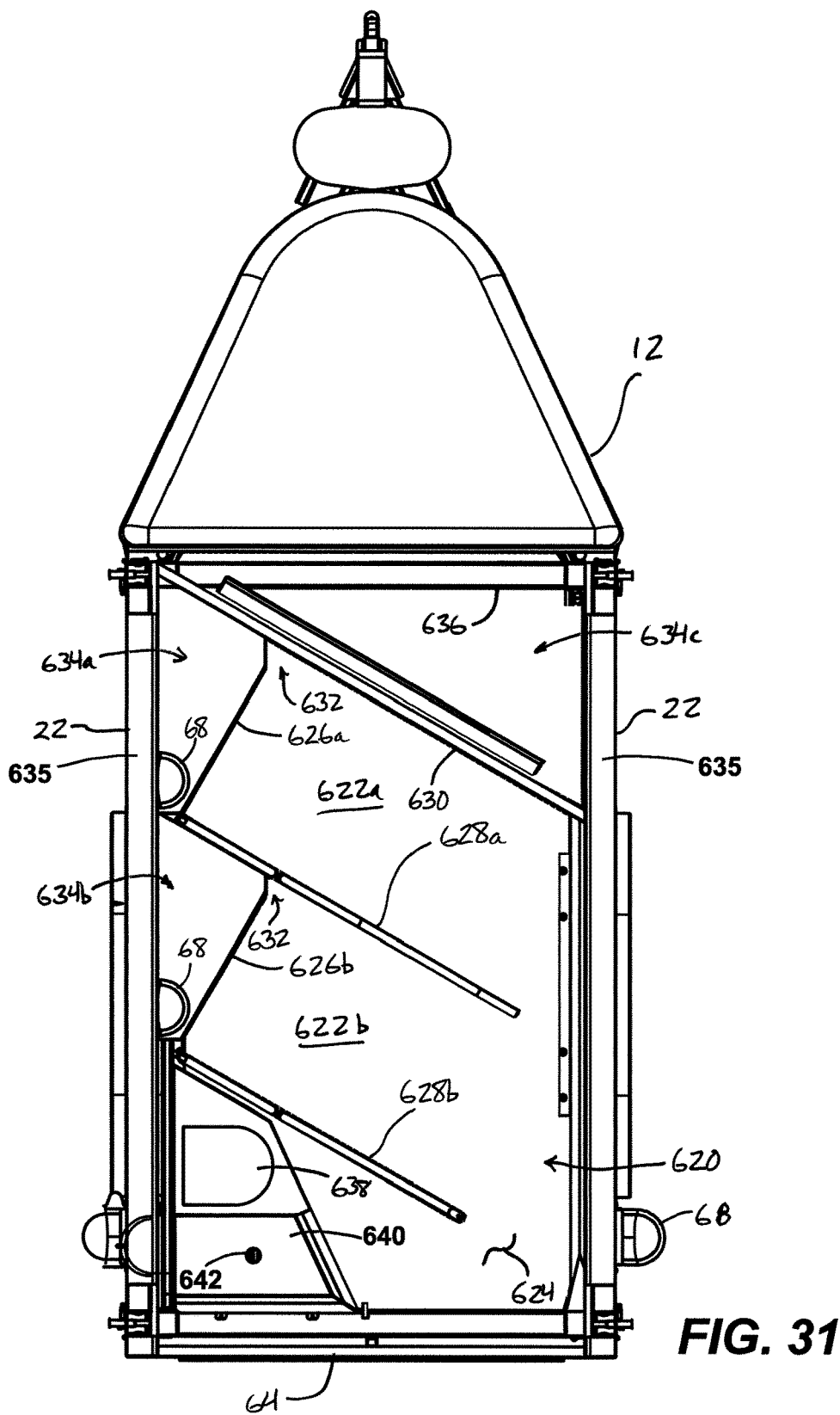
FIG. 31 is a top plan view of another transport trailer in accordance with the present invention, with top portions and corrals omitted to show interior 320 structure.

The interior of transport trailer 12 may be conventionally outfitted for one or more horses or other livestock, and may also include living quarters for one or more owners or operators of the trailer. Referring to FIG. 31, in which a roof structure is omitted to show interior structure, trailer 12 defines an interior with livestock living quarters 620 in a "saw tooth" arrangement, in which two stalls 622a, 622b are defined by a trailer floor surface 624, respective chest walls or fences 626a, 626b, a forward stall divider wall 628a, and a rearward stall divider wall 628b. In addition, a front wall 630 is set parallel to forward stall divider wall 628a and extends from the left sidewall 22 to the right sidewall 22, at an oblique angle relative to both sidewalls. In the illustrated embodiment, each stall divider wall 628a, 628b is an interior sidewall, similar to a fence or gate, that extends rearwardly and laterally from the left sidewall 22 toward the right sidewall 22, but terminates so as to leave a gap between the rear end of each divider wall and the right sidewall 22. Rear end portions of each stall divider wall 628, 628b may be pivotable to facilitate loading and unloading of horses or other livestock animals. The chest walls 626a, 626b are substantially parallel to one another and each is set at a first oblique angle, such as about 20 to 45 degrees relative to the left sidewall 22, extending forwardly and laterally from the left sidewall 22 toward the front of the trailer and toward the right sidewall 22. The stall divider walls 628a, 628b and front wall 630 are generally perpendicular to the chest walls 626a, 626b and, therefore, are set at a second oblique angle relative to the trailer sidewalls 22.

The arrangement of stalls 622a, 622b including the obliquely angled chest walls 626a, 626b and stall divider walls 628a, 628b is such that, in the event of a sudden deceleration of the trailer 12 while in forward motion, the chest of a horse or other livestock animal in one of the stalls will contact the corresponding chest wall 622a or 622b, which may be padded to reduce risk of injury or discomfort to the horse, and the side of the horse or animal will contact the divider wall 628a or forward wall 630. Respective notched regions 632 where the front wall 630 meets the forward chest wall 626a, and where the forward divider wall 628a meets the rearward chest wall 626b, ensures that there is no pinch-point in the forwardmost region of each stall 622a, 622b.

Each chest wall 626a, 626b extends upwardly from floor surface 624 to an intermediate height spaced well below the trailer's roof panel, so that a horse may position its neck over the chest wall, with its head positioned laterally between the chest wall and the trailer's left sidewall 22. Each chest wall 626a, 626b cooperates with a forward end portion of the front wall 630 or the forward divider wall 628a, respectively, and with the left sidewall 22, to define a respective forward manger 634a and rearward manger 634b. The mangers 634a, 634b extend down to floor 624 and provide a space for hay or other animal feed to be placed for access by the animal in the respective stall 622a, 622b. In addition, each sidewall 22 defines a respective elongate storage chamber 635 that is accessible through openable doors or panels (not shown) provided in an exterior surface and/or an interior surface of each sidewall 22. In addition, a forward storage chamber 634c is defined by the front wall 630, the right sidewall 22, and a front wall 636 of the trailer.

Optionally, and as shown in FIG. 31, water troughs 68 may be provided along the interior of the left sidewall 22, which are accessible to horses in each stall 622a, 622b. The water troughs 68 may be fixed, or may be retractable in a similar manner as described above, and may be serviced with a plumbing system that selectively supplies water under pressure to each trough, as desired. In the illustrated embodiment, additional utilities may be provided for the operator of the trailer 12, such as a toilet 638 and a shower area 640 including a floor drain 642 at the rear of the animal living quarters 620.

As noted above, transport trailers with integrated corral systems are not necessarily limited to livestock use, and with little or no modification, may be implemented for different purposes such as portable vendor display booths for goods or services at indoor or outdoor display areas. For example, storage bins supported on corral cross-rail 26 and/or swing gate 28 may be omitted, or adapted for use as display cases showing or providing access to goods, video displays, pamphlets and brochures, awards, giveaways, and the like, while additional storage or display space may be provided along the exterior side panel 22, such as in a similar manner to the deployable trough 68. Any of the corral cross-rails 26, swing gate 28, and upper corral rails 42, may be fitted with countertops or table surfaces, shelving, and the like. Shade awning 66 may be printed with company logos or other indicia, with additional display space provided along exterior side panel 22 and/or below the awning's elongate end support rod 70, along the awning support rods 72, etc. In addition, living quarters for persons may be provided in livestock trailers, in vehicle (e.g., motorsports) hauling trailers, in vendor display booth trailers, or the like, without departing from the spirit and scope of the present invention.

Thus, the deployable corral system of the present invention is installed onto or integrated with a transport trailer such as a livestock trailer, and enables powered deployment and stowage of the components with little or no lifting required by the operator. Moreover, animal feed, bedding, tack, and tools or equipment can be stored on the corral system and lifted by the corral system for transport over the roof of the trailer, also without need for significant lifting by the operator. An optional shade awning deploys automatically or manually to provide shade over a portion of the fenced-in area provided by each corral, and an optional trough deploys from a sidewall of the trailer to facilitate watering the livestock in the corral. A powered drive system is operable to perform most of the deployment and stowage steps for the corral, including substantially all of the heavy lifting required, with different levels of automation, actuation, and sensing available as desired.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A deployable corral system for a transport trailer, said corral system comprising:

a pair of extendable corral rails having respective proximal end portions and distal end portions, wherein said proximal end portions are configured for attachment to the trailer, and said extendable corral rails are movable between an extended position and a retracted position relative to the trailer;

a corral cross-rail coupled to said distal end portion of at least one of said extendable corral rails, wherein when said at least one extendable corral rail is in said extended position said corral cross-rail is spaced horizontally away from an upright wall of the trailer, and when said at least one extendable corral rail is retracted said corral cross-rail is positioned adjacent the upright wall; and a drive system operable to move said extendable corral rails between said extended and retracted positions;

wherein said extendable corral rails and said corral cross-rail, in the extended position, cooperate with the upright wall of the trailer to define a corral area.

2. The corral system of claim 1, wherein said extendable corral rails are pivotably extendable.

3. The corral system of claim 1, wherein said drive system comprises a powered drive system including at least one electric or fluid powered actuator.

4. The corral system of claim 1, further comprising a securing member movable between a securing position and a releasing position to selectively secure one of said extendable corral rails in said retracted configuration.

5. The corral system of claim 4, wherein said corral system comprises an upper corral rail disposed above one of said extendable corral rails, and said securing member comprises a support for supporting said upper corral rail when said extendable corral rail is in the extended position.

6. The corral system of claim 4, further comprising a position sensor configured to sense if said securing member is in a closed or an open position, such that when said securing member is in the closed orientation said drive system is deactivated, and when said securing member is in the open configuration said drive system is activatable.

7. The corral system of claim 1, wherein said distal end portions of said extendable corral rails are telescopically extendable relative to said proximal end portions of said extendable corral rails, said corral system further comprising a corral rail extension system operable to extend and retract said distal end portions of said extendable corral rails relative to said proximal end portions of said extendable corral rails.

8. The corral system of claim 1, wherein said corral cross-rail is pivotably coupled to said extendable corral rail and configured to pivot between a first position substantially perpendicular to said extendable corral rail, and a second position which said corral cross-rail is set at an obtuse angle relative to said extendable corral rail.

9. The corral system of claim 8, further comprising a hinge locking system configured to lock said corral cross-rail at each of said first and second positions, said hinge locking system comprising:

a locking pin defining an axial bore;
a guide channel;
a tracking pin received in said guide channel; and
upper and lower pivot plates;
wherein said tracking pin moves along said guide channel as said corral cross rail is pivoted relative to said extendable corral rail to a desired angle, said locking pin passes through a hole in said upper pivot plate, through the axial bore in said tracking pin, and through a hole in said lower pivot plate corresponding to said upper pivot plate hole, such that said corral cross rail is locked at one of said first position and said second position relative to said extendable corral rail.

10. The corral system of claim 1, further comprising a support leg coupled to each of said corral cross-rails, wherein said support legs are configured to extend downwardly when said extendable corral rails are in said extended position, and said support legs are configured to extend upwardly when said extendable corral rails are in said retracted position.

11. The corral system of claim 1, further in combination with the trailer.

12. The corral system and trailer of claim 11, further comprising a feed or water trough pivotably coupled to said upright wall, wherein said feed or water trough is extendable into the corral area and is retractable into said upright wall.

13. The corral system and trailer of claim 11, wherein said trailer defines an interior livestock manger comprising at least one stall defined by a trailer floor surface, a chest wall set at a first oblique angle relative to one of said upright walls comprising a trailer sidewall, and an interior sidewall extending rearwardly away from said chest wall, said interior sidewall set at a second oblique angle relative to said trailer sidewall.

14. The corral system and trailer of claim 13, wherein said interior sidewall is substantially perpendicular to said chest wall, and wherein said chest wall cooperates with said trailer sidewall to define a storage space accessible from outside the trailer or from inside the interior livestock manger.

15. A transport trailer with deployable corral system, comprising:

a plurality of upright walls and a pair of wheels supporting said upright walls;

a pair of extendable corral rails having respective proximal end portions coupled to said trailer near one of said upright walls, and said extendable corral rails having distal end portions, wherein said extendable corral rails are movable between an extended position and a retracted position relative to said one of said upright walls;

a corral cross-rail coupled to said distal end portion of at least one of said extendable corral rails, wherein when said at least one extendable corral rail is in said extended position said corral cross-rail is spaced horizontally away from said one of said upright walls, and when said at least one extendable corral rail is retracted said corral cross-rail is positioned adjacent said one of said upright walls;

a securing member movable between a securing position and a releasing position to selectively secure one of said extendable corral rails in said retracted configuration; and a drive system operable to move said extendable corral rails between said extended and retracted positions;

wherein said extendable corral rails and said corral cross-rail, in the extended position, cooperate with said one of said upright walls to define a corral area.

16. The corral system and trailer of claim 15, wherein said securing member comprises a flap that selectively covers a portion of said one of said extendable corral rails in said retracted configuration, and wherein said flap defines a support opening configured to receive and support a distal end portion of a portion of one of said extendable corral rails when said extendable corral rails and said one of said corral cross-rails are extended.

17. The corral system and trailer of claim 16, further comprising a position sensor configured to sense if said securing member is in a closed or an open position, such that when said securing flap is in the securing position said drive system is deactivated, and when said securing flap is in the open configuration said drive system is activatable.

18. The transport trailer of claim 15, further comprising a feed or water trough pivotably coupled to said one of said upright walls, wherein said feed or water trough is extendable into the corral area and is retractable into said one of said upright walls.

19. The transport trailer of claim 15, further comprising a hinge locking system configured to lock said corral crossrail at either of at least two different angular positions relative to said extendable corral rail, said hinge locking system comprising:
   a locking pin defining an axial bore;
   a guide channel;
   a tracking pin received in said guide channel; and
   upper and lower pivot plates;
   wherein said tracking pin moves along said guide channel as said corral cross rail is pivoted relative to said extendable corral rail to a desired angle, said locking pin passes through a hole in said upper pivot plate, through the axial bore in said tracking pin, and through a hole in said lower pivot plate corresponding to said upper pivot plate hole, such that said corral cross rail is locked at one of said at least two different angular positions.

20. The transport trailer of claim 19, wherein said trailer defines an interior livestock manger comprising at least one stall defined by a trailer floor surface, a chest wall set at a first oblique angle relative to one of said upright walls comprising a trailer sidewall, and an interior sidewall extending rearwardly away from said chest wall and set at a second oblique angle relative to said trailer sidewall.

* * * * *